US 6,513,962 B1

(12) United States Patent
Mayshack et al.

(10) Patent No.: US 6,513,962 B1
(45) Date of Patent: Feb. 4, 2003

(54) ILLUMINATION SYSTEM ADAPTED FOR SURGICAL LIGHTING

(75) Inventors: Alvin C. Mayshack, Charleston, SC (US); Thomas J. Brukilacchio, Reading, MA (US); Lynn W. Noble, Lexington, MA (US); Arkady Pievsky, Swanpscott, MA (US); Benoit Boulant, Woburn, MA (US); Paul B. Elterman, Cambridge, MA (US); Brain James DiCarlo, Girad, PA (US)

(73) Assignee: Getinge/Castle, Inc., Rochester, NY (US)

( * ) Notice: Subject to any disclaimer, the term of this patent is extended or adjusted under 35 U.S.C. 154(b) by 0 days.

(21) Appl. No.: 09/460,689

(22) Filed: Dec. 14, 1999

Related U.S. Application Data

(60) Provisional application No. 60/112,644, filed on Dec. 17, 1998, and provisional application No. 60/125,987, filed on Mar. 24, 1999.

(51) Int. Cl.[7] .............................................. A61G 13/00
(52) U.S. Cl. ......................... 362/583; 362/33; 362/804; 362/807
(58) Field of Search ........................ 362/33, 807, 551, 362/552, 556, 555, 572, 295, 231, 230, 267, 573, 583, 804; 385/116; 356/406

(56) References Cited

U.S. PATENT DOCUMENTS

| | | | | |
|---|---|---|---|---|
| 2,911,519 A | * | 11/1959 | Phillips et al. ................. 362/32 |
| 3,240,925 A | * | 3/1966 | Paske et al. .................... 362/32 |
| 4,037,096 A | | 7/1977 | Brendgord et al. | |
| 4,135,231 A | | 1/1979 | Fisher | |
| 4,463,410 A | | 7/1984 | Mori | |
| 4,964,692 A | * | 10/1990 | Prescott .................... 350/96.24 |
| 5,128,848 A | | 7/1992 | Enders et al. | |
| 5,143,435 A | | 9/1992 | Kikuchi | |
| 5,144,190 A | | 9/1992 | Thomas et al. | |
| 5,229,841 A | | 7/1993 | Taranowski et al. | |
| 5,301,090 A | * | 4/1994 | Hed ............................... 362/32 |
| 5,375,049 A | * | 12/1994 | Witt ............................. 362/418 |
| 5,383,105 A | * | 1/1995 | Agut ............................ 362/285 |
| 5,497,295 A | * | 3/1996 | Gehly ............................ 362/32 |
| 5,584,557 A | * | 12/1996 | Alexay .......................... 362/32 |
| 5,639,153 A | | 6/1997 | Bibiani et al. | |
| 5,709,459 A | * | 1/1998 | Gourgouliatos et al. ..... 362/105 |
| 5,751,869 A | * | 5/1998 | Li et al. ........................ 385/33 |
| 5,765,943 A | * | 6/1998 | Verdier ........................ 362/268 |
| 5,774,271 A | * | 6/1998 | Lagerway et al. ........... 359/649 |
| 5,820,253 A | | 10/1998 | Scholz | |
| 5,838,865 A | * | 11/1998 | Gulick ......................... 385/121 |
| 5,887,102 A | | 3/1999 | Mueller et al. | |
| 5,951,139 A | * | 9/1999 | Smith et al. ................... 362/33 |
| 5,971,572 A | * | 10/1999 | Rouchon et al. ............. 362/204 |
| 6,004,315 A | * | 12/1999 | Dumont ......................... 362/32 |
| 6,012,821 A | * | 1/2000 | Yeaney et al. ................. 362/33 |
| 6,139,166 A | * | 10/2000 | Marshall et al. ............. 362/231 |
| 6,160,948 A | * | 12/2000 | McGaffan .................... 385/901 |

FOREIGN PATENT DOCUMENTS

DE         2854684 B1  *  2/1980  ................. 362/807

* cited by examiner

Primary Examiner—Sandra O'Shea
Assistant Examiner—Anabel Ton
(74) Attorney, Agent, or Firm—Francis J. Caufield

(57) ABSTRACT

An illumination system for illuminating an area within a room includes one or more light sources, preferably disposed outside the room, one or more lighting heads disposed within the room, one or more light pipes and/or fiber bundles to transmit light from the source(s) to the lighting head(s). The system includes means for controlling both the intensity and the color rendering index of the light emitted from the lighting head. In a preferred embodiment, the sources include an incandescent source extending across the visible spectrum and a light emitting diode source which emits essentially red light, and control of the color rendering index is effected by controlling the relative amounts of light from the two sources reaching the lighting head. Preferred forms of the invention also include special joints which permit all necessary translations and rotations of the lighting head while still permitting a continuous light path via fiber bundles and/or light pipes from the source to the lighting head.

96 Claims, 28 Drawing Sheets

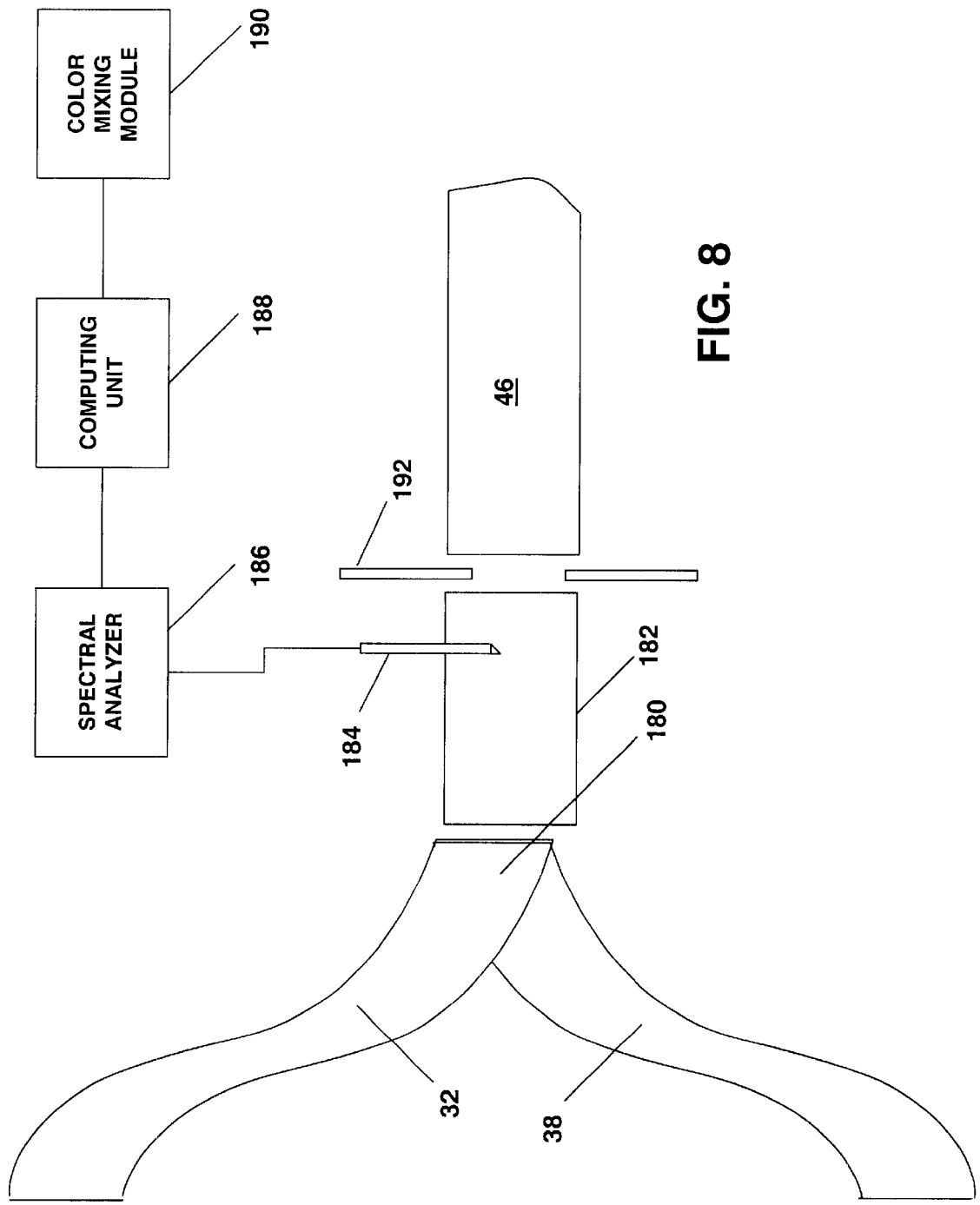

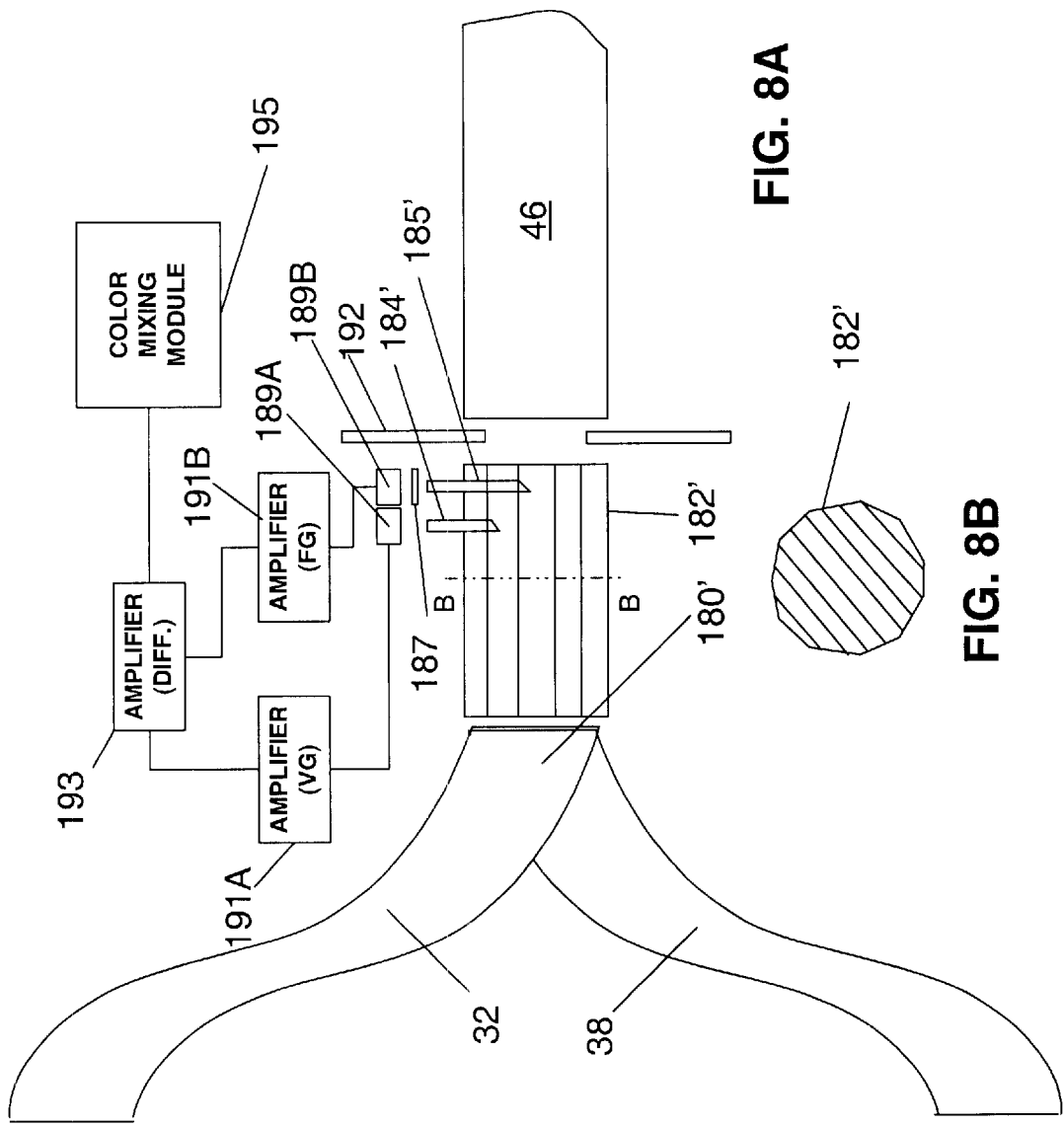

ILLUMINATION SYSTEM ADAPTED FOR SURGICAL LIGHTING

REFERENCE TO RELATED APPLICATIONS

This application claims priority from Provisional Application Ser. No. 60/112,644 filed Dec. 17, 1998, and Provisional Application Ser. No. 60/125,987 filed Mar. 24, 1999.

BACKGROUND OF THE INVENTION

This invention generally relates to an illumination system. This illumination system is especially, though not exclusively, intended for use in surgical lighting in operating rooms and ambulatory surgical suites. This invention also relates to certain components which are used in the illumination system of the invention but which may also be useful in other types of optical systems and applications.

For decades, illumination systems for operating rooms have posed major problems. To ensure the safety of patients, it is essential that an illumination system provide intense and acceptably uniform illumination over the entire surgical site, which can in some cases, be of substantial width and depth as, for example in open heart surgery. Obviously, the surgery cannot be interrupted should a bulb burn out, and thus each lighting unit needs either multiple bulbs or at least a back-up bulb which will illuminate should a primary bulb fail. Also, large area systems need at least two, and preferably three or more, lighting units to ensure that light can impinge upon the surgical site from multiple directions so that no part of the surgical site is in complete shadow even when it is necessary for operating room personnel to be positioned between the surgical site and one of the lighting units. The lighting units must also be suspended so that they can be moved and rotated in all directions to provide optimum illumination of the surgical site, the size and shape of which may change during a surgical procedure.

Lighting units containing multiple high output bulbs sufficiently powerful to produce the intense lighting needed for surgery or to meet code redundancy requirements are necessarily of substantial depth and weight. To enable such large heavy lighting units to be moved by operating room personnel without requiring undue force, it is essential in practice to provide some form of counterpoise system, and the presence of the counterpoise system further increases the size and weight of the lighting units.

Conventional surgical lighting systems have other disadvantages. The powerful lamps used, which each typically comprise a bulb and a reflector, generate large amounts of heat and infra-red radiation. The heat is dissipated into the operating room, thus increasing the load on the heating, ventilating and air conditioning (HVAC) systems thereof, and is also radiated on to operating room personnel, increasing their fatigue during lengthy procedures. Since the infrared radiation generated follows the same path as the visible light, it is thus largely absorbed at the surgical site, within the patient's tissues. This radiation absorption by the patient's tissues tends to damage the tissues, especially during lengthy procedures, and generally increases the trauma to the patient resulting from the operation.

It is also essential that the illumination produced by the system conform to a standard of color to ensure that tissues, blood, blood vessels, and the like. all retain their normal appearance, since any deviation from expected colors of body parts increases the risk of a surgeon mistakenly identifying a body part and thus operating incorrectly. In practice, a surgical illumination system must produce light with a proper correlated color temperature ("CCT", which is defined as the absolute temperature of a black body whose chromaticity most nearly resembles that of the light source) and a proper color rendering index ("CRI", which is defined as the average color shift, under illumination by a test source, of a series of eight standard colors of intermediate saturation spread throughout the range of hues, with respect to a reference source).

The need to maintain accurate CCT and CRI values presents problems when it is necessary to control the output of surgical lighting systems. Conventionally, light intensity has been controlled by varying the energy input to each lamp. However, all types of high output lamps undergo some change in their output spectrum as their energy input is varied, thus changing the CCT and CRI of the output. In practice, this tends to result in an unsatisfactory compromise since the usable intensity range is reduced and the resultant changes in CCT and CRI, though tolerable, are greater than is strictly desirable.

Attempts have been made to avoid the aforementioned longstanding disadvantages of conventional surgical lighting systems using lamps carried within lighting heads disposed inside the operating room. In particular, inventors have realized that fiber optic technology, which permits light from a remote source to be channeled through a bundle of optical fibers to a location where the light is needed, allows the development of surgical lighting systems in which the actual light sources may be outside the operating room and the light is fed to the surgical site via optical fiber bundles. Such a fiber optic based system renders the light sources accessible to technicians should a light source fail during an operation, and eases the problem of maintaining the lighting heads aseptic, since the lighting heads no longer need to contain bulbs and reflectors of complex shape. Also, the lighting heads themselves could be made smaller and lighter, thus avoiding the need for elaborate counterpoising systems. Finally, the removal of the light sources from the operating room also removes the unwanted heat generated within the operating room by conventional lighting systems.

Most proposals for use of fiber optic based lighting systems within operating rooms relate to so-called "surgical headlamps", that is to say, lighting systems which provide light adjacent a surgeon's face for illumination of a surgical site very close to the face, as required in microsurgery, for example, eye or ear surgery. Examples of such surgical headlamp systems are described in U.S. Pat. Nos. 4,516,190; 5,355,285; 5,430,620; and 5,709,459. However, at least one fiber optic based system has been proposed to replace the main conventional lighting system of an operating room; see U.S. Pat. No. 5,497,295 (Gehly), FIG. 5 et seq. In the Gehly system, the light sources are disposed within a separate room outside the operating room. Light from these sources is led via a plurality of optic fiber bundles (one bundle for each lighting head used within the operating room) into the operating room via a central hub installed in the ceiling thereof. Beneath this central hub are mounted two substantially cylindrical rotatable members having a common vertical axis. Each of the rotatable members carries a horizontal arm which extends outwardly from the rotatable member parallel to the ceiling of the operating room. A carriage is slidably mounted on each horizontal arm so as to be movable along the length of the arm, and each carriage supports a three-segment telescopic vertical column which descends from the carriage. A shallow, dish-shaped lighthead is mounted via a flexible coupling on the bottom of each telescopic column. Each of the fiber bundles entering the operating room via the central hub is led via one of the cylindrical rotatable members on to one of the horizontal arms (each arm carries only one fiber bundle) and down the associated column and flexible coupling to the center of the associated lighthead, where the light impinges upon a substantially conical central section of the lighthead, which deflects it on to a plurality of annular diffusers which surround the conical central section.

The horizontal arm/carriage/telescopic column/flexible coupling/ light-head structure described in Gehly is of considerable complexity, size and weight, so that the arms, carriages and columns appear to require powered operation (with inevitable problems should any part of the complex mechanical structure fail to operate correctly during the course of a surgical procedure), and the whole structure is probably as intrusive in an operating room as conventional lighting heads containing bulbs. Furthermore, the fiber bundles in Gehly extend unbroken from adjacent the light sources to the lightheads, with no apparent provision for relieving stress on the bundles caused by relative movements between the various parts of the supporting structure. Thus, it would appear that the apparatus does not permit completely free rotation of the arms nor more than a limited range of motion of the lightheads, and even then, wear upon, or damage to the bundles, may be expected after repeated relative movements between the various parts of the supporting structure.

Consequently, it is a primary object of the present invention to provide an illumination system, adapted for surgical lighting, which, like the Gehly system, enables the light sources to be placed remotely from an operating room, thereby reducing the bulk of the lighting heads required within the room. However, the illumination system of the present invention enables light to be transmitted from the remote sources to the lighting heads using a simpler, less bulky structure which does not require powered operation (though such operation is not excluded), and can provide means for real time control of lighting intensity and CRI.

It is also an object of the present invention to provide an illumination system which enables light from a plurality of sources to be mixed to provide uniform lighting having a desired CCT and/or CRI.

It is also an object of the present invention to provide an illumination system which enables light from a plurality of sources to be mixed to provide uniform lighting having a desired CRI and/or CCT, and which provides for feedback to ensure compliance with CRI or other color standard requirements.

It is also an object of the present invention to provide an illumination system which includes a fully rotatable fiber joint to allow a light output device fed by a fiber bundle to be freely rotated relative to parts of a fiber bundle lying on the opposed side of the joint.

It is also an object of the present invention to provide an illumination system which has a low profile lighting head using two reflectors which together provide uniform illumination over a substantial area.

It is also an object of the invention to provide a low profile lighting head employing an off-axis distributed source operating in conjunction with at least one reflector to enhance illumination control within a predetermined three-dimensional work space.

It is also an object of the present invention to provide an illumination system in which light from a single source is distributed to multiple branches. Preferred components of the present invention for use in such a distribution system include a light pipe with an embedded mirror, and a component which distributes incoming light into a plurality of fiber bundles arranged concentrically.

It is also an object of the present invention to provide an illumination system using fiber bundles in which lighting intensity is controlled by variable apertures rather than by controlling power input to a light source.

It is also an object of the present invention to provide an illumination system using fiber bundles in which light from a high intensity source is coupled into a plastic fiber bundle in such a manner that the input end of the bundle does not attain a temperature which can damage the bundle.

It is yet another object of the invention to provide a fiber based illumination system having at least one termination to a surgical light head which allows for the connection of one or more endoscope illumination or surgical headlamp fiber optic bundles or light guides.

It is yet another object of the present invention to provide an illumination system that can be focused to provide illumination patterns of different distribution.

Other objects of the invention will in part appear hereinafter and will in part be obvious when the following detailed description is read in connection with the drawings.

SUMMARY OF THE INVENTION

In general, in one aspect, this invention provides an illumination system for illuminating an area within a room, the illumination system comprising:
  at least one light source;
  at least one lighting head disposed within the room and arranged to output light to the area to be illuminated;
  at least one light pipe and/or fiber bundle arranged to transmit light from said at least one light source to said at least one lighting head;
  means for controlling the intensity of the light output from said at least one lighting head; and
  means for controlling the color rendering index of the light output from said at least one lighting head.

In another aspect of this invention the aforementioned illumination system includes an alternative termination to a surgical light head which allows for the connection of one or more endoscope illumination and/or surgical headlamp fiber optic bundles or light guides.

In another aspect, this invention provides an illumination system arranged to mix the output from two separate light sources. This illumination system comprises:
  first and second light sources;
  a first fiber bundle having an input end arranged to receive light emitted by the first light source;
  a second fiber bundle having an input end arranged to receive light emitted by the second light source,
  wherein the output ends of the fibers forming the first and second fiber bundles form a single fiber bundle arranged to transmit light from both the first and second light sources; and
  an optical homogenizer having an input end arranged to receive light from said single fiber bundle and an output end which delivers a substantially uniform light output.

In this illumination system, the optical homogenizer is typically a multimode light pipe, preferably provided with a plurality of facets on its circumferential surface to further enhance uniformity of mixing.

In another aspect, this invention provides an illumination system arranged to mix the output from two separate light sources and to control at least one parameter of the mixed output. This illumination system comprises:
  a first light source arranged to emit light having a first characteristic value;

a second light source arranged to emit light having a second characteristic value differing from the first characteristic value;

a light mixing means arranged to receive light emitted from the first and second light sources and to produce a light output having a third characteristic value differing from the first and second characteristic values;

a light detector arranged to receive part of the light output from the light mixing means and to determine said third characteristic value of said light output; and intensity control means arranged to vary the intensity of the light output from at least one of the first and second light sources and thereby to vary said third characteristic value of said light output from said light mixing means, said intensity control means being controlled in response to said light detector.

In this illumination system of the invention, the first, second and third characteristic values are typically values characterizing the spectral distribution of the various light fluxes involved, in particular, may be values representative of the CCT and/or CRI of the relevant light fluxes.

In another aspect, this invention provides a rotatable fiber joint for use in an illumination system. This joint comprises:

a first member having walls defining a first passage extending therethrough;

a second member disposed adjacent the first member and having walls defining a second passage extending therethrough, one end of said second passage being disposed adjacent one end of said first passage; and a fiber optic bundle disposed within said first and second passages, the bundle being secured relative to the second member so that the bundle cannot rotate within said second passage, but not being secured to the first member so that the bundle can rotate freely within said first passage, whereby the first and second members can rotate relative to each other.

In another aspect, this invention provides a lighting head for use in an illumination system. This lighting head comprises:

input means for introducing light into the light head;

a first reflector arranged to receive light entering the lighting head through said input means and to reflect this light;

a second reflector having a plurality of facets, the second reflector being arranged to receive light reflected from the first reflector and to reflect this light to produce a substantially uniform illumination over a target area.

Preferably, in this lighting head, the first reflector is substantially conical in at least on azimuth. Also, in a preferred form of this lighting head, the output end of the fiber optic bundle has the form of an annulus surrounding the axis of the substantially conical first reflector, so that the output end of the fiber optic bundle forms an off-axis, annularly distributed light source. In yet another preferred form, the first reflector is provided as a plurality of segments concave in both azimuths where each reflector segment is illuminated by a corresponding fiber bundle that acts as a source for its associated reflector segment.

In another aspect, this invention provides an illumination system in which a single input light flux is distributed among a plurality of output fiber bundles or light pipes. This illumination system comprises:

light input means arranged to supply a single beam of light;

at least first and second light output means each comprising a fiber optic bundle or light pipe, the first and second light output means being movable relative to one another and to the light input means; and a light distribution means arranged to receive light from the light input means, to divert a first part of the received light into the first light output means and to divert a second part of the received light into the second light output means.

In another aspect, this invention provides a light pipe which can be used in the aforementioned light distribution means. This light pipe comprises a substantially transparent rod having an axis, and a mirror surface disposed within the rod at an angle to the axis thereof, such that when light is passed axially along the rod, part of this light will be diverted by the mirror surface at an angle to the axis so as to emerge from a side surface of the rod, while the remaining light continues axially along the rod.

In another aspect, this invention provides a fiber optic device which can be used as the aforementioned light distribution means. This fiber optic device comprises:

a first bundle of optic fibers, each of said fibers in said first bundle having an input end and an output end, the input ends of said fibers being arranged to form a first surface extending substantially normal to an axis; and a second bundle of optic fibers, each of said fibers in said second bundle having an input end and an output end, the input ends of said fibers being arranged to form a substantially annular second surface extending parallel to but outside said first surface, and the output ends of the second bundle of fibers being formed into a compact fiber bundle directed away from said axis, the second bundle being movable relative to the first bundle so that the second surface can rotate without restriction about said axis relative to the first bundle.

This invention also provides an illumination system the light output from which is controlled by at least one variable aperture rather than by varying the power input to a light source, thereby enabling the intensity of the light output to be varied without variation in the spectral characteristics thereof. This illumination system comprises:

a first light transmission device selected from the group consisting of light pipes and fiber optic bundles, the first light transmission device having an input end and an output end;

a second light transmission device selected from the group consisting of light pipes and fiber optic bundles, the second light transmission device having an input end and an output end, the input end of the second light transmission device being disposed adjacent the output end of the first light transmission device; and variable aperture means disposed between the output end of the first light transmission device and the input end of the second light transmission device, the variable aperture means being variable to block a varying portion of the light leaving the output end of the first light transmission device from reaching the input end of the second light transmission device, and thereby controlling the intensity of the light leaving the output end of the second light transmission device.

Finally, this invention provides a coupling device intended for coupling light from a high intensity light source into optic fibers which can be damaged by heat. This coupling device comprises:

a window arranged to receive light from the light source, the window reflecting at least part of infra-red radiation received from the light source;

optic fibers having input ends disposed adjacent the window so as to receive light passing through the window; and a heat dissipating means in heat conducting relationship with the input ends of the optic fibers, and thereby serving to remove from said input ends heat generated within said input ends as said input ends receive light passing through the window.

Other advantages and features will become apparent from the following description and claims.

BRIEF DESCRIPTION OF THE DRAWINGS

The structure, operation, and methodology of the invention, together with other objects and advantages thereof, may best be understood by reading the detailed description in connection with the drawings in which unique reference numerals have been used throughout for each part or feature and wherein:

FIG. 8 shows schematically the components of the light mixer/feedback module and variable aperture/shutter module shown in FIG. 1;

FIG. 8A shows schematically an alternative arrangement of light mixer/feedback module and variable aperture/shutter module which can be substituted for that shown in FIG. 8;

FIG. 8B is a cross-section taken along line B—B of FIG. 8A;

DETAILED DESCRIPTION OF THE INVENTION

The accompanying drawings illustrate an illumination system of the present invention which is used for surgical lighting, but which can readily be adapted for other applications in which intense illumination and accurate color rendition are required over a substantial work area or volume.

Figure 1:
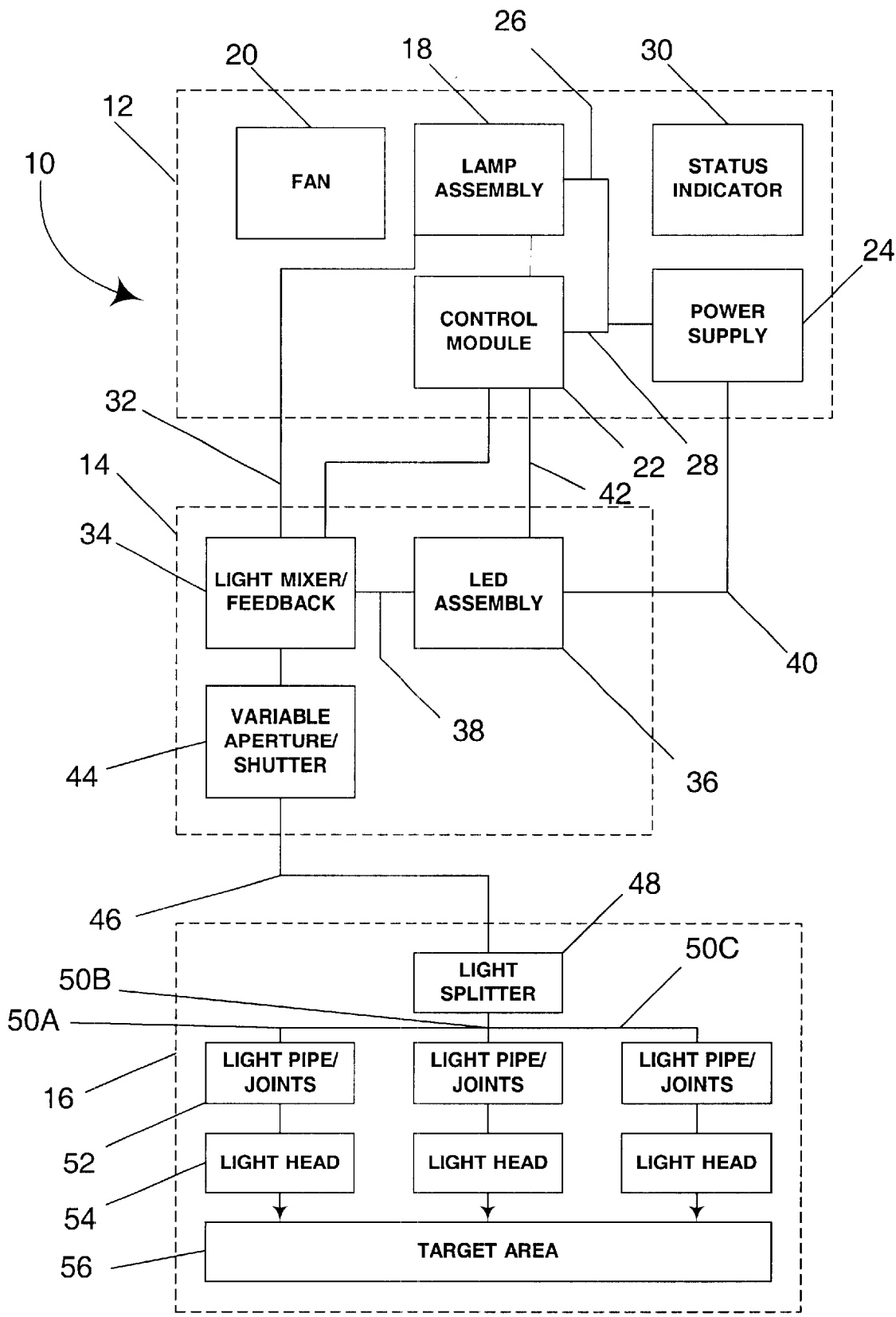
FIG. 1 is a block diagram showing schematically the major components and subsystems of an illumination system of the present-invention used for surgical lighting.

As shown in FIG. 1, the illumination system (generally designated 10) is divided into three main sections, namely a remote section (indicated by the broken rectangle 12), which is preferably located within a lamp housing located within an operating room in an easily accessible wall recess or may be installed in a non-aseptic room adjacent, but separate from, the operating room so that it can be accessed by technicians while a surgical procedure is in progress, a canopy section (indicated by the broken rectangle 14), which is installed in a canopy located directly above the ceiling of the operating room, and an operating room section (indicated by the broken rectangle 16), which is installed within the operating room itself. Neither the division of the illumination system 10 among the three sections 12, 14 and 16, nor the allocation of particular components and subsystems to any one of these three sections is essential to the present invention; as will be apparent from the detailed description below, numerous changes to this division and allocation can be made without departing from the scope of the invention. For example, the canopy section could be eliminated entirely and the components thereof removed to the remote section. Also, the present invention is not restricted to the use of an incandescent source and a light emitting diode source, but could, for example, be practiced with two light emitting diode sources, lasers, or laser diodes (LDs), having different spectral characteristics (provided, of course, that adequate attention was paid to the safety regulations governing high powered LED and laser and LD sources).

The remote section 12 comprises a lamp assembly 18 containing several metal halide lamps, and a fan 20 which is used to cool the lamp assembly 18. The remote section 12 also comprises a control module 22, which controls the output from the lamp assembly 18 in a manner to be described below, a power supply 24, which supplies power to both the lamp assembly 18 and the control module 22 via lines 26 and 28, respectively, and a status indicator 30, which serves to advise technicians of the status of various components of the system 10. Since operating room personnel may also desire to know the status of the system 10, it may alternatively be desirable to locate the status indicator 30 within the operating room section 16, or at least to duplicate information from the status indicator 30 within the operating room section 16.

The output from the lamp assembly 18 is fed via a "halide" fiber optic bundle 32 to a light mixer/feedback module 34 located within the canopy section 14. The light mixer/feedback module 34 also receives the output from a light emitting diode (LED) assembly 36 via an "LED" fiber optic bundle 38. The LED assembly 36 receives power from the power supply 24 via a line 40, and is controlled by control module 22, as indicated by line 42.

The output from the light mixer/feedback module 34 is fed to a variable aperture/shutter module 44 and thence via a fiber optic bundle 46 to a light splitter 48 located within the operating room section 16. The light splitter 48 divides the output from the bundle 46 among three separate fiber optic bundles 50A, 50B and 50C, which pass through separate light pipe/joint assemblies 52 to three separate lighting heads 54. The three lighting heads 54 direct separate beams on to a target area 56 disposed within the operating room. As will be seen later, one of the lighting heads may be replaced by a fiber cable connector port to feed color controlled light to fiber bundles leading to surgical headlamps and/or endoscopes.

Figure 2:
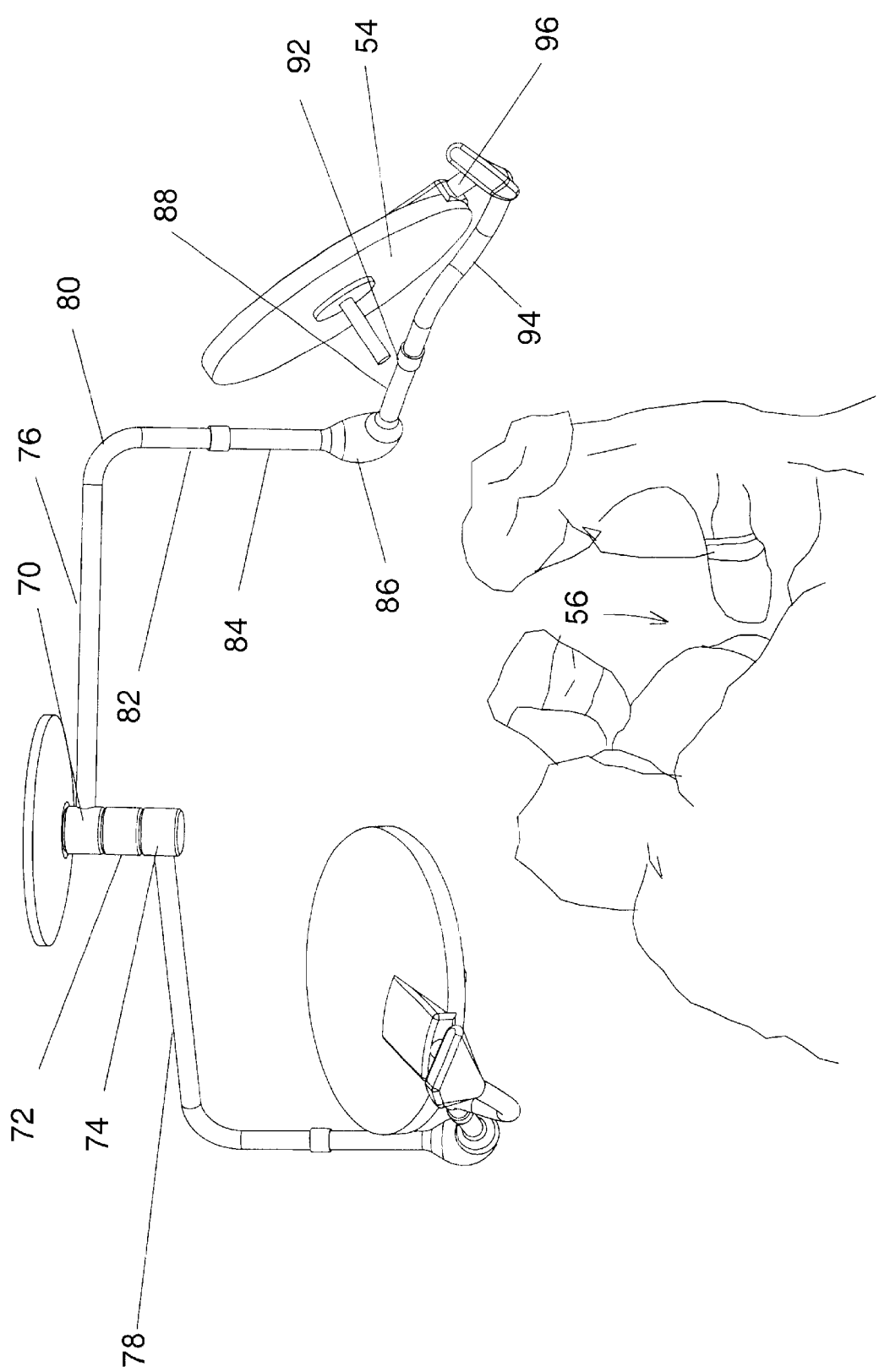
FIG. 2 is a diagrammatic perspective view of the components of the illumination system shown in FIG. 1 which are visible inside the operating room.

The physical form of the various components of the operating room section 16 shown in FIG. 1 may be seen from FIG. 2, which shows a diagrammatic perspective view of the operating room section 16. (For ease of illustration, and to avoid crowding of the drawing, one of the three lighting heads 54 and its associated light pipes and joints are omitted from FIG. 2.). As shown in FIG. 2, the operating room section 16 comprises a vertical cylindrical hub 70, which is mounted on the ceiling of the operating room. Vertical cylindrical sections 72 and 74 are mounted beneath and coaxial with the hub 70, each of these cylindrical sections 72 and 74 carrying a horizontal arm 76 or 78, respectively. The sections 72 and 74 can rotate freely relative to each other and to the hub 70, so that the arms 76 and 78 can extend horizontally in any desired direction from the hub 70. Although not visible in FIG. 2, the light splitter 48 is housed within the hub 70 and sections 72 and 74. The single fiber optic bundle 46 (FIG. 1) carries light from the canopy section 14 through the ceiling of the operating room into the hub 70, where the light splitter 48 (FIG. 1) divides this light between separate fiber optic bundles (not shown in FIG. 2) running within the horizontal arms 76 and 78.

Since the structures attached to arms 76 and 78 are identical, only that attached to arm 76 will hereinafter be described in detail. The horizontal arm 76 is connected via a fixed (non-articulated) elbow 80 to a vertical section 82, which is coaxial with a lower vertical section 84. The lower section 84 can rotate freely relative to the upper section 82, and is connected via a preferably counterpoised, articulating joint 86 to a "horizontal" arm 88 (obviously, the arm 88 may be inclined away from the horizontal depending upon the position of the joint 86). The cross-sections of vertical section 84 and arm 88 are enlarged adjacent joint 86. The arm 88 is coaxial with a further horizontal arm 90 and may be connected thereto by a joint 92, which is a fully rotatable fiber joint of the present invention and which permits free rotation between the arms 88 and 90. The outer end of the arm 90 is connected to an arcuate tube 94, which supports a lighting head 54. As most easily seen on the left hand side of FIG. 2, the arcuate tube 94 is actually connected to a tube 96, which extends radially inwardly into, and supports, the lighting head 54.

As described in more detail below, light entering the fiber optic bundle lying within the horizontal arm 76 passes via the bundle to the joint between the vertical sections 82 and 84, where it enters a second fiber optic bundle which extends through the section 84, the joint 86, the arms 88 and 92, the arcuate tube 94 and the radial tube 96, finally emerging into the lighting head 54, when it is directed on to the target area 56 (FIGS. 1 and 2). The free rotation of the arm 76 relative to the hub 70, together with the free rotation between the vertical sections 82 and 84 and that of the joint 92, and the ability of the lighting head 54 to pivot about the radial tube 96, give the lighting head 54 complete freedom of movement. Furthermore, the operating room section of the illumination system is sufficiently light in weight so that it can readily be manipulated manually by operating room personnel, no power operation being required.

Before a detailed description of the various components of the remote and canopy sections, 12 and 14, respectively is given, it is believed desirable to explain the design philosophy behind the light generating system of the present illumination system. As already discussed, a surgical illumination system must produce light with a proper CCT and a proper CRI. Although metal halide lamps, such as those used in the lamp assembly 18 (FIG. 1) are efficient light sources, their output is biased towards the blue end of the visible spectrum. Furthermore, the already inadequate red light intensity provided by these metal halide lamps is further diminished as the light passes through the various fiber optic bundles and light pipes used in the present apparatus, since these bundles and light pipes are formed of plastic materials which tend to selectively absorb red light. Accordingly, it is necessary to mix the light from the metal halide lamps with light which is biased towards the red end of the visible spectrum, and in the present apparatus such red-biased light is provided by the LED assembly 36 or, alternatively, by an LD assembly. The apparatus must blend these two light sources to produce a completely homogeneous output, since even slight variations in color or intensity of illumination within the target area (i.e., the operating site) are unacceptable in a surgical lighting system. Furthermore, since the spectral output from lamps may vary as the lamps age, the illumination system desirably provides some means by which the actual light output can be sampled and the proportions of light from the two sources used can be varied to provide a final light output accurately conforming to the desired CCT and CRI. Finally, the illumination system desirably allows the intensity of illumination of the target areas to be varied substantially (since, for example, more light may be required for a surgical procedure carried out deep within a body cavity than for one carried out on the surface of the skin) without significant change in the CCT and CRI of the light; such variation in light intensity should be achievable without changing the power input to the metal halide lamps in the lamp assembly 18, since varying the power input to metal halide lamps results in substantial changes in the spectral characteristics of the light output therefrom.

In the present illumination system, the foregoing objectives are achieved in the following ways. Light from each of the lamps within the lamp assembly 18 is passed through a variable aperture and then into the input end of fiber optic bundle 32 (See FIG. 1). Similarly, light from the LED assembly 36 is introduced into the input end of bundle 38. Within the light mixer/feedback module 34, the output ends of the fibers of the two bundles 36 and 38 may be randomly intermingled as needed to form a single fiber optic bundle, the output from which is essentially the sum of the inputs to the two bundles. The light exiting the combined bundle is received into an optical homogenizer, in the form of a multimode light pipe, which mixes the light to ensure that a truly homogeneous light flux is produced. The resultant light flux is sampled to determine if it has the correct CCT and CRI, and if not, the light mixer/feedback module 34 sends a signal to the control module 22 to adjust the LED assembly 36 to vary the proportion of light from this light assembly used to produce the final light flux. (Such real-time feedback and control of the lamp assembly 18 is strictly an optional feature of the present apparatus, and may not be needed in many cases; in practice, depending upon what variations in CCT and CRI are permissible, the stability of the outputs from the halide lamps and the LED assembly used may be sufficient to permit the system to run "open loop", i.e., the mixed output from the light mixer/feedback module 34 may be sampled once, and the system adjusted to its optimum output and thereafter left to run for many hours until a recalibration of the output is deemed desirable, for example, when it is necessary to replace a burned-out lamp.) Finally, the intensity of the mixed light leaving the light mixer/feedback module 34 is adjusted by the variable aperture/shutter 44, and the light is then passed to the operating room section 16. Alternatively, sources other than LEDs can be used. For example and without limitation, laser diodes may be used with or instead of LEDs.

Figure 3:
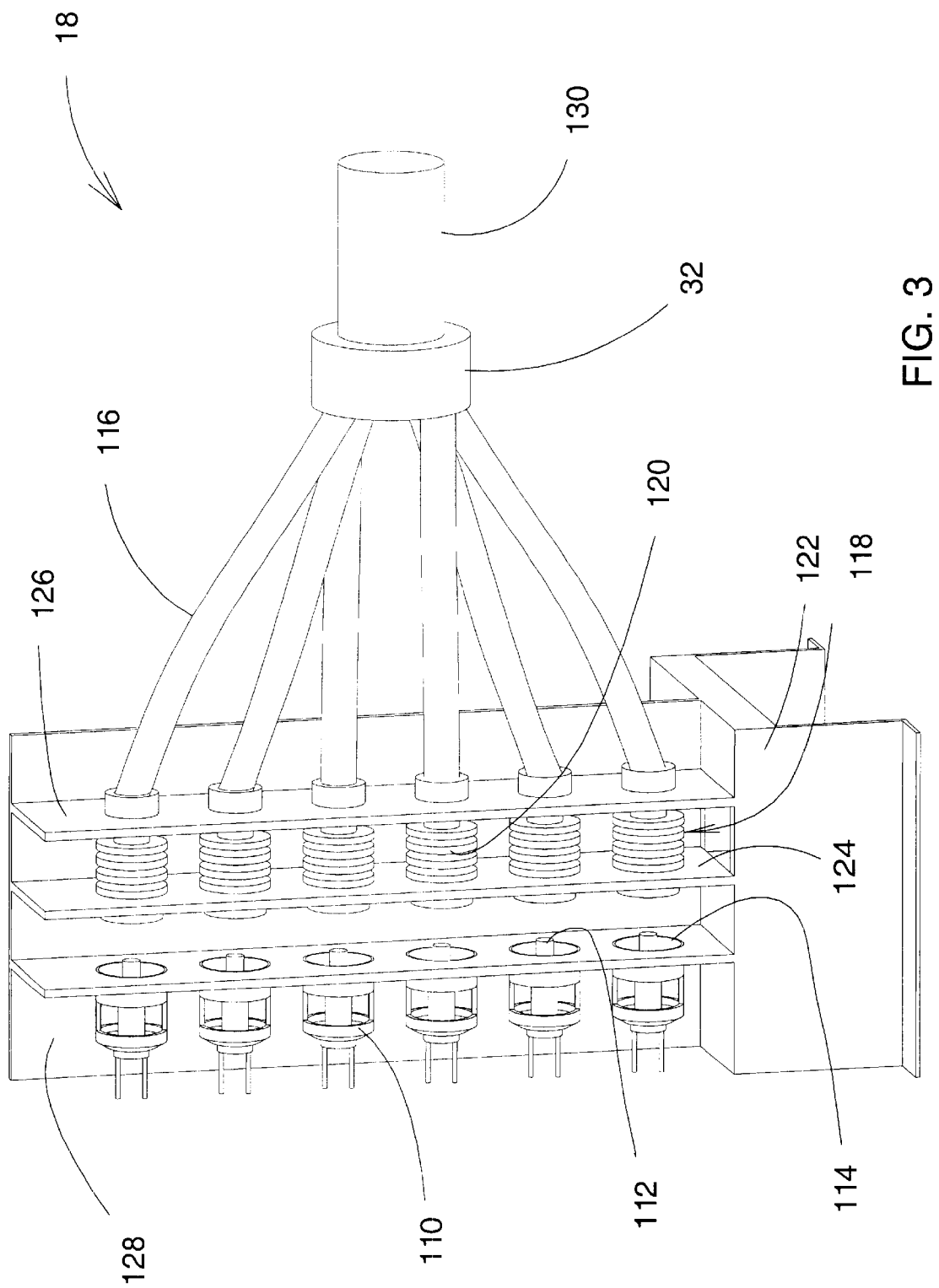
FIG. 3 is a three quarter view of the halide lamp assembly shown in FIG. 1 from in front and to one side.

FIG. 3 shows a three quarter view of the lamp assembly 18 from in front and to one side. As shown in FIG. 3, the lamp assembly 18 comprises six separate metal halide arc lamps (generally designated 110) arranged in a single vertical column, each lamp 110 comprising a bulb 112 and an associated reflector 114. Each reflector 114 is electroformed and provided with a high efficiency dichroic coating which largely rejects (i.e., does not reflect) both ultraviolet and infra-red radiation emitted by its associated bulb 112. Each reflector 114 is substantially part ellipsoidal, being shaped to optimize coupling of the light from the associated bulb 112 into a fiber optic bundle 116, formed from a plastic, a separate bundle 116 being provided for each lamp 110. The input end of each bundle 116 is held within a coupling cell 118, which serves to limit heat generated within the bundle by absorption of the radiation from the bulb 112, and to dissipate the heat generated sufficiently quickly to prevent damage to the plastic fibers within the bundle. The coupling cells 118 are provided with cooling fins 120 and the fan 20 (see FIG. 1—the fan is not visible in FIG. 3) is disposed within a hollow base portion 122 of the lamp assembly 18 and blows air vertically upwardly over the cooling fins to assist in the dissipation of heat from the coupling cells 118. To direct the air flow from the fan 20 over the coupling cells 118, the lamp assembly 18 is provided with side plates 124 and 126, a rear plate 128 and a front plate (removed from the lamp assembly in FIG. 3 to show the interior details of this assembly); together these four plates define an elongate rectangular channel within which are disposed to coupling cells 118.

The bulbs 112 are pre-aligned to slide directly into their associated reflectors 114 and maintain the focus position at which the bulb 112 most efficiently couples to its associated bundle 116. If desired, each lamp reflector 114 may be equipped with cooling fins to dissipate heat and thus increase lamp life.

The metal halide lamps 110 and the bundles 116 used in the lamp assembly 18 may be readily available commercial units. For example, the lamps 110 can be 3200 lumen Welch Allyn 50 Watt halide lamps (available from Welch Allyn, Lighting Equipment, Skaneateleles, N.Y. or Osram VIP270 metal halide lamps (available from Osram Sylvania, Danvers, Mass.), while the bundles 116 are conveniently Toray Acrylic Fiber Bundle (available from Toray, Japan).

The six separate bundles 116 leaving the coupling cells 118 are combined into the single bundle 32 shown in FIG. 1, which is protected from mechanical damage by a plastic conduit 130 as the bundle 32 runs the substantial distance (typically about 30 feet, approximately 9 meters) from the lamp assembly 18 to the light mixer/feedback module 34 (FIG. 1) within the canopy section 14 of the illumination system. This distance may vary depending on the separation architecture between the mixer/feedback module 34 and the lighting assemblies.

Figure 4:
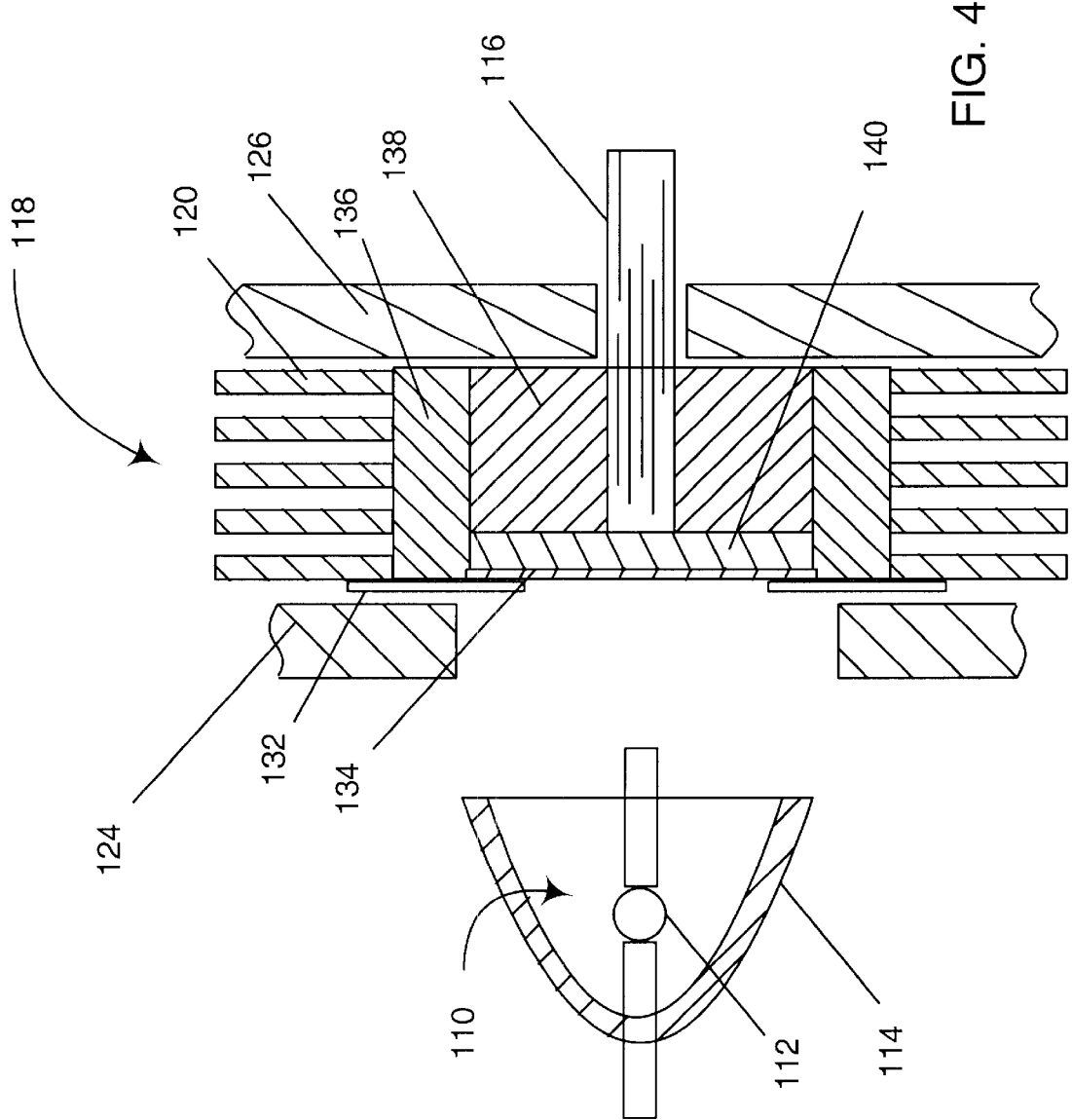
FIG. 4 is a schematic section through one of the lamps shown in FIG. 3 and its associated coupling cell.

FIG. 4 is an enlarged view, mostly in section, showing the details of one of the lamps 110 shown in FIG. 3 and its coupling cell 118 and associated apparatus. It will be seen from FIG. 4 that a variable aperture 132 may be disposed between the side plate 124 and the coupling cell 118. Such a variable aperture 132 is controlled by the control module 22 (FIG. 1) and serves to regulate the amount of light from the lamp 110 entering the coupling cell 118, thereby varying the proportion of light from the lamps 110 in the final mixed light output in the manner already described. The variable aperture 132 may also, of course, be used, inter alia, to compensate for changes in the brightness of the lamp 110 as the lamp ages. Alternatively, this function may be accomplished electronically.

The coupling cell 118 comprises a sapphire window 134 which allows light to enter the cell 118, and which is fixed in position within an axial bore formed within the hollow metallic cylindrical body 136 of the cell 118. Sapphire is used to form the window 134 because of its high transparency from the UV through the mid-IR region of the spectrum and its high thermal conductivity. It is preferably provided with a dielectric coating that is highly reflective of ultraviolet and infrared radiation from the lamp 110, and thus limits the amounts of unwanted non-visible radiation entering the cell 118. Having high thermal conductivity, sapphire operates to dissipate heat. For this purpose, good thermal contact between the sapphire window 134 and the body 136 is ensured by having the edge of the window 134 metallized and then soldered (the soldering is not shown in FIG. 4) to the body 136 or affixed with conductive silica epoxy.

As shown in FIG. 4, the input end of the fiber bundle 116 is secured within a metal ferrule 138, which in turn is soldered or epoxied within the axial bore of the body 136. Between the window 134 and the ferrule 138 is disposed a layer of adhesive 140, which adheres firmly to both the window and the ferrule, and which is chosen to have as high a thermal conductivity as possible, and to be essentially non-absorptive of the radiation passing through the window 134.

The cell 118 is designed to allow efficient absorption by the input end of the fiber bundle 116 of the radiation from the lamp 110 without permitting the temperature of this input end to become so high that there is risk of damage to the acrylic plastic fibers forming the bundle. As already mentioned, the window 134 is designed to reject a large proportion of the non-visible radiation which would otherwise be absorbed within the input end of the bundle 116 and generate heat therein; thus, the window 134 reduces the amount of heat generated within the input end of the bundle 116. Furthermore, the ferrule 138, the adhesive layer 140 and the window 134 all serve the remove heat rapidly from the input end of the bundle 116, thereby limiting the temperature rise thereof. Finally, the cooling fins 120 (which, as shown in FIG. 4, have the form of a series of parallel radial flanges extending outwardly from the cylindrical body 136), together with the air flow provided by the fan 20 (FIG. 1) effect rapid removal of heat from the cell 118. Thus, the cell 118 enables the high intensity radiation from the lamp 110 to be efficiently channeled into the bundle 116 without damage to the plastic fibers forming this bundle. Again, it may be preferable to randomize fibers within bundles wherever sensible throughout the fiber delivery system so that a lamp failure has minimal impact on output uniformity.

Figure 5:
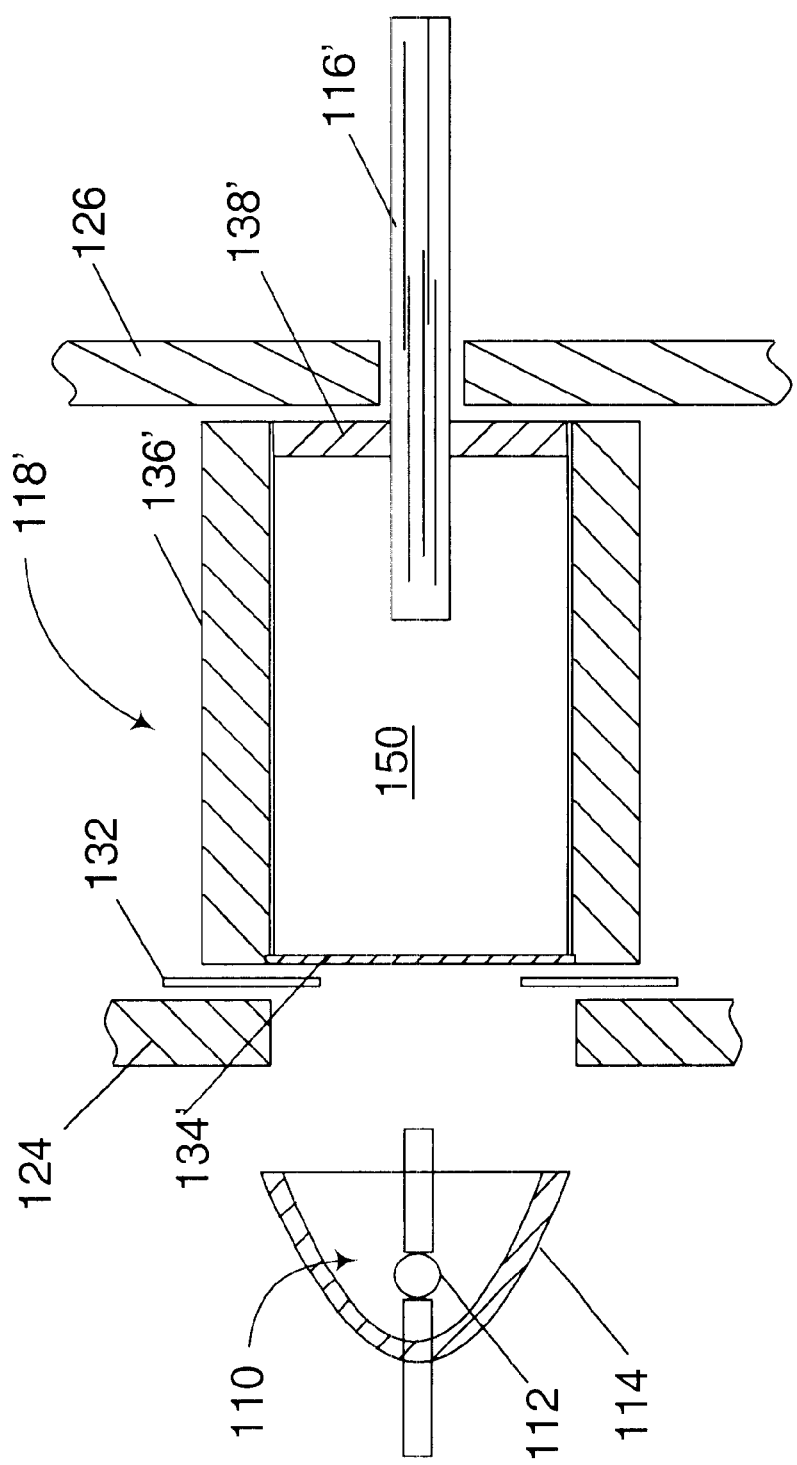
FIG. 5 is a schematic section similar to FIG. 4 but showing an alternate type of coupling cell.

FIG. 5 shows a view, similar to that of FIG. 4, of an alternate coupling cell 118' which can be used in place of the cell 118 shown in FIG. 4. The cell 118' is used in conjunction with a lamp 110, side plates 124 and 126 and a variable aperture 132, all of which can be identical to the corresponding components shown in FIG. 4. However, the coupling cell 118' comprises a hollow cylindrical body 136' which is of greater axial length than the body 136 shown in FIG. 4; the body 136' also lacking cooling fins, though such fins could be added if desired. Like the body 136 shown in FIG. 4, the body 136' shown in FIG. 5 has an axial bore. The end of this bore, facing the lamp 110, is closed by a window 134', which need not be formed of sapphire, but which is provided on its outer surface with a heat reflecting dichroic coating to reduce the amount of ultraviolet and infrared radiation entering the cell 118'. The opposed end of the axial bore is closed by a metal plate 138', into which is secured a fiber bundle 116'. However, as shown in FIG. 5, the metal plate 138' has a much shorter axial length than the metal ferrule 138 (FIG. 4), and the bundle 116' extends through the plate 118' for a substantial distance into the central portion of the cell 118'.

The cell 118' lacks the adhesive layer 140 (FIG. 4) of the cell 118. Instead, the interior of the housing 136' is filled with a heat transfer and absorbing liquid 150, which is typically aqueous. The liquid 150 may incorporate color absorbing or fluorescent substances to aid in color correction of the output from the lamp 110; the liquid 150 could also include, for example, infrared dyes to further reduce the amount of infrared radiation reaching the bundle 116'. Some non-visible radiation still reaches the input end of the bundle 116', however, and is absorbed there, thus generating heat within the input end of the bundle. The fluid 150, which completely surrounds the input end of the bundle 116', serves to conduct heat away from the input end, thus preventing the temperature of this input end from reaching a level which adversely affects the plastic fibers forming the bundle 116'. Although not shown in FIG. 5, desirably the housing 136' is provided with ports through which the liquid 150 can be circulated out of the housing 136' and passed through a heat exchanger to cool the liquid.

If no precautions are taken, the liquid 150 tends to wick between the fibers of the bundle 116', thus adversely affecting the optical properties of the bundle. To prevent such wicking, it is desirable that the gaps between the individual fibers of the bundle 116' be filled with a material (not shown in FIG. 5), such as a silicone, which is not wetted by the liquid 150.

Figure 6:
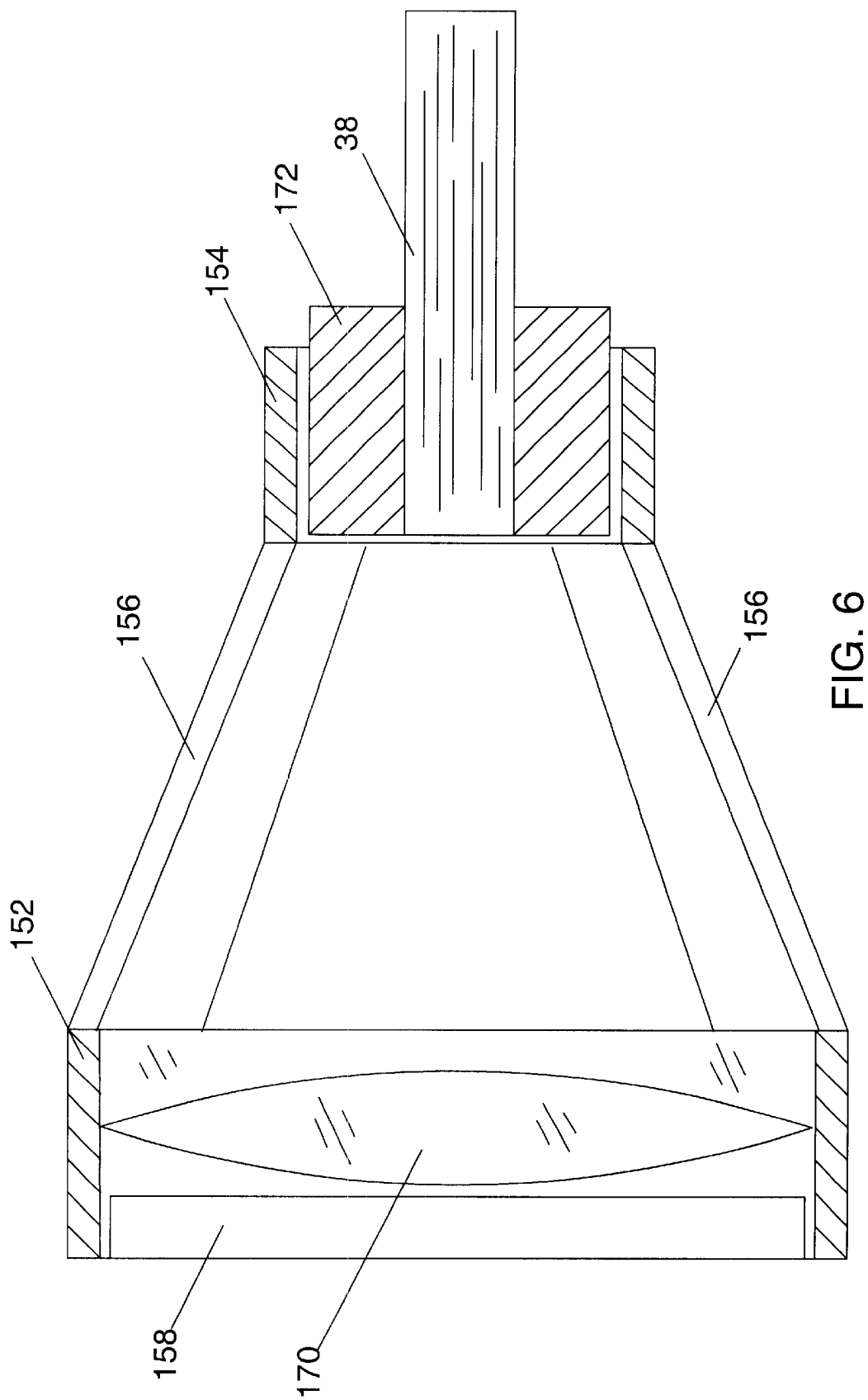
FIG. 6 is a side elevation, partially in section, of the light emitting diode assembly shown in FIG. 1.

The construction of the LED assembly 36 shown in FIG. 1 will now be explained in detail with reference to FIGS. 6 and 7. As shown in FIG. 6, the LED assembly 36 comprises a support member having a main collar 152 and an auxiliary collar 154 which are connected by three link members 156, only two of which are visible in FIG. 6. Within the main collar 152 is mounted an LED module 158, which comprises a two dimensional array of LED's, one of which (generally designated 160) is shown enlarged in FIG. 7. From FIG. 7, it will been seen that each LED 160 comprises a light emitting diode 162 provided with power leads 164 and 166, and a lenslet 168 which forms the light from the diode 162 into a substantially collimated beam.

Also mounted within the main collar is a focussing lens 170, which focuses the light from the LED module 158 on to the input end of the fiber optic bundle 38 (cf. FIG. 1). Lens 170 is preferably designed to optimize coupling efficiency through matching of numerical apertures (NA) and image magnification. The bundle 38 is mounted within a metal ferrule 172, which is itself fixedly mounted within the auxiliary collar 154.

From the foregoing description, it will be seen that the LED assembly 36 serves to efficiently couple the light from the LED module 158 into the bundle 38. Although the LED assembly 36 shown in FIG. 6 does not provide any variable aperture for regulating the intensity of the output from the assembly, it will be apparent to persons skilled in optics that such a variable aperture could readily be incorporated if desired by inserting, for example, a variable aperture between the LED module 158 and the lens 170. Preferably, the current to the LEDs or other sources may be varied to control their intensity.

Figure 7:
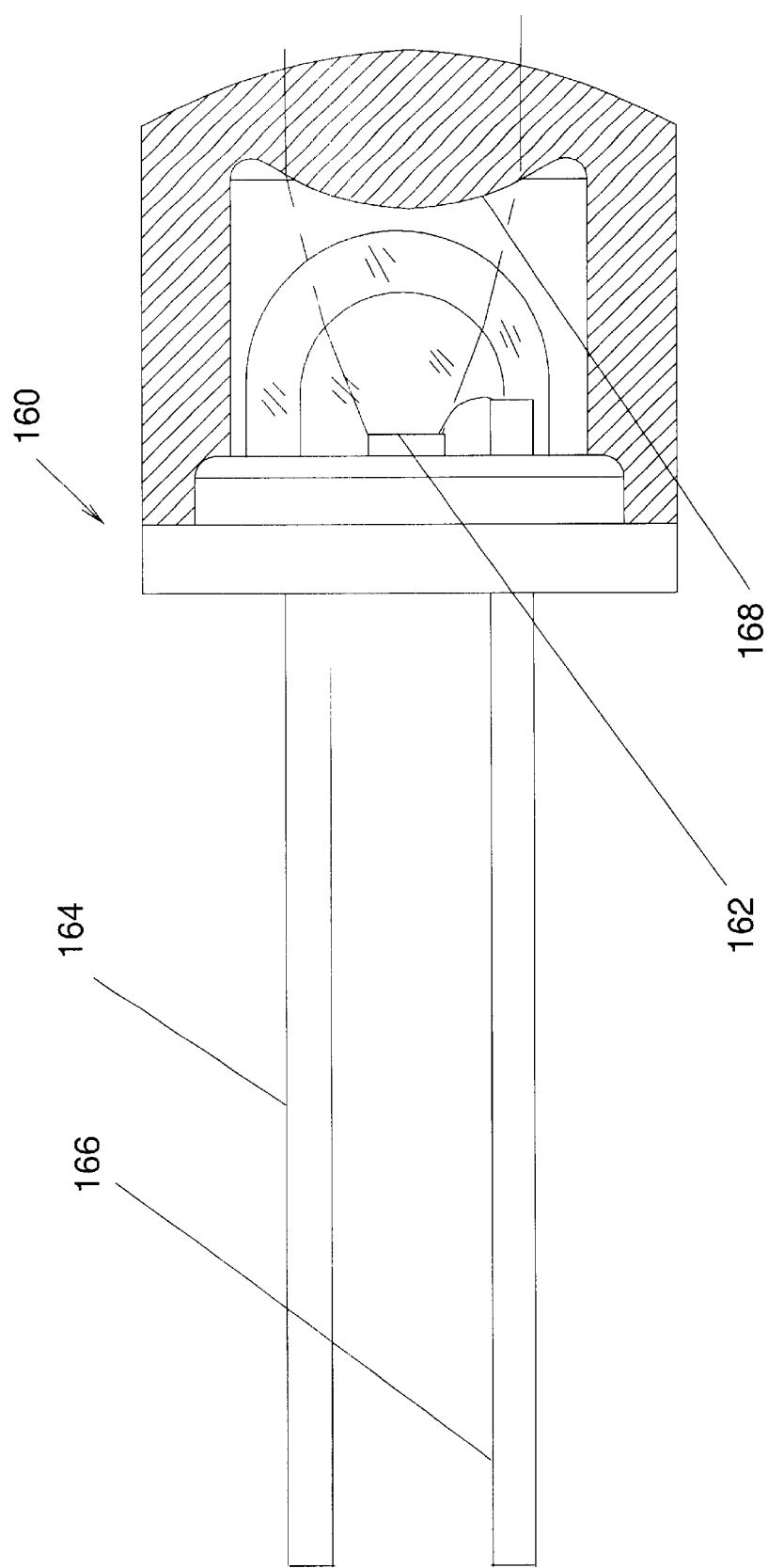
FIG. 7 is a side elevation view, partially in section, of one of the light emitting diodes used in the assembly shown in FIG. 6.

The type of LED assembly shown in FIGS. 6 and 7 can give very satisfactory performance in the present apparatus, but does have the disadvantage that it requires providing wiring to a large number of individual LEDs. Modern semiconductor fabrication techniques typically produce LED's in the form of large arrays upon silicon wafers, and by appropriate cutting of the wafers, one can obtain large arrays of LEDs which are easier to provide with the necessary conductors than are individual LEDs such as those shown in FIGS. 6 and 7. Accordingly, it is considered that it may be advantageous to replace the individual LEDs shown in FIGS. 6 and 7 with such pre-formed arrays of LEDs in order to simplify the wiring problem. Also, the necessary cooling of the LEDs is easier to arrange when such pre-formed arrays of LEDs are used.

FIG. 8 shows schematically the components of the light mixer/feedback module and variable aperture/shutter module shown in FIG. 1. As shown in FIG. 8, the fiber optic bundle 32 (see FIGS. 1 and 3) carrying light from the lamp assembly 18 and the fiber optic bundle 38 (see FIGS. 1 and 6) carrying light from the LED assembly 36 are combined to form a single bundle 180, in which the individual fibers from the bundles 32 and 38 are randomly distributed. The combined bundle 180 is joined by means of a butt joint to an optical homogenizer in the form of a multimode light pipe 182 formed from a single rod of transparent plastic material; the length of the light pipe 182 is reduced in FIG. 8 for ease of illustration. (Those skilled in the art of optical fibers will be aware of various conventional techniques for reducing light losses from butt joints such as that between the bundle 180 and the light pipe 182, for example the provision of a reflective collar surrounding the butt joint; accordingly such conventional techniques for reducing light loss from joints will not be further discussed herein.) The light pipe 182 intermingles the outputs from the individual fibers in the combined bundle 180 so that the output from the homogenizer is (except for losses within the fiber optic bundles and at the various interfaces, the sum of the inputs to the bundles 32 and 38 from the lamp assembly 18 and the LED assembly 36, respectively. As previously mentioned, the appropriate mixing of the blue-biased light from the lamp assembly 18 with the red-biased light from the LED assembly 36 produces light having a proper CCT and CRI for surgical lighting.

Also as already mentioned, in some cases the outputs from metal halide lamps and LED's is sufficiently stable so that once the proper balance between the metal halide lamps and the LED's has been set by adjusting the variable apertures 132 (FIG. 4) or current to LEDs, the lighting from the illumination system 10 will maintain a proper CCT and CRI for an extended period. If, however, it is desired to provide a feedback loop to enable real-time adjustment of the balance from the two light sources 18 and 36, this can be achieved using the apparatus shown in FIG. 8. As shown in that Figure, the light pipe 182 is provided, near its outlet end, with a pick-off member 184, which is inserted into a small radial bore formed in the light pipe, such that the pick-off member 184 directs a sample of light from the axis of the light pipe 182 into a spectral analyzer 186. The output from this spectral analyzer 186 is fed to a computing unit 188, which calculates the CRI of the light from the spectral data supplied by the analyzer 186; although the CRI should in theory be calculated in terms of an average color shift of eight standard colors, as discussed above, in practice a simpler calculation, involving measurement of spectral intensity at a smaller number of wavelengths, for example five or six, may often prove sufficiently accurate, and thus the present invention is not limited to using the strict CRI calculation within the computing unit 188. The output from the computing unit 188 is fed to a color mixing module 190, which may control (via the control module 42 shown in FIG.

1) the settings of the variable apertures 132 (FIG. 4) of the lamp assembly 18; as previously noted. Control of lamp output by variable apertures in this manner, rather than by controlling the power input to the lamps, ensures that the adjustment of lamp output is not accompanied by the spectral changes normally experienced when lamp output is controlled by varying power input. However, current to the LEDs may also be varied for this purpose.

The output end of the light pipe 182 is disposed adjacent the input end of the fiber optic bundle 46 (cf. FIG. 1) which carries the light from the variable aperture/shutter module 44 to the light splitter 48 disposed within the operating room section of the illumination system 10. A variable aperture 192 is disposed between the light pipe 18 and the bundle 46, this variable aperture 192 being used to control the overall light intensity provided by the illumination system. Typically, the variable aperture 192 is power operated and under the control of the control module 22 (FIG. 1).

In an alternative apparatus shown in FIG. 8A, the bundles 32 and 38 are combined to form a bundle 180'. However, the fibers from the bundles 32 and 38 are not randomized within the combined bundle 180', and all the necessary homogenization of the light occurs within the light pipe 182; this approach is generally preferred because is greatly simplifies assembly of the bundles 32, 38 and 180'. As in the apparatus shown in FIG. 8, the combined bundle 180' is joined by means of a butt joint to an optical homogenizer in the form of a multimode light pipe 182'. Whereas the light pipe 182 shown in FIG. 8 is normally a simple cylindrical rod, the light pipe 182' shown in FIG. 8A has the form of a regular polygonal prism. Good results have been obtained from an undecagonal prism having eleven lengthwise facets on its circumferential surface as shown in FIG. 8B; the number of facets is not critical, but is chosen on the basis of the diameter needed to couple to all of the fibers in the upstream bundle 180', the length of the light pipe 182' and so that the area of mismatch with the nominally circular downstream bundle 46 is minimal. Those skilled in the art of designing optical systems will be aware that in such a polygonal prismatic light pipe of given length and maximum cross-section, there is an optimum number of facets which will produce the most effective mode mixing within the light pipe, and obviously the light pipe 182' should be designed with the optimum number of facets.

The use of a polygonal prismatic rather than cylindrical light pipe 182' is also advantageous in securing uniform distribution of light among the fibers of the bundle 46 which receives the output from light pipe 182'. Those skilled in optics are aware that when light passes along a lengthy cylindrical light pipe, adjacent the output end of the pipe the intensity of the light varies radially of the pipe. The resultant radial variation of light intensity within the light pipe is undesirable, since it produces a corresponding radial variation in light intensity within the fibers of the bundle 46, and may produce undesired variations in the light intensity within the area to be illuminated. In effect, the radial variation in intensity within a cylindrical light pipe 182 may create zones within bundle 46 receiving less light than others. Use of a polygonal prismatic light pipe 182' reduces or essentially eliminates any radial variation of light intensity at the output end of the light pipe, thus rendering more uniform the intensity of light fed to the various fibers within bundle 46.

The two approaches to homogenization of light within the bundles 32, 38 and 180 and the light pipes 182 and 182' described above with reference to FIGS. 8 and 8A respectively are not, of course, mutually exclusive. Depending upon the specific apparatus and degree of uniformity of light output desired, one could effect partial or complete randomization of the fibers with the combined bundle 180 and still use a polygonal prismatic or similar light pipe 182' to effect further homogenization of the light and avoid the problems associated with a cylindrical light pipe, as discussed above.

The apparatus shown in FIG. 8A also differs from that shown in FIG. 8 in the construction of its feedback arrangement. The light pipe 182' is provided, near its outlet end, with two pick-off members 184' and 185'. Each of these pick-off members 184' and 185' has the form of a cylindrical rod approximately 1 mm in diameter and terminated at its lower end by a slanting facet cut at 45° to the axis of the cylindrical rod; these slanting facets are aluminized so that each pick-off member diverts a sample of the light passing along the light pipe 182' along the axis of its pick-off member 184' or 185'. The pick-off members 184' and 185' are placed within the light pipe 182' using known techniques; preferably two radial bores are formed in the light pipe, and the pick-off members, with the slanting faces already aluminized are secured within these radial bores using index matching cement. The numerical apertures of pick-off members 184' and 185' are preferably made greater than 0.48.

The output from pick-off member 184' falls directly on a detector 189A, but the output from pick-off member 185' first passes through a filter 187 and then falls on a detector 189B. The detector 189A thus receives a sample of all the light passing along the light pipe 182'. However, the filter 187 is arranged to pass only the red portion of the visible spectrum (numerous appropriate filter materials are known to those skilled in the art, the presently preferred material for the filter 187 being Schott RG610 glass, so that the detector 189B receives only red light passing along light pipe 182', this light originating primarily from the LED assembly 36 (FIG. 1).

The detectors 189A and 189B are photovoltaic detectors, preferably with an active area approximately 5 mm in diameter when using 1 mm diameter pick-off members 184' and 185. The output from detector 189A is fed to an amplifier 191A, with variable gain, while the output from detector 189B is fed to a second amplifier 191B, with fixed gain. The outputs from the amplifiers 191A and 191B are fed to the two inputs of a differential amplifier 193, the output from which is proportional to the difference between its two inputs, i.e., to the difference between the outputs from the amplifiers 191A and 191B. The output from the differential amplifier 193 is fed to a color mixing module 195, which may control (via the control module 42 shown in FIG. 1) the settings of the variable apertures 132 (FIG. 4) of the lamp assembly 18, as previously noted. The color mixing module 195 controls the relative outputs from the lamp assembly 18 and the LED assembly 36 until the difference between the outputs of the two detectors 189A and 189B is driven to zero; thus, the ratio of the light incident on the two detectors 189A and 189B is controlled so that signals from the detectors are inversely proportional to the ratio of their amplifier gains.

To show the manner in which the equipment illustrated in FIG. 8 controls the output from the lamp assembly 18 or the LED assembly 36, the following simplified analysis is presented. It will be apparent to those skilled in the art that a similar analysis could be used if the amplifiers 191A and 191B were interchanged, so that it would be the output from the detector 189B which was subject to the variable gain. The following analysis assumes that both detectors 189A and 189B have identical and uniform spectral power distributions (SPD's).

Let:

$P_L$ be the lamp power incident on the first detector 189A;

$P_D$ be the LED power incident on each detector (this power is the same for both detectors;

k be the lamp power incident on the second detector 189B;

$S_1$ and $S_2$ be the signals from the first and second detectors respectively;

R be defined as $S_1/S_2$; and r be defined as $P_L/P_D$.

Then:

$$S_1 = P_L + P_D \quad (1)$$

$$S_2 = kP_L + P_D \quad (2)$$

Substituting for $S_1$ and $S_2$ in Equations (1) and (2):

$$R = (P_L + P_D)/(kP_L + P_D) \quad (3)$$

$$R = ([P_L/P_D] + 1)/(k[P_L/P_D] + 1) \quad (4)$$

$$R = (r+1)/(kr+1) \quad (5)$$

$$r = (R-1)/(1-k+R) \quad (6)$$

Thus, if the signal ratio R is kept constant, then r remains constant. (Note that, from Equation (6), if k=1 no useful information is obtainable!)

To see the effect of k on system performance, define a new variable R' as the ratio of amplifier gains as discussed above. Assume upon an initial calibration:

R=R'; and r=3.

Next assume that R' increases by 1 percent. The following Table shows how the value of k affects r for this 1 percent increase in R':

| K   | r    | % error in r |
|-----|------|--------------|
| 0   | 3.04 | 1.32         |
| 0.1 | 3.06 | 1.90         |
| 0.2 | 3.08 | 2.62         |
| 0.3 | 3.11 | 3.55         |
| 0.4 | 3.15 | 4.78         |
| 0.5 | 3.21 | 6.49         |
| 0.6 | 3.30 | 9.03         |
| 0.7 | 3.46 | 13.19        |
| 0.8 | 3.81 | 21.25        |
| 0.9 | 5.31 | 43.53        |

For the present preferred apparatus Welsh Allen lamps and a 10 meter SPD, and the preferred Schott RG610 filter material, k is approximately 0.16, and at this k value, a 1 percent change in R' corresponds to a change in r of less than 2.6 percent. Since experimentally it has been determined that with the Welsh Allen lamp and LED's operating at 632 nm, the system gives satisfactory CCT and CRI if r is held constant to ±15 percent, the design allows for considerable variation in R while still maintaining satisfactory output.

If the SPD's of the two detectors 189A and 189B are not uniform and different from one another, Equation (3) becomes:

$$R = (aP_L + bP_D)/(dkP_L + cP_D) \quad (7)$$

where a, b, c and d are constants, while Equation (6) becomes:

$$r = (b - Rc)/(Rkd - a) \tag{8}$$

Again, if R is held constant, r will remain constant. Furthermore, error analysis indicates that for:

k=0.2
r=3
a=1
b=1.5
c=1.2 and
d=1.8, a 1 percent change in R produces a 5 percent change in r, again well within tolerable limits.

The apparatus shown in FIG. 8A is not intended for initial calibration of the apparatus, but only for "running adjustment" of the light output as the lamps and LEDs ago, or other factors cause minor changes in light output, For initial calibration, it is generally desirable to use a spectral analyzer adjacent the output end of light pipe 182' and carry out a detailed spectral analysis in order to ensure optimum adjustment of the CCT and CRI of the output light. In carrying out such a spectral analysis, it should be noted that, although the CRI should in theory be calculated in terms of an average color shift of eight standard colors, as discussed above, in practice a simpler calculation, involving measurement of spectral intensity at a smaller number of wavelengths, for example five or six, may often prove sufficiently accurate, and thus the present invention is not limited to using the strict CRI calculation to effect calibration of light output. It will be appreciated that the sampling bandwidth should be sufficiently small to capture any source lines that are prominent enough to contribute significantly to color content.

The output end of the light pipe 182' is disposed adjacent the input end of the fiber optic bundle 46, associated with a variable aperture 192; these components operate in exactly the same manner as described above with reference to FIG. 8.

The construction and operation of the splitter 48 shown in FIG. 1 will now be described with reference to FIGS. 9–12. As discussed above with reference to FIGS. 1 and 2, the purpose of the splitter 48 is to divide the light entering the operating room section 16 (FIG. 1) of the illumination system 10 via the single fiber optic bundle 46 among three separate fiber optic bundles which pass along the arms 76, 78 (FIG. 2—it will be recalled that the third arm and associated apparatus are omitted from FIG. 2) and eventually transmit light to the lighting heads 54.

Figure 12:
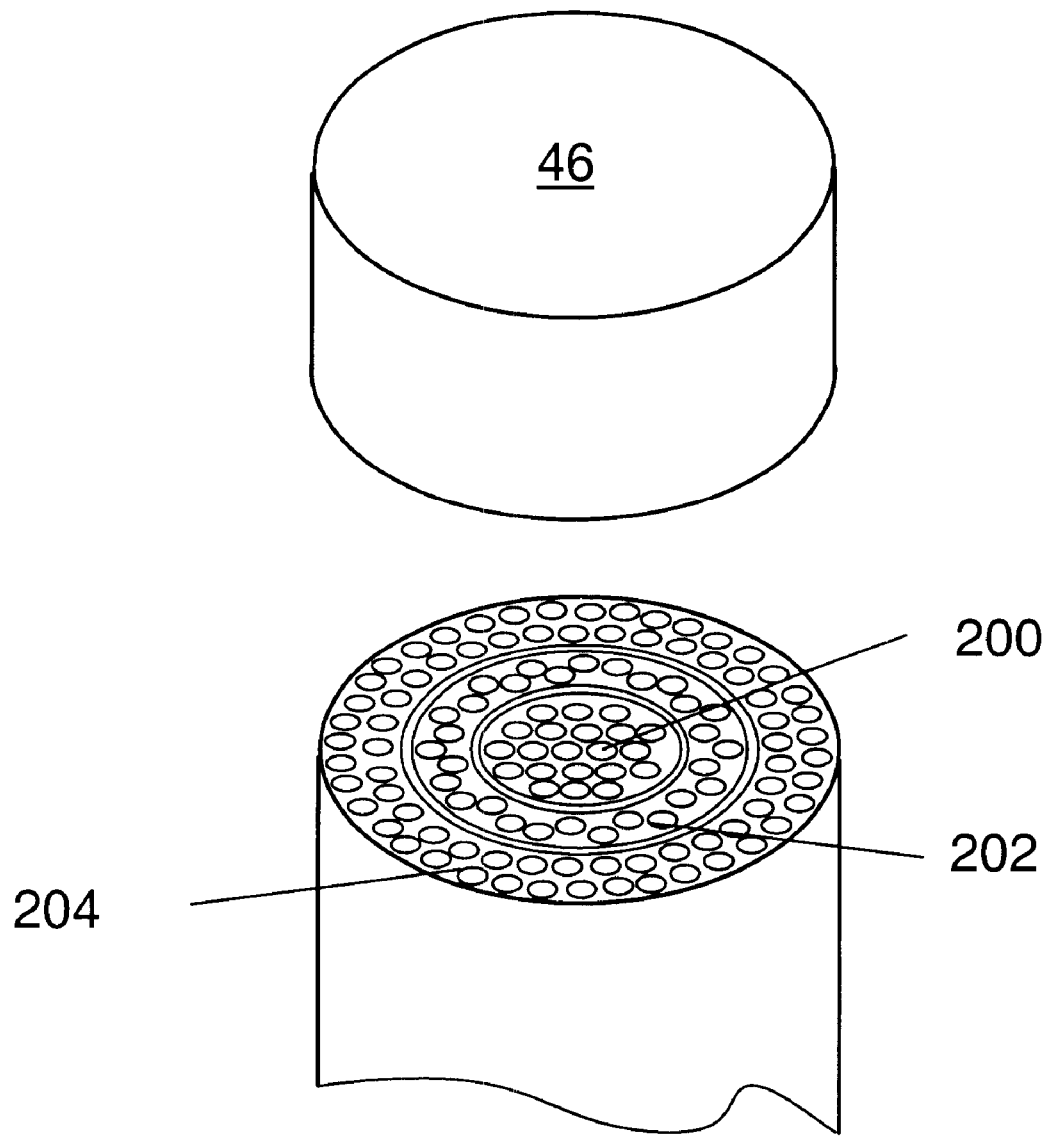
FIG. 12 is a schematic three quarter view, from above and to one side, of part of the upper end of the splitter shown in FIGS. 9–11, and illustrates the manner in which the light entering the splitter via a single fiber optic bundle is divided among three output bundles.

The general manner in which this three-way splitting of light is achieved is most easily seen from FIG. 12. As shown in FIG. 12, the output end of fiber optic bundle 46 is butt jointed (the spacing between the bundle 46 and the adjacent components of the splitter is greatly exaggerated in FIG. 12 to show details of these adjacent components) to a "concentric ring" arrangement, the central core of which comprises a central circular fiber optic bundle 200. This circular bundle 200 is surrounded by an inner annular bundle 202, which is in turn surrounded by an outer annular bundle 204. The bundles 200, 202 and 204 are arranged to have equal cross-sectional areas (FIG. 12 is not strictly to scale) so that equal amounts of light from the bundle 46 enter each of the bundles 200, 202 and 204.

Figure 9:
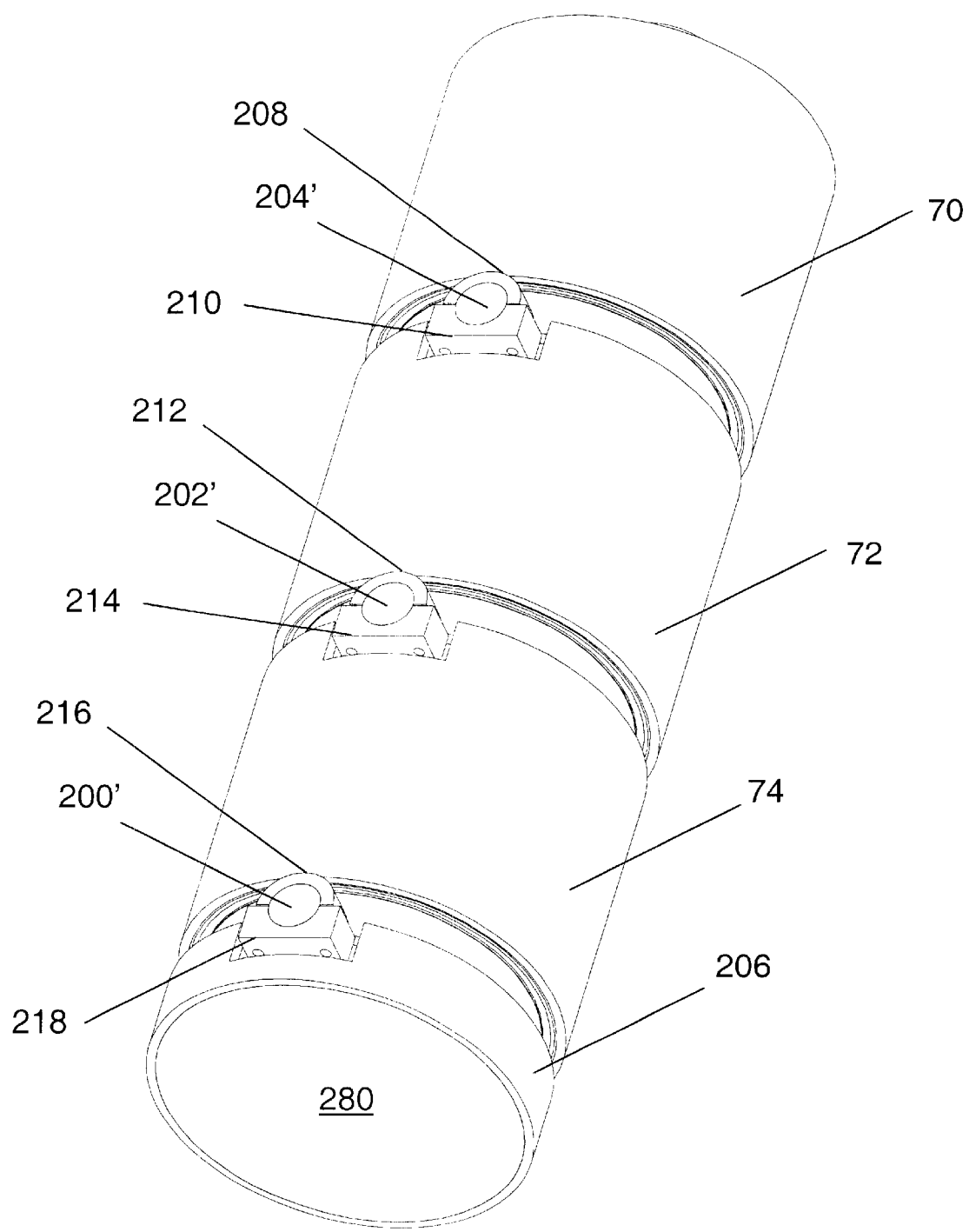
FIG. 9 is a three quarter view from below and to one side of the light splitter shown in FIG. 1.

The external shape of the assembled splitter 48 is best seen in FIG. 9. As shown in that Figure, the splitter is generally cylindrical and comprises the fixed hub 70, and cylindrical sections 72, 74 and 206 descending therefrom (section 206 was omitted from FIG. 2 and is truncated vertically compared to sections 72 and 74 for reasons which will be explained below). The hub 70 is fixedly secured to the ceiling of the operating room, but the remaining sections 72, 74 and 206 are freely rotatable about their common axis independently of one another. A fiber optic bundle 204', which receives light from the bundle 204 (FIG. 12) extends radially from the upper end of section 72, being held between upper and lower clamping members 208 and 210, respectively. The horizontal arm 76 (FIG. 2) is fixedly secured to these clamping members 208 and 210 so that it rotates with section 72. The bundle 204' does not terminate at the position shown in FIG. 9, but continues along the arm 76, as briefly mentioned above with reference to FIG. 2 and as discussed in more detail below. The sections 74 and 206 have bundles 202' and 200' (which receive light from the bundles 202 and 200 respectively shown in FIG. 12) and clamping members 212, 214 and 216, 218, respectively, all these components being identical to the corresponding components of section 72.

Figure 10:
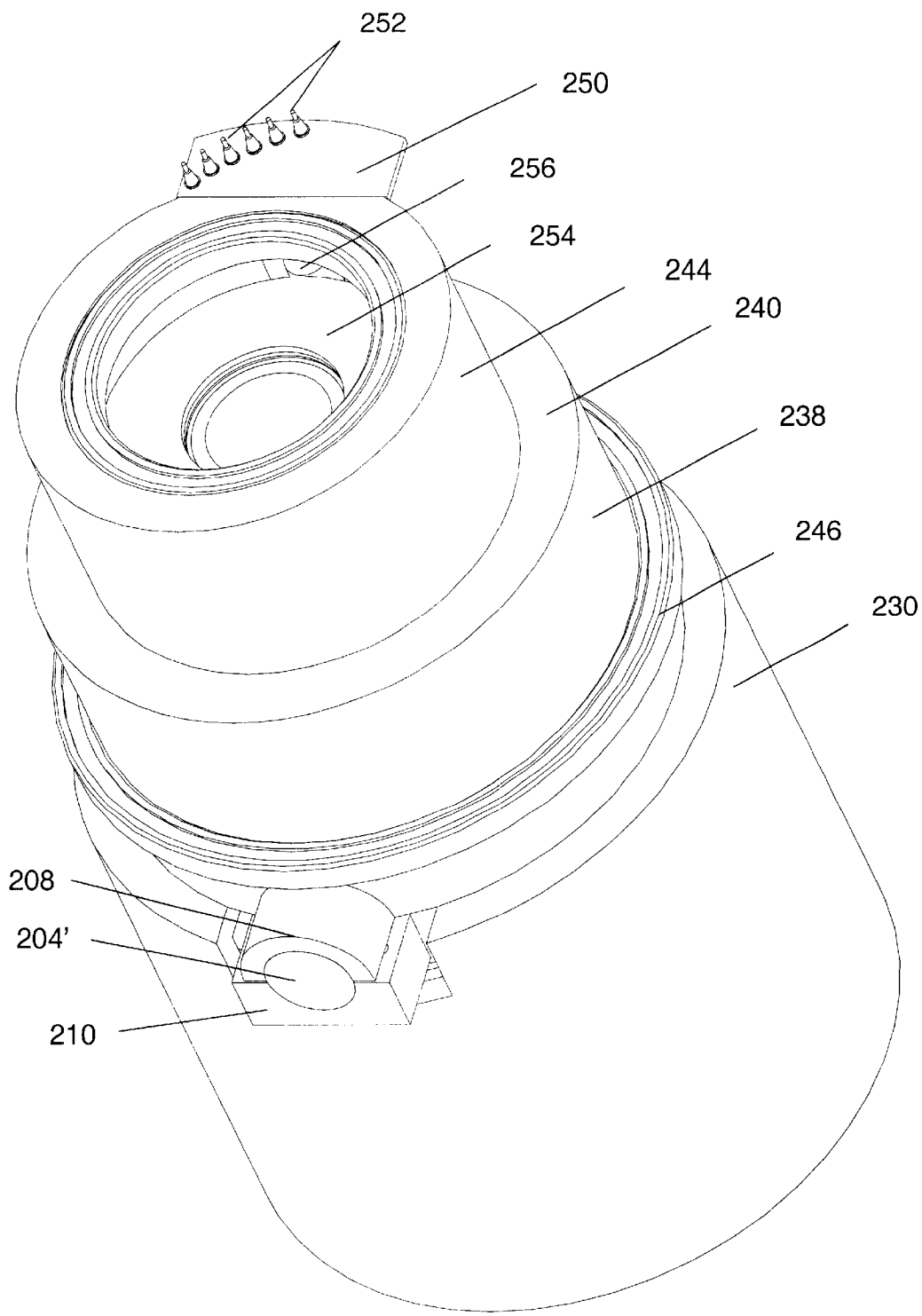
FIG. 10 is a three quarter view from above and to one side of the rotor of the first stage of the splitter shown in FIG. 9 with the central hub/stator removed.
Figure 11:
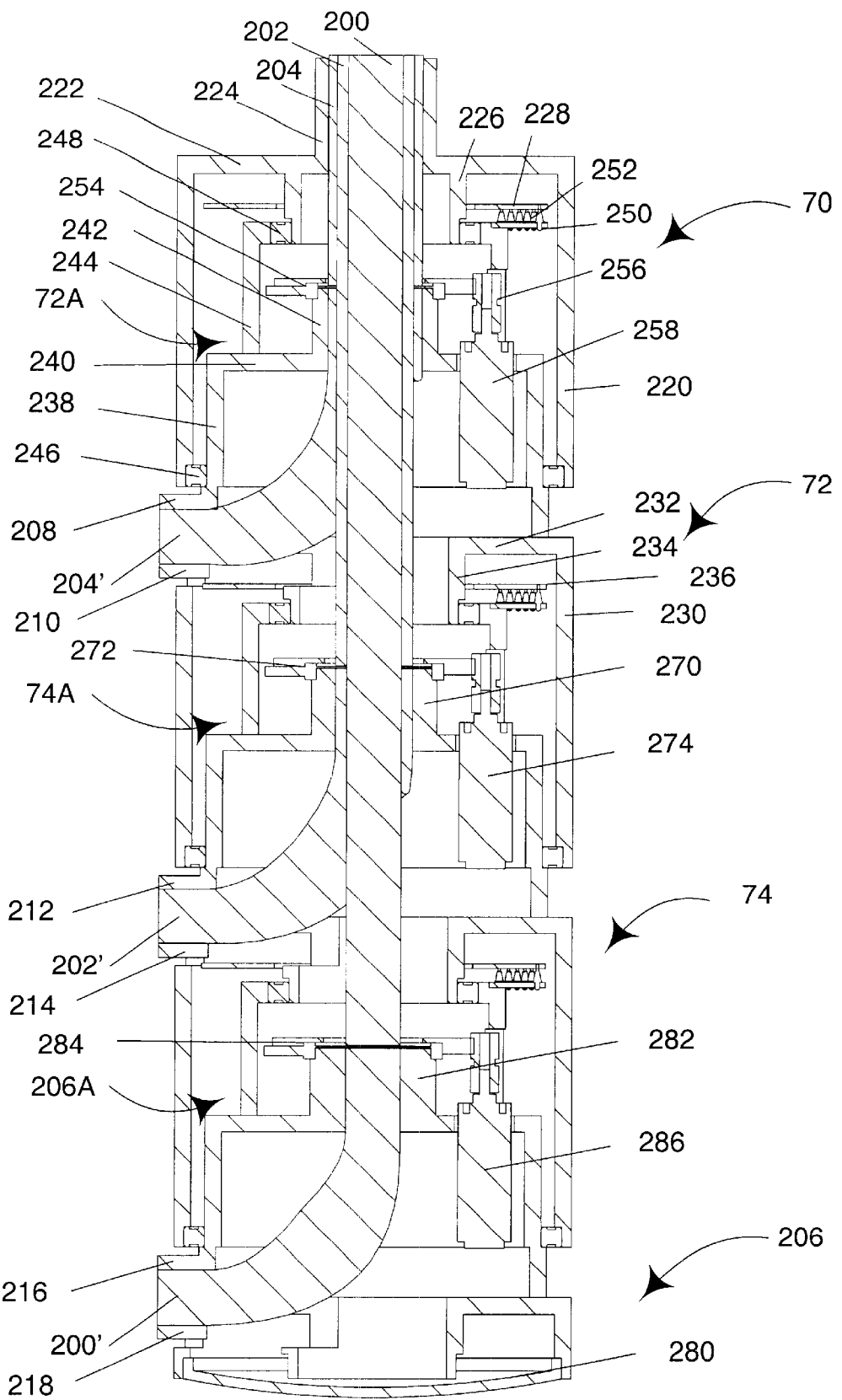
FIG. 11 is a vertical cross-section through the splitter shown in FIGS. 9 and 10 in a plane including the axis of the splitter.

The internal construction of the splitter 48 is shown in FIGS. 10 and 11. From FIG. 11, it will be seen that the hub 70 has essentially the form of a hollow cylinder 220 open at its lower end but closed at its upper end by a top plate 222. The top plate 222 has a central aperture extending therethrough, and a hollow cylindrical extension 224 extending upwardly around this aperture; the cylinder 220, top plate 222 and extension 224 are all integral with one another and the upper end of the extension 224 is secured in any convenient manner to the ceiling of the operating room. The fiber bundles 200, 202 and 204 pass through the hollow interior of the extension 224, and are fixedly secured therein, so that the bundles 200, 202 and 204 do not rotate with the sections 72, 74 and 206 but remain stationary with the hub 70. On the other hand, the bundles 200', 202' and 204' do rotate with their associated sections 206, 74 and 72, respectively, about the central axis of the splitter. A cylindrical flange 226 depends from the underside of the top plate 222 and carries an annular, outwardly extending flange 228, on the underside of which are formed a series of electrically conducting rings (not shown).

Section 72 comprises a hollow cylinder 230 essentially identical in form to the cylinder 220 of hub 70 and is provided with a top plate 232 having a central aperture somewhat larger than the aperture in top plate 222 of hub 70. Also, section 72 has a cylindrical flange 234 and an annular flange 236 identical in form to flanges 226 and 228, respectively, of hub 70. However, unlike hub 70, section 72 has a large upper section (generally designated 72A) which extends upwardly within the hollow interior of hub 70. This upper section 72A comprises a first hollow cylindrical section 238, an annular plate 240, which closes the upper end of cylindrical section 238 and has a central aperture through which fiber bundles 204', 202 and 200 pass, a second hollow cylindrical section 242 extending upwardly from plate 240 and fitting closely around the bundles 204', 202 and 200, and a third hollow cylindrical section 244, extending upwardly from plate 240 but of greater diameter than section 242. Section 72 is made freely rotatable relative to hub 70 by means of bearings 246 and 248, the former being disposed between the cylindrical section 238 and the cylindrical section 220 of hub 70, and the latter being disposed between the cylindrical section 244 and the cylindrical flange 226 of hub 70.

The upper end of cylindrical section 244 carries an outwardly extending tab 250 (best seen in FIG. 10) from which extend upwardly a series of six spaced pogo pin brushes 252; the upper ends of these brushes 252 contact the electrically conductive rings provided on the underside of the annular flange 238 of hub 70. The upper end of cylindrical section 242 carries an iris diaphragm 254, which can be driven by a gear wheel 256, carried and driven by an electric motor 258 fixedly mounted in an aperture in the annular plate 240. The diaphragm 254 is disposed between the bundle 204 and the bundle 204' and thus serves to regulate the proportion of light entering bundle 204 which emerges from bundle 204', and thus (as explained below) ultimately controls the intensity of light emitted from one of the lighting heads 54 (FIGS. 1 and 2). Note that the diaphragm 254 only separates bundle 204 from bundle 204'; bundles 202 and 200 pass straight through the diaphragm 254 and light flow through these bundles is in no way affected by operation of the diaphragm 254. Power is supplied to the motor 258 from two of the brushes 252 via electrical conductors (not shown) fixedly mounted on the upper section 72A. Control of current to the brushes 252 is effected from a simple lighting intensity control panel (not shown) placed within the operating room.

From FIG. 11, it will be seen that, although the upper end of fiber bundle is annular in horizontal cross-section, having exactly the same cross-section as the annular bundle 204 (cf. FIG. 12), with the individual fibers running vertically, the fibers of the bundle 204' are redirected within the upper section 72A of section 72 so that the lower end of the bundle 204' is circular in vertical cross-section, with the individual fibers running horizontally.

Section 74 is essentially identical in form to the section 72, and has an upper section 74A, extending upwardly within section 72 and essentially identical in form to upper section 72A thereof. The only differences between sections 72 and 74 are:

(a) a cylindrical section 270 of section 74A, which corresponds to cylindrical section 242 of section 72A, has thicker walls than cylindrical section 242, since its central aperture only needs to accommodate bundles 202' and 200;

(b) diaphragm 272 of section 74A, which corresponds to diaphragm 254 of section 72A, separates bundle 202 from bundle 202', but allows bundle 200 to pass therethrough; and (c) motor 274 of section 74A, which corresponds to motor 258 of section 72A, is fed via different ones of the brushes 252 so that diaphragms 254 and 272 can operate independently of each other (obviously, section 74A only requires four brush and correspondingly four rings in the underside of flange 236, but for ease of manufacture and to reduce the number of differing spare parts which must be stocked, all sections of the splitter 48 are formed with six conductive rings and six brushes).

As already noted, section 206 has a form substantially different from that of sections 72 and 74, being vertically truncated since section 206, being the lowest section of the splitter, does not need to accommodate any upper section comparable to 72A or 74A. The lower end of section 206 is closed by a cap member 280, which serves to prevent entry of dirt, dust, debris etc. into the splitter, and also gives the splitter a smooth external form which renders it easier to keep the splitter aseptic within the operating room. However, the section 206 has an upper section (generally designated 206A), which is essentially identical to upper sections 72A and 74A previously described, the differences being as follows:

(a) a cylindrical section 282 of section 206A, which corresponds to cylindrical section 270 of section 74A, has thicker walls than cylindrical section 270, since its central aperture only needs to accommodate bundle 200';

(b) diaphragm 284 of section 206A, which corresponds to diaphragm 272 of section 74A, separates bundle 200 from bundle 200', but does not need to allow any other bundle therethrough, so that diaphragm 284 is made to be capable of closing to zero aperture; and (c) motor 286 of section 206A, which corresponds to motor 274 of section 74A, is fed via different ones of the brushes 252 so that diaphragms 254, 272 and 284 all operate independently of each other.

As will be seen hereinafter, section 202 may terminate as a connector hub for feeding color appropriate light to fiber bundles supplying surgical headlamps and/or endoscopes.

As already mentioned, in the splitter 48 shown in FIGS. 9–12, the bundles 200, 202 and 204 do not rotate with their associated sections 72, 74 and 206, but the bundles 200', 202' and 204' do rotate with their associated sections 72, 74 and 206. It will be apparent to those skilled in the art that the construction of the splitter 48 could be modified by eliminating the diaphragms 254, 272 and 282, making each bundles 200, 202 and 204 integral with its associated bundle 200', 202' and 204', and allowing the bundles 200, 202 and 204 to rotate relative to each other about their common axis. Obviously, in such a modified splitter, it would be desirable to arrange for the upper ends of the bundles 200, 202 and 204 to rotate smoothly about one another, for example by enclosing these upper ends in smooth sleeves, and possibly to provide some means of introducing lubricant between the sleeves. If, in such a modified splitter, it is desired to retain the functions of diaphragms 254, 272 and 282, this could be done in the same manner as described below with reference to FIG. 13, i.e., by interrupting each of the bundles 200', 202' and 204' adjacent the point at which exits the splitter 48 and inserting the diaphragms into the gaps created by such interruptions.

Figure 13:
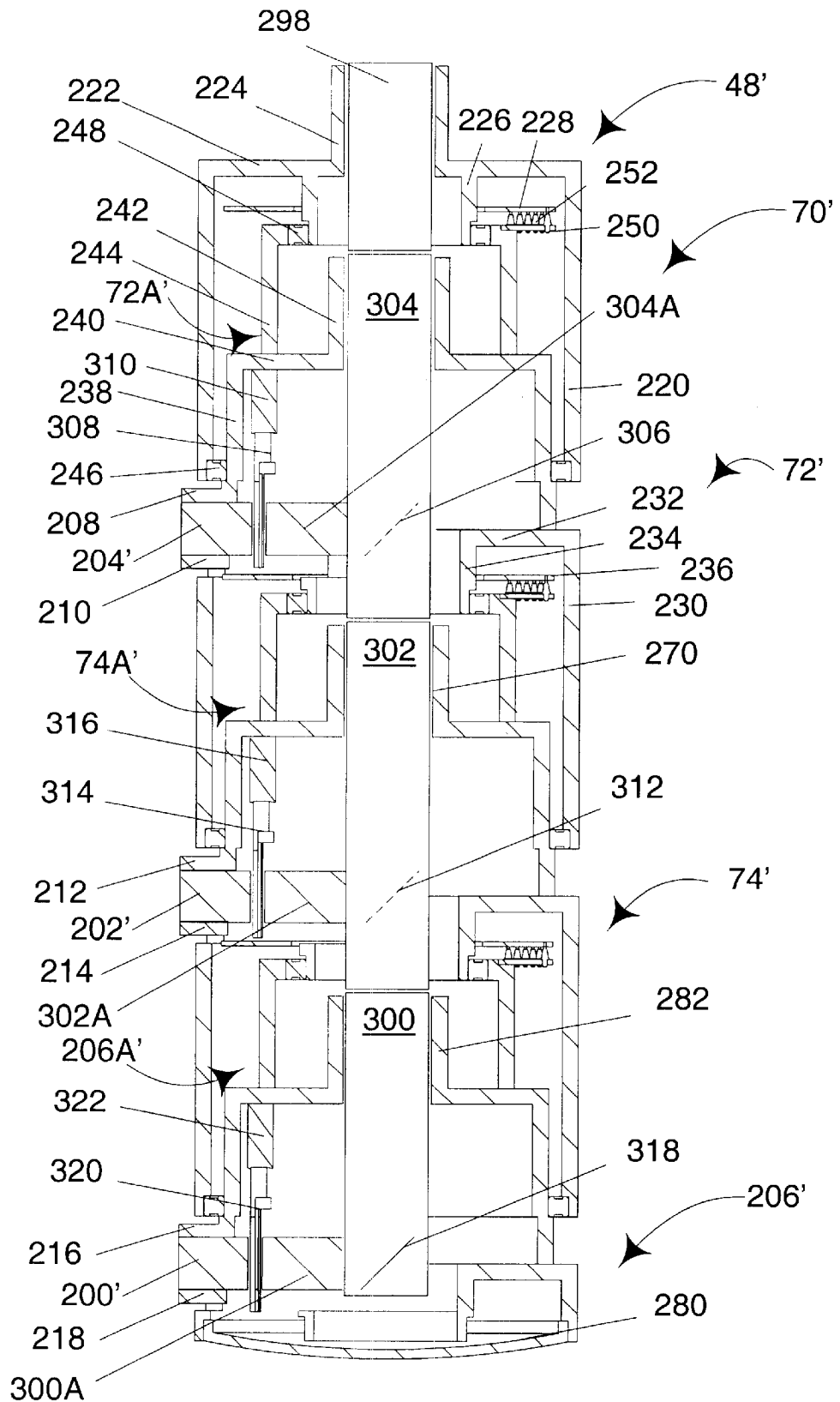
FIG. 13 is a schematic vertical cross-section, generally similar to that of FIG. 11, through an alternative splitter which can be used in place of that shown in FIGS. 9–12.

FIG. 13 shows a splitter 48' which can be substituted for that shown in FIGS. 9–12. Unlike the splitter shown in FIGS. 9–12, the splitter 48' shown in FIG. 13 does not use concentric rings of optic fibers, but instead makes use of light pipes with embedded mirrors to divide the incoming light among three fiber optic bundles. Since most of the mechanical details of the splitter 48' are very similar to those of the splitter 48, the relevant reference numerals from FIG. 11 are simply applied to the similar components in FIG. 13 without further comment, and only those components of the splitter 48' which differ significantly from the corresponding components of splitter 48 will be discussed in detail below.

In the splitter 48', the concentric fiber optic bundles 200, 202 and 204 are replaced by a single light pipe 298, which is fixedly secured within extension 224 of hub 70' so as to be non-rotatable. (The conventional section lines are omitted from light pipe 298 and other light pipes described below, to avoid confusion between shading lines and the mirrors embedded in various light pipes.) Immediately below bearing 248, light pipe 298 is butt joined to a light pipe 304, which is fixedly secured within cylindrical section 242 of upper section 72A'. Note that, for reasons explained below, the cylindrical section 242 does not carry a diaphragm corresponding to diaphragm 242 shown in FIG. 11, and the gear wheel 256 and motor 258 associated with the diaphragm are also absent from splitter 48'.

Within the lower end of light pipe 304, and adjacent clamping members 208 and 210, a partially silvered mirror 306 (indicated by the broken line in FIG. 13) is embedded at an angle of 45° to the axis of light pipe 304. (This embedded mirror is typically formed by cutting light pipe 304 at an angle of 45° to its axis, partially silvering one of the exposed inclined surfaces, and reattaching the two parts of the light pipe using, for example, an adhesive which cures to a material having a refractive index substantially the same as that of the light pipe.) The mirror 306 reflects approximately one-third of the light travelling down light pipe 304 radially outwardly, at right angles to the axis of the light pipe 304, into a side light pipe 304A. The outer end of side light pipe 304A abuts fiber optic bundle 204'. A diaphragm 308 is interposed between the adjacent ends of side light pipe 304A and bundle 204', this diaphragm being supported by a planar flange 310, which depends from plate 240 of upper section 72A'. As will be apparent to those skilled in fiber optics, since the splitting off of the light which will eventually emerge from fiber optic bundle 204' only occurs at mirror 306 (rather than when the light enters the bundles 200, 202 and 204 at the upper end of splitter 48 as shown in FIG. 11), it is necessary that the diaphragm 308 be located "downstream" from mirror 306, and the diaphragm 308 is most conveniently located at the point where the side light pipe 304A abuts bundle 204'. The diaphragm 308, which serves the same purpose as diaphragm 242 of splitter 48, namely to regulate the intensity of the light emerging from one of the lighting heads 54 (FIGS. 1 and 2), is driven by a gear wheel and a motor analogous to gear wheel 256 and motor 258 shown in FIG. 11, but the gear wheel and motor are omitted from FIG. 13 to avoid cluttering this Figure.

The remaining differences between the splitter 48' and the splitter 48 will readily be apparent to skilled readers from FIG. 13. The lower end of the light pipe 304 is butt joined to a light pipe 302, which is identical in form to light pipe 304 and is provided with a partially silvered mirror 312 (which is arranged to reflect approximately one half of the light that reaches it), and a slide light pipe 302A; light pipe 302 also has associated therewith a diaphragm 314 supported by a flange 316, and a fiber optic bundle 202'. Finally, the lower end of light pipe 302 is butt joined to a light pipe 300, which is bent through 90 degrees (since light pipe 300 is the last pipe in the sequence, any light reaching the base of this pipe is wasted), terminating in a side light pipe branch 300A, and an associated diaphragm 320, flange 322 and fiber optic bundle 200'.

Figure 13A:
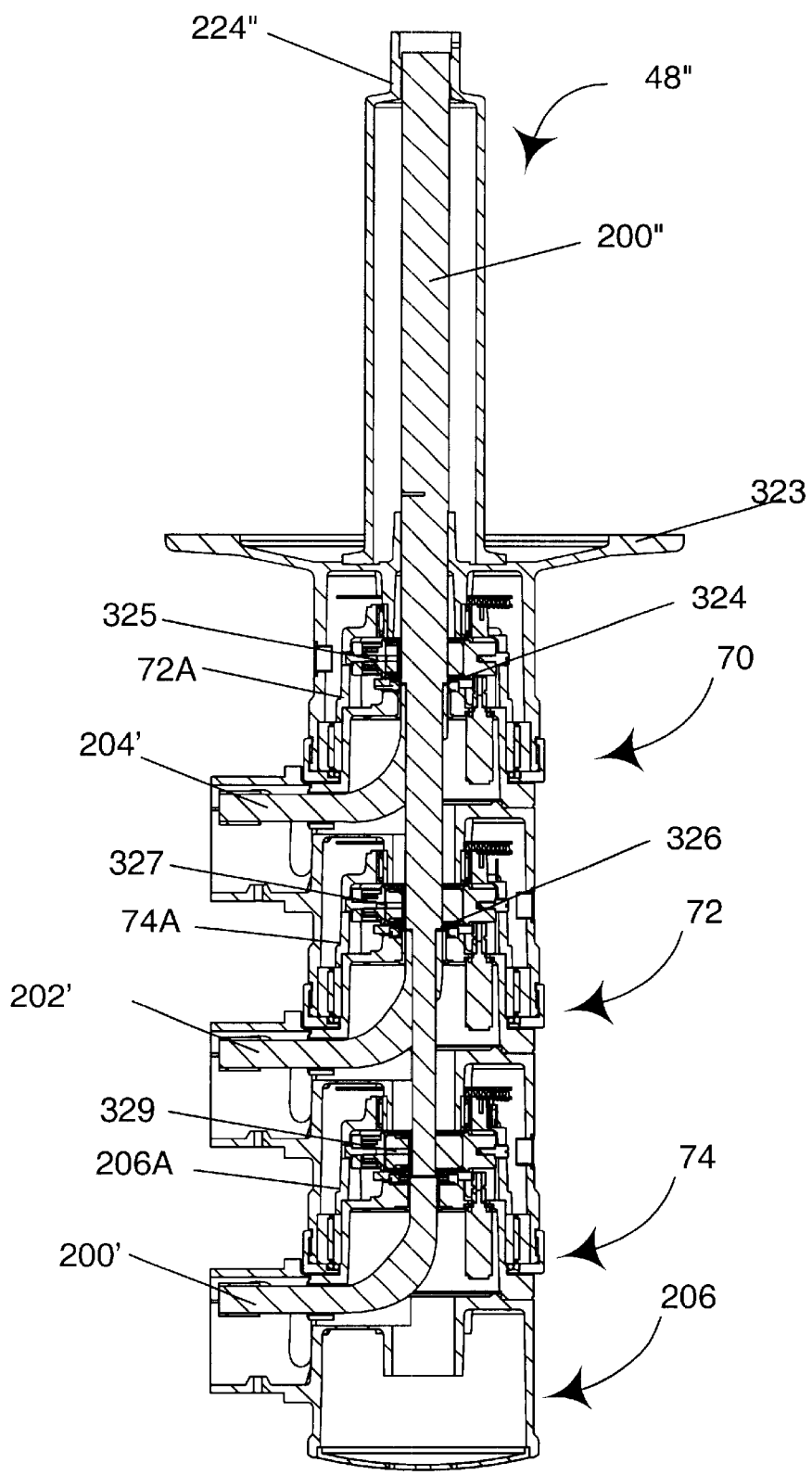
FIG. 13A is a schematic vertical cross-section, generally similar to those of FIGS. 11 and 13, though a third splitter which can be used in place of those shown in FIGS. 9–12 and 13.

The splitters 48 and 48' shown in FIGS. 11 and 13, respectively, both have the property that, since the sections 70, 72, 74, 206, 70', 72', 74' and 206' are freely rotatable around the axis of the splitter, when one of the sections is rotated by a user moving the associated light head, there is a tendency for friction between the adjacent sections to cause movement of the one or two sections adjacent the one being rotated, with associated movement of the light head(s) attached to the adjacent section(s). This is obviously undesirable, since it may cause unwanted changes in the illumination pattern at the surgical site or other work area being illuminated. Accordingly, in order to allow the light heads to be moved completely independently of one another, it is desirable to provide some means for preventing movement of one section of the splitter causing movement of one or more adjacent sections, and FIG. 13A illustrates a third splitter (generally designated 48") having such motion preventing means.

The splitter 48" shown in FIG. 13 is very similar to the splitter 48 shown in FIG. 11, as may be seen by comparison of the corresponding and similarly-numbered parts in the two splitters; the only major external change being the provision of an annular flange 323 adjacent the upper end of splitter 48", immediately below the point at which the splitter 48" is intended to emerge from the ceiling of a room in which it mounted. This flange is provided mainly for esthetic reasons, to hide any trace of the aperture through which the splitter 48" emerges from the ceiling, and obviously the splitters 48 and 48' could readily be modified to include such a flange. The internal changes within the splitter 48", as compared with the splitter 48, are, however, of greater significance.

In the splitter 48", the three fiber optic bundles 200, 202 and 204 of the splitter 48 are replaced by a single fiber optic bundle 200", the diameter of which is stepped down at two shoulders 324 and 326; these shoulders 324 and 326 are butt joined to the annular ends of rotatable fiber optic bundles 204' and 202' respectively, in the same manner that the fiber optic bundles 204 and 202 shown in FIG. 11 are butt joined to the bundles 204' and 202'. Similarly, the lower end of bundle 200" is butt joined to a rotatable fiber optic bundle 200' in the same manner as in FIG. 11.

The bundle 200" is fixed in position within the room, being fixedly secured within the cylindrical upper end of an extension 224", with the sections 72, 74 and 206 being rotatable about the axis of the splitter 48". However, in order to provide resistance to such rotation, and thus to prevent rotation of one of the sections causing rotation of the adjacent section(s), the splitter 48" is provided with three ring clutches 325, 327 and 329. Clutch 325 is fixedly secured within the extension 72A of section 72 and frictionally engages bundle 200" immediately above shoulder 324, clutch 327 is fixedly secured within the extension 74A of section 74 and frictionally engages bundle 200" immediately above shoulder 326, and clutch 329 is fixedly secured within extension 206A of section 206 and frictionally engages the extreme lower end of bundle 200" immediately above its butt joint with bundle 200'. The resistance to rotation provided by each of the clutch 325, 327 and 329 is the same, and is arranged to be at least sufficient that when sections 74 and 206 are rotated together, the frictional drag exerted on section 72 by this rotation is insufficient to overcome the resistance to rotation provided by clutch 325, so that section 72 will not rotate relative to bundle 200". This arrangement enables the three sections 72, 74 and 206 to be rotated, and the associated light heads to be moved, independently of one another. To provide structural rigidity, metal sleeves or the like may be used in the vicinity where the stepped fiber bundles overlap, and such sleeves may be fixed in place by suitable epoxies.

Figure 14:
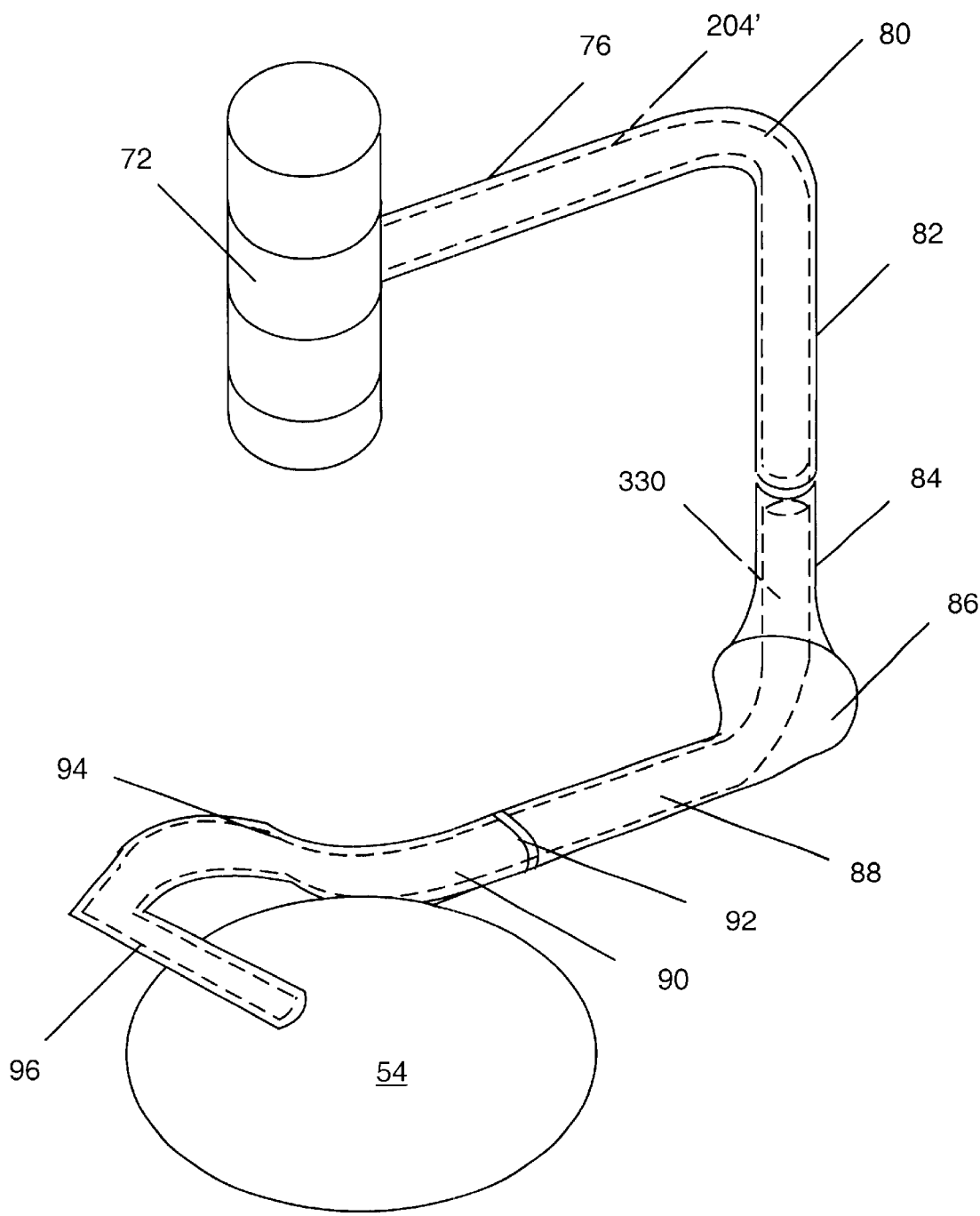
FIG. 14 is schematic three quarter view, from above and to one side, of one of the lighting heads shown in FIG. 2 and associated apparatus, and shows the fiber optic bundles associated therewith.

FIG. 14 diagrammatically illustrates one of the lighting heads shown in FIG. 2 and its associated apparatus. As discussed above with reference to FIGS. 2 and 9–11, cylindrical section 72 is fixedly secured to horizontal arm 76, which is in turn secured via elbow 80 to vertical section 82. The fiber optic bundle 204' shown in FIGS. 9–11 extends through arm 76 and elbow 82 and terminates at the base of vertical section 82. A second fiber optic bundle 330 is butt joined to bundle 204' at the junctions of vertical sections 82 and 84; the spacing between the ends of the two bundles is greatly exaggerated in FIG. 14. Bundle 330 extends through vertical section 84, joint 86, arm 88, joint 92, arm 90 and tubes 92 and 94 to the lighting head 54. However, the bundle 330 is only fixedly secured to arm 90 and tube 94; and is left free to rotate within arm 88, vertical section 84 and tube 96, thus permitting free rotation of the joint 92 and the joint between vertical sections 82 and 84, rotation of lighting head 54 relative to tube 96, and the articulation of joint 86, without damage to the bundle 330 which would otherwise occur during these relative rotations. Thus, the illumination system of this invention can permit complete freedom of movement of the lighting head 54 while only using two fiber optic bundles and a single butt joint, thus minimizing light loss at joints. Alternatively, the fiber bundle may run continuously from cylindrical section 72 to lighting head 54. Here, a slip joint is provided in head 54 while the fiber is fixed in the cylindrical section 72. This approach makes the efficiency of the system higher by eliminating losses that otherwise would occur at joints. In a preferred embodiment, the fiber bundle runs from cylindrical section 72 to lighting head 54 with only one optical slip joint located just before the lighting head 54, beginning with tube 92, so that the lighting head 54 can be easily removed.

It is possible that, in some forms of the present invention, there may be a risk of damage to the fiber bundle 330 during repeated articulations of the joint 86. To avoid risk of such damage, it may be desirable to enclose the portion of the bundle 330 extending through joint 86 within a flexible torsion tube having its opposed ends secured to vertical section 84 and arm 88, respectively.

Figure 15:
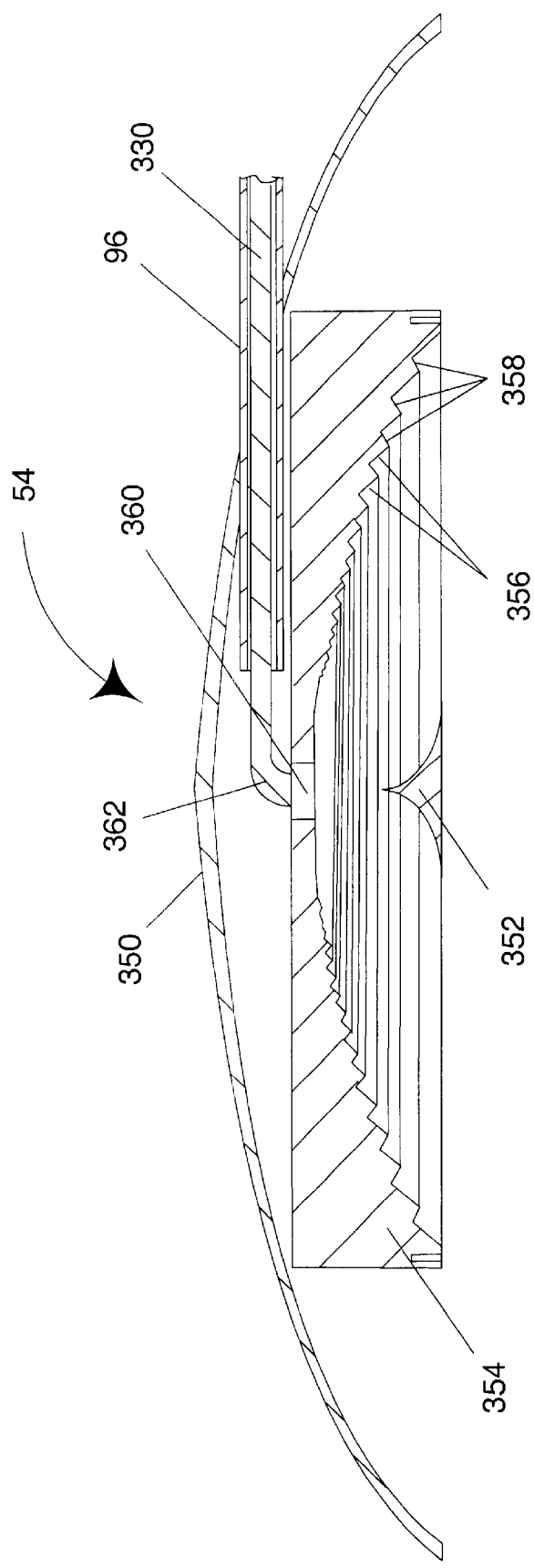
FIG. 15 is a somewhat schematic section through one of the lighting heads shown in FIGS. 2 and 14, taken in a plane including the axis of the lighting head.

FIG. 15 shows, somewhat simplified, a section through one of the lighting heads 54 shown in FIGS. 1 and 2 in a plane including the axis of the head. Each lighting head 54 comprises a flattened or shallow dish-shaped shell 350 through which passes the tube 96 with the fiber optic bundle 330 passing along the tube 96. Supported on the shell 350 by support members (not shown) are an essentially cone-shaped primary reflector 352 and a secondary reflector 354. The secondary 354 has a series of frusto-conical reflecting surfaces 356 formed thereon, these reflecting surfaces being separated by step surfaces 358. The reflecting surfaces 356 closely approximate annular segments of a conventional parabolic reflector, but are displaced axially relative to one another from the positions they would occupy in a conventional parabolic reflector, thus greatly reducing the axial depth of the secondary reflector 354 and enabling the shell 350 to keep a desirable shallow profile.

The secondary reflector 354 has a central aperture 360 extending therethrough, and the output end 362 of fiber bundle 330 is turned through a right angle so that light leaving this bundle passes along the axis of reflector 350, through aperture 360, and is reflected from the primary reflector 352 on to the various reflecting surfaces 356 of secondary reflector 354. The shapes of primary reflector 352 and reflecting surfaces or facets 356 are, of course, carefully controlled to ensure that an intense, substantially uniform illumination is provided within the target area of each lighting head. Alternatively, bundle 330 could terminate as a section of light pipe bent through 90 degrees and ending as output end 362.

Figure 16:
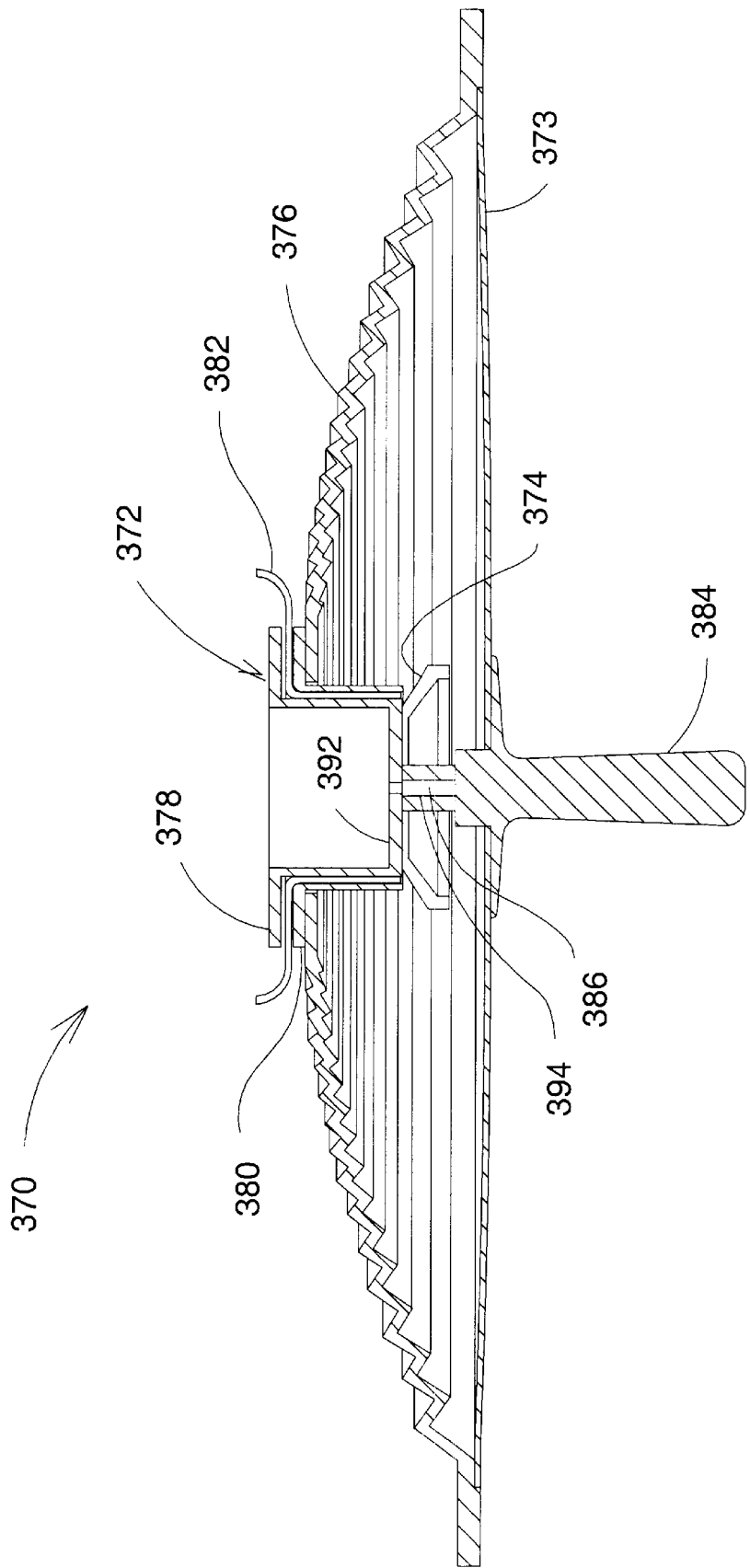
FIG. 16 is a diagrammatic section similar to FIG. 15 for an alternative embodiment for a lighting head.

Referring now to FIG. 16, there is shown generally at 370 another embodiment of a light head for use in the illumination system of the invention. Light head 370 comprises an annular fiber ring assembly 372, a primary reflector 374 in the form of a generally truncated cone, and a multifaceted secondary reflector 376 whose nominal base shape is approximately parabolic.

Figure 17:
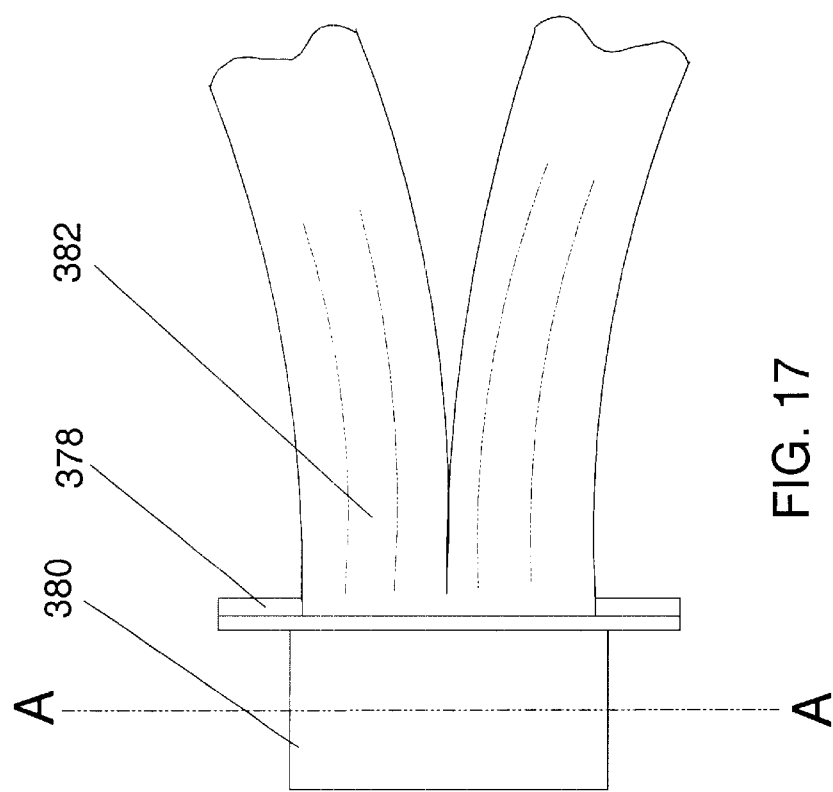
FIG. 17 is a diagrammatic elevational view of a fiber ring assembly used in the alternative lighting head of FIG. 16.
Figure 19:
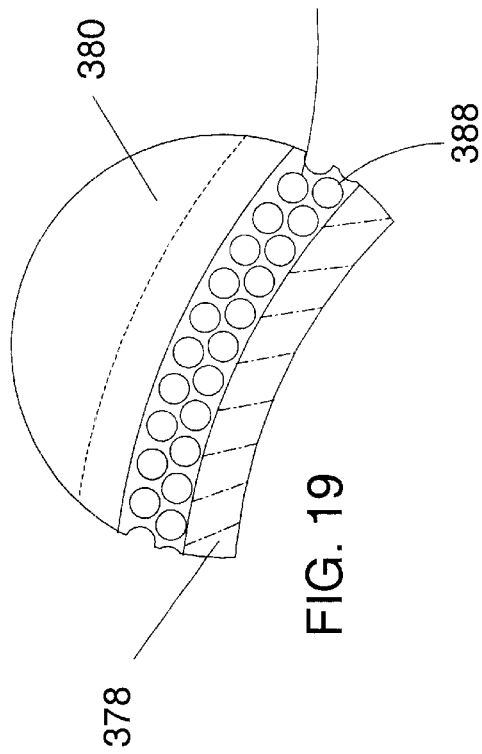
FIG. 19 is an enlarged diagrammatic view of a fragment of the ring assembly of FIG. 18, taken from the "circled" region and illustrating that illumination fibers are arranged in an annular ring of two rows.
Figure 18:
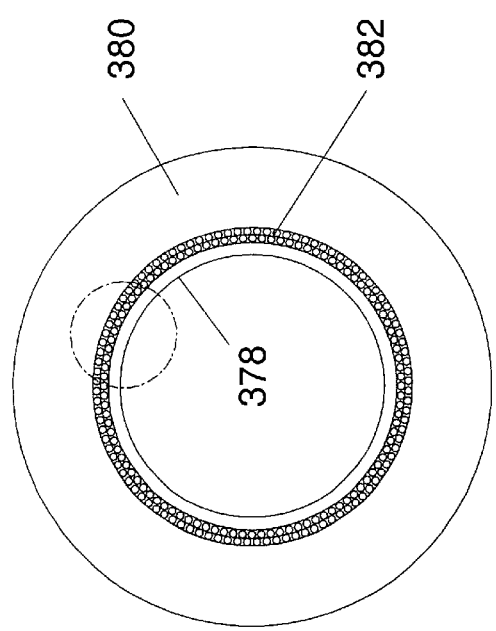
FIG. 18 is a diagrammatic front elevational view of the ring assembly of FIG. 17.

Unlike the previous light head, whose fibers were grouped together near the optical axis, annular fiber ring assembly 372 arranges a plurality of fibers 382 in an annular ring of two adjacent rows of fibers. To achieve this, fiber ring assembly 372 uses two nested flanged fiber locating tubes 378 and 380, respectively, that are dimensioned to provide an annular fiber chase into which the fibers 382 fit with their respective output ends located in a circular pattern whose center is on the optical axis, $O_A$, while the output ends are located as a distributed source off the optical axis. In all, in one preferred version, there are a total of 233, 1 mm, fibers coming from the upstream bundle, and these are spread over the desired annulus as two rows, 388 and 390, as best seen in FIGS. 17, 18, and 19.

The annular fiber ring assembly 372, primary reflector 374, and secondary reflector 376, all rotationally symmetric, are centered on the optical axis, $O_A$, and held in place by conventional fasteners. A flanged handle 384 is provided with a central stud 386 that screws into a base 392 of flanged tube 378 via a bore 394 located through the center of primary reflector 374.

Figure 20:
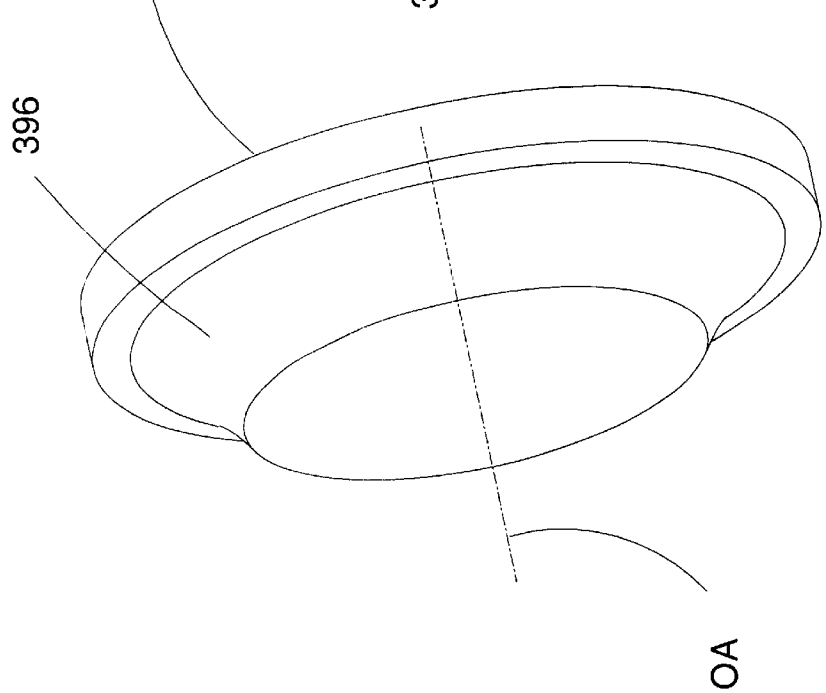
FIG. 20 is a diagrammatic perspective of a primary reflector used in the lighting head of FIG. 16 and illustrates that it is generally in the form of a truncated cone having selectively shaped reflecting surfaces.

Light emerging from the annular rings of fibers, 388 and 390, is reflected off a selectively configured surface designated generally as 396 in FIG. 20 to impinge on secondary faceted reflector 376 from which it is made to converge in a Gaussian shaped pattern at a nominal distance of 1 meter forward of the light head 372, which is provided with a transparent, preferably acrylic, window 373.

Figure 21:
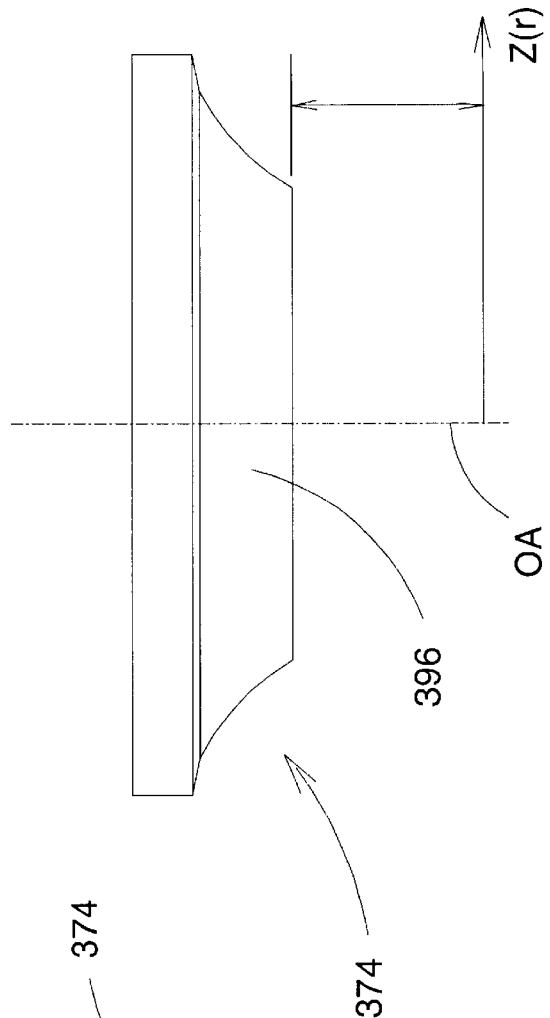
FIG. 21 is a diagrammatic side elevational view of the primary reflector of FIG. 20 shown along with a coordinate system used in defining its selectively shaped reflecting surfaces.
Figure 22:
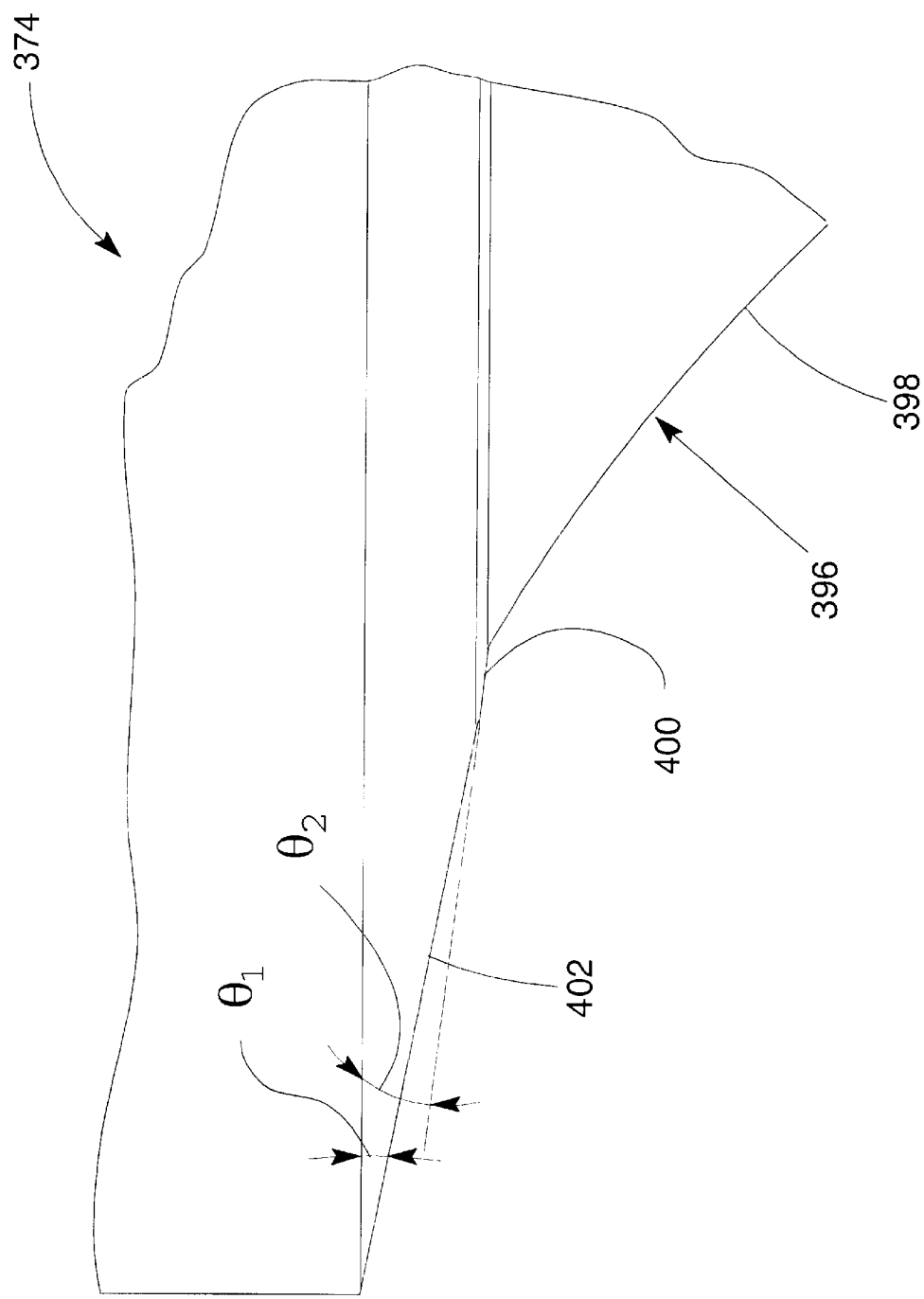
FIG. 22 is an enlarged diagrammatic view of an edge fragment of the selectively shaped surfaces of the primary reflector of FIGS. 20 and 21.

As best seen in FIGS. 21 and 22, surface 396 is a compound surface comprising three sections 398, 400, and 402. Section 398 is aspheric and sections 400 and 402 are conics, but different from one another in cone angle $\theta_1$ and $\theta_2$ respectively. The two sections of cones, 400 and 402, reflect light toward the center of secondary faceted reflector 376 whereas the aspheric section 398 operates to spread the light over it. There is a small area of the secondary reflector 376 where rays from the various sections overlap, yielding a low efficiency for focusing light to a 6" pattern since light hitting this area is incident at two different angles, which makes it difficult to manage. Nevertheless, the energy contained in these lost rays is evaluated at 2%.

The general shape of aspheric section 398 is given by the following well-known form:

$$z(r) = \frac{cr^2}{1 + [1 - (1 + K)c^2 r^2]^{1/2}} + Ar^2 + Br^4 + Br^6 + Cr^8 + Dr^{10} + \cdots$$

where:
z(r) is the sag,
c is the curvature at the apex of the surface,
$r^2 = x^2 + y^2$,
K is the conic constant, and
A, B, C, D, . . . are the 4th, 6th, 8th, and 10th order deformation terms.

The values of the various constants for one example of the aspheric surface is given in the following table with reference to the coordinate system shown in FIG. 21.

TABLE 1

| conic constant, K | −1.23 |
| --- | --- |
| A | −0.003 |
| B | −5.3E-6 |
| C | 0.0 |
| D | 0.0 |
| E | 1.0E-16 |

As further shown in FIG. 22, the cone angle for surface 400 is 8.0±0.2 degrees and, for surface 402, it is 11.0±0.2 degrees.

Figure 25:
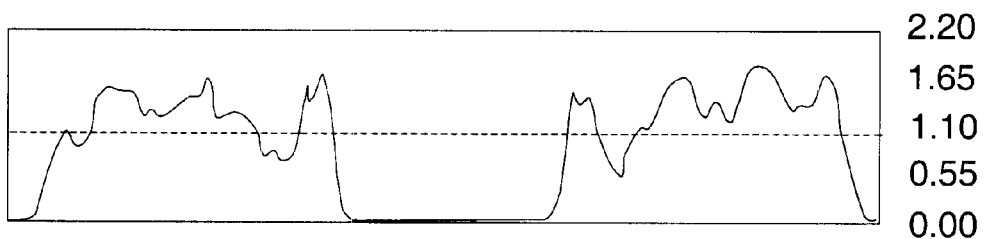
FIG. 25 shows the normalized intensity profile of light incident on the faceted surface of the secondary reflector along one azimuth thereof.

For the foregoing surface shape of primary reflector 374, the distribution of irradiance along one azimuth over the faceted secondary reflector 374 due to the combination of the annular fiber ring operating in conjunction with primary reflector 372 is shown in FIG. 25 where the profile has been normalized.

While not a completely flat intensity profile, the most desirable for satisfying shadow performance and Gaussian profile requirements of the final beam of illumination, this profile is significantly improved for this purpose compared with on-axis illumination of the primary reflector surface area. The reason for this is believed due to the fact that the ring of fibers is arranged such that each fiber in it presents a small effective object size to corresponding areas of the facets of the secondary reflector where the radiation pattern from individual fibers maps over a limited range of angles, at least merdionally, to allow for more precise control via facet angle and placement whereas on-axis approaches result in radiation impinging on any particular facet area from a large range of angles thus resulting in inefficient control. Thus, the annular approach is instrumental in minimizing sharp intensity peaks in the final illumination pattern delivered to the surgical field. Since the magnification for the inner facets is much greater than that of the outer facets and the source is small in the x-plane, this difference in magnification has a negligible effect on the size of the pattern. As will be seen, the ability to add the appropriate amount of curvature to each facet of the secondary reflector is able to produce the desired pattern for each ring, which when assembled represents an ensemble of patterns that produce a Gaussian intensity profile that does not change form significantly due to obstructions of shadowing.

Figure 24:
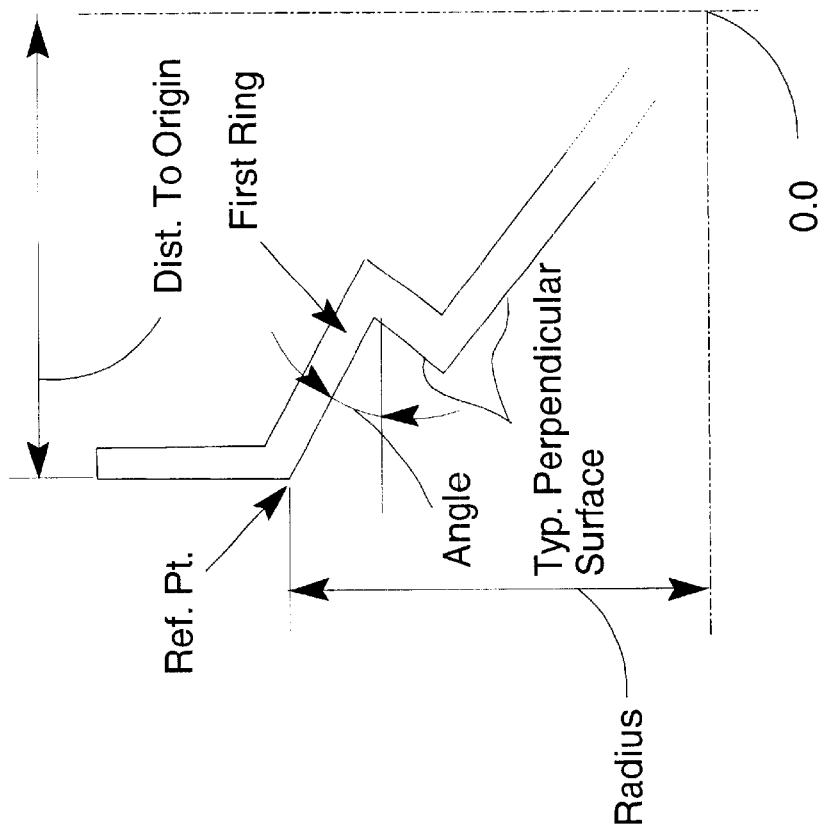
FIG. 24 is a diagrammatic reference system used for defining the location and slope angles of individual facets of the secondary reflector of FIG. 23.
Figure 23:
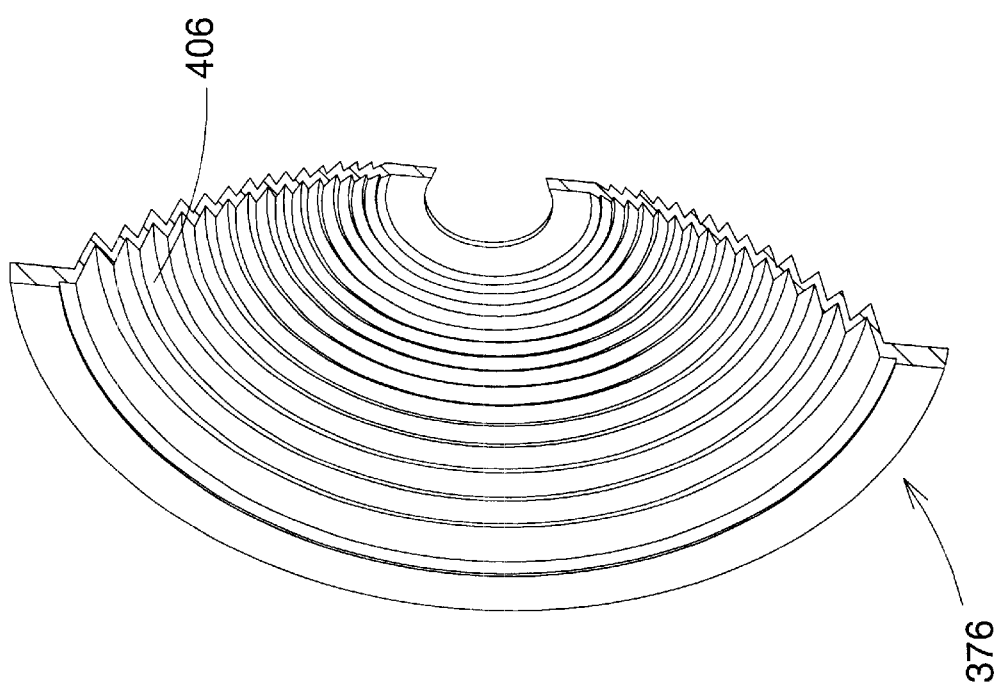
FIG. 23 is a diagrammatic perspective view of one-half of a secondary, multi-faceted reflector used in conjunction with the primary reflector of the lighting head of FIG. 16.

FIG. 23 shows the multifaceted secondary reflector 376 as a nominally parabolic surface having arranged thereon a plurality of facets generally designated at 406. The scheme for defining the location, size, and angular orientation of facets 406 is set forth in FIG. 24 and an example for a 16 facet reflector in accordance with this e is tabulated as follows:

TABLE 2

| Ring Number | Angle (Deg.) | Distance To Origin | Radius (mm) |
| --- | --- | --- | --- |
| 1 | 37 | 65.3 | 271 |
| 2 | 38.5 | 53.5 | 248 |
| 3 | 38.8 | 46.6 | 230 |
| 4 | 40.4 | 40.1 | 213 |
| 5 | 42.1 | 34 | 196 |
| 6 | 43.4 | 29.6 | 182 |
| 7 | 45 | 25.4 | 168 |
| 8 | 46.5 | 21.8 | 155 |
| 9 | 47.6 | 18.7 | 144 |
| 10 | 48.8 | 16.3 | 133 |
| 11 | 51.2 | 14 | 123 |
| 12 | 52.4 | 12 | 113 |
| 13 | 55 | 10 | 102 |
| 14 | 62.5 | 8.3 | 94 |
| 15 | 65.2 | 7 | 86 |
| 16 | 65.68 | 6 | 79 |
| All Rings Polished-Tolerance | +0.0/−0.5 Deg. | 0.2 mm | 0.5 mm |

The secondary reflector design for the foregoing example also has a sag (central depth) on the order of 60 mm and an inside diameter of 560 mm (22 inches).

Figure 26:
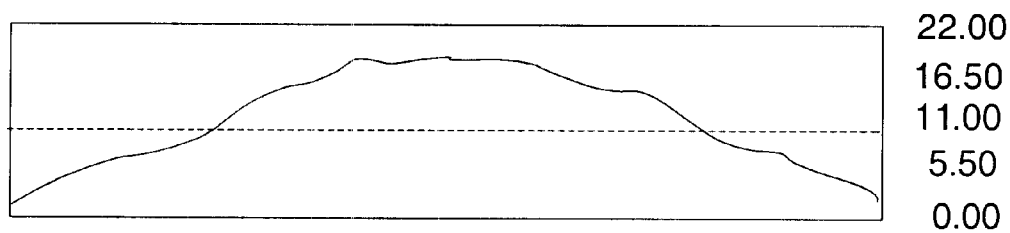
FIG. 26 shows the normalized irradiance profile falling on a six inch diameter plane in image space taken along one azimuth thereof.

FIG. 26 shows the normalized intensity distribution over a 6" pattern located nominally in the central plane of the working space. The profile is not completely Gaussian, indeed the distribution should fall steeper near the knee of the curve. This is due to the angle of the outer rings, which reflect most of the light, and can be easily adjusted is desired. The half intensity is set at a radius of 40 mm, which is about the specified value (38 mm).

The efficiency of the reflector is 75%. For another example with 15 rings, about 90% of the light exits through the acrylic window of the light head and 67% focuses on the pattern. But the closer the rings, the smaller the efficiency. From 92% for the $1^{st}$ ring, it falls to 50% for the $15^{th}$ ring. This low efficiency is balanced by the high energy percentage hitting the outer rings (about 13% of energy for the $2^{nd}$ ring versus 2% for the $15^{th}$ ring).

Figure 27:
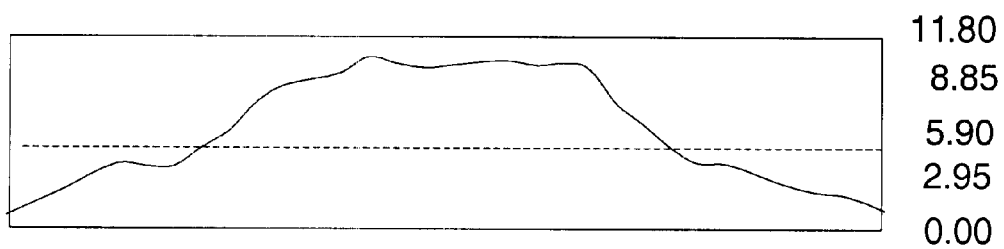
FIG. 27 shows the simulated normalized irradiance profile on a six inch diameter plane in image space taken along one azimuth thereof with one mask, 210 mm in diameter, located at 400 mm from the acrylic window of the lighting head of FIG. 16.

A simulation was run for a shadow test with one mask, 210 mm in diameter, located at 400 mm from the acrylic window. FIG. 27 represents the normalized light intensity on the 6" pattern. For the same reasons set forth above, the profile is slightly non-Gaussian. The ratio of the peak intensity in the two configurations (mask or not) is about 59 over 110 (maximum scale of both configurations), or 54%. The half intensity is set at a radius of about 41 mm.

It should be noted that the annular ring of fibers that act as the source for light head 370 could be replaced by an annular ring of laser diodes or equivalent solid state light sources where a non-fiber based light head was desired. Also, in this connection, laser diodes facing radially outwardly could eliminate the need for the primary reflector altogether in such a system.

Figure 28:
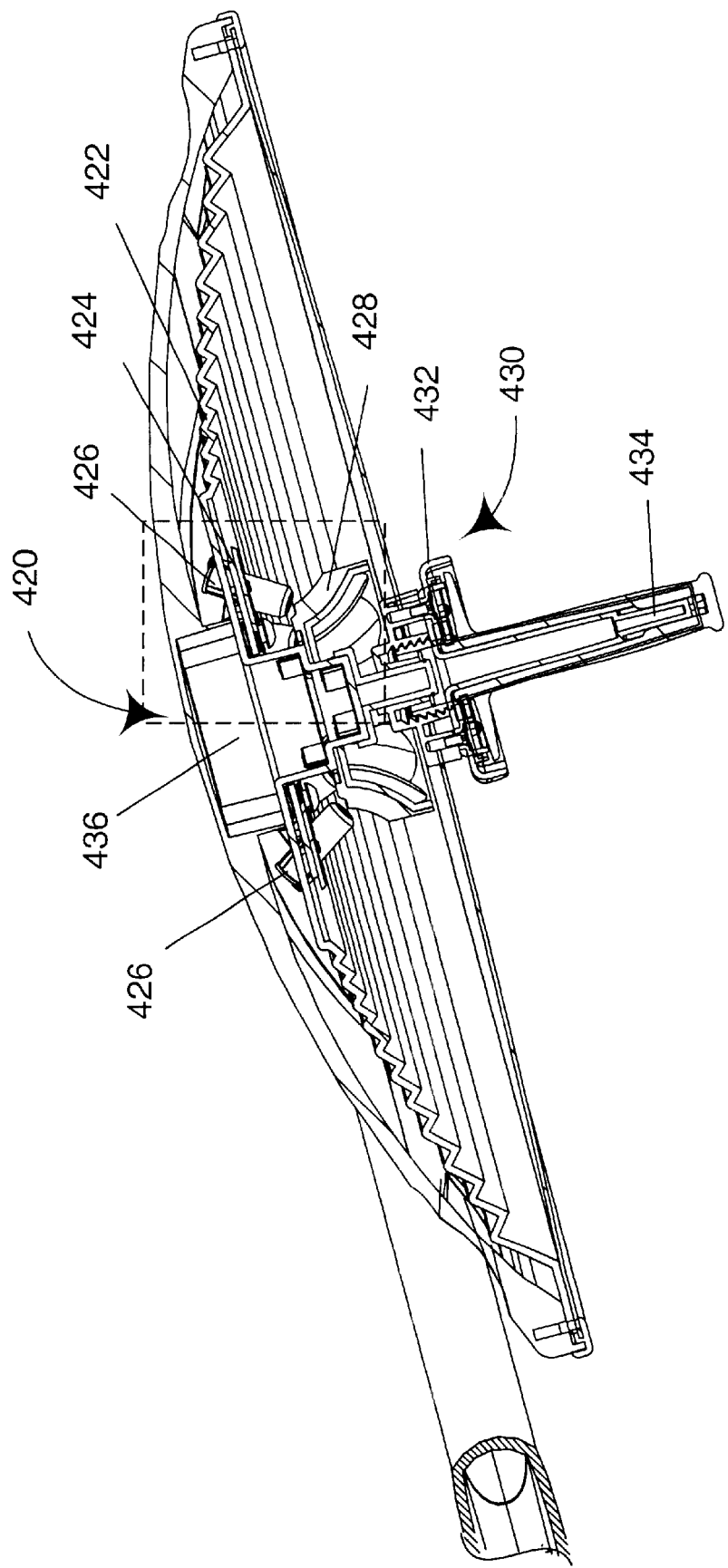
FIG. 28 is a diagrammatic section, similar to those of FIGS. 15 and 16, through a third lighting head of the invention.
Figure 29:
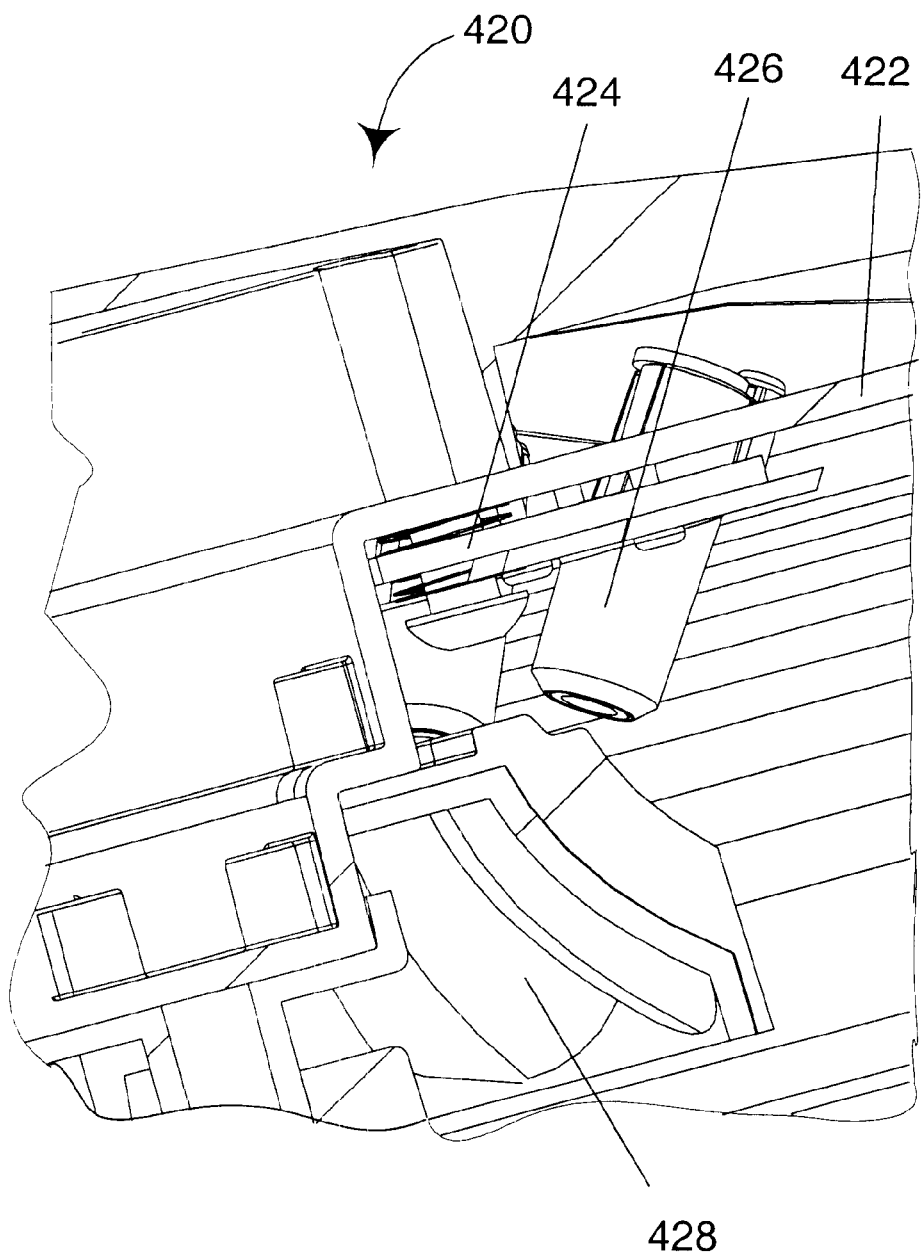
FIG. 29 is an enlarged section of the part of FIG. 28 lying within the rectangle shown in broken lines in FIG. 28, and illustrates the manner in which the fiber optic bundle is introduced into the lighting head.
Figure 30:
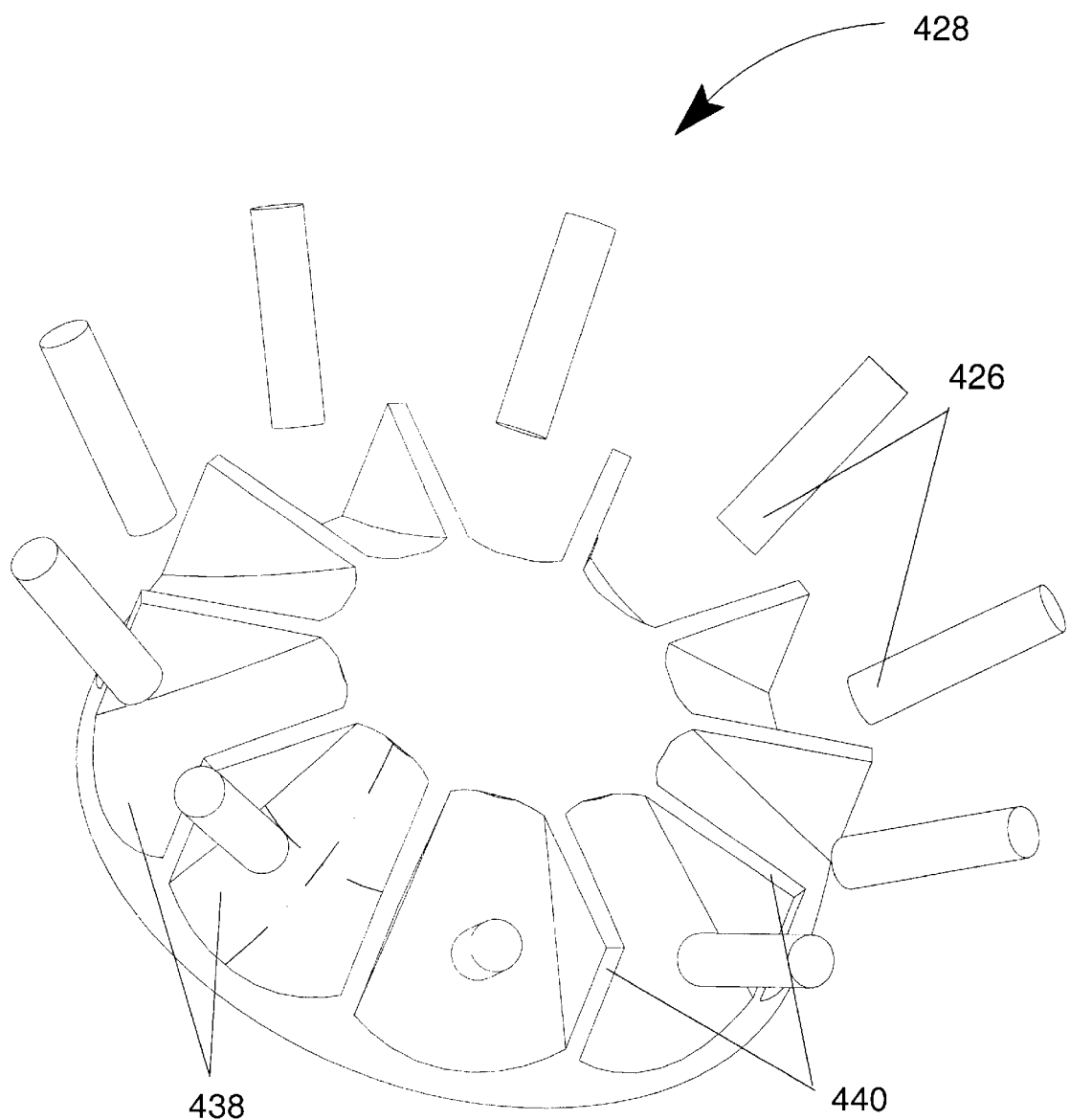
FIG. 30 is a diagrammatic three-quarter perspective view of the primary reflector of the lighting head shown in FIGS. 28 and 29, and also shows the tubes from which light impinges upon this primary reflector.

FIGS. 28–30 show a further light head which can be used in place of that shown in FIGS. 16–24. The light heads previously described use a primary reflector 352 (FIG. 15) or 374 (FIG. 16 etc.) which is circularly symmetric about the axis of the light head and concave parallel in any plane including this axis. This type of primary reflector is necessarily concave in one azimuth, but convex in the other (i.e., any given portion of the primary reflector is essentially saddle-shaped). Such primary reflectors focus the incident light in the azimuth in which they are concave, but tend to defocus the incident light in the azimuth in which they are convex, thus causing scattering of some of the incident light in the plane perpendicular to the axis. Much of this scattered light thus never reaches the area which it is desired to illuminate, and is essentially wasted, thus reducing the efficiency of the illumination system and possibly producing distracting illumination where it is not desired.

This scattering of light, and consequent loss of efficiency, can be reduced by using a primary reflector which is concave, and thus focuses the incident light in both azimuths. However, since such a primary reflector necessarily does not have circular symmetry about the axis of the light head, but rather has a plurality of double-concave "facets" spaced around this axis, modification of the light bundle entering the head is necessary to ensure that the incident light is directed only on to a corresponding facet, not on to the ridges between the facets. FIGS. 28–30 illustrate a light head of this type having ten facets.

As seen in FIG. 28, the light head (generally designated 420) has a secondary reflector 422 generally similar in form to the secondary reflector 376 shown in FIG. 16, except that the reflector 422 has only 12 rings instead of the 16 in reflector 376. The proper angles for the various rings in the reflector 422 can readily be calculated by those skilled in optics, using the approach already described. However, as best seen in FIG. 29, the manner in which the fiber optic bundle terminates at the light head 420 is very different from the corresponding termination in 370. The central portion of the secondary reflector 422 carries a plate 424 on which are mounted ten fiber ferrules or tubes 426; these tubes 426 are spaced evenly around the reflector 422 and are directed toward the axis of this reflector but away from the reflector itself. Although not shown in FIGS. 28 and 29, the fiber optic bundle 330 (FIG. 14) is led via the arm 96 to the central portion of the light head 420, and is there divided into ten equal bundles, one of which is led into the upper end (in FIGS. 28 and 29) of each tube 426.

A primary reflector 428, the exact form of which will be described below with reference to FIG. 30, is centrally mounted surrounding the axis of the light head 20 in a fixed position relative to the secondary reflector 422. A handle assembly 430 is also centrally mounted within the secondary reflector 422. This handle assembly 420 comprises a housing section 432 which is fixed with respect to the secondary reflector 422, and a central rotatable handle 434 which a user can grip to manipulate the light head 420. By rotating the handle 434, the user can move an axial member 436, which is engaged with the handle 434 by means of screw threads, along the axis of the light head. Rotation of the handle 434 acts (via push rods) to cause the plate 424 and the tubes and optic fiber bundles mounted thereon to move axially relative to the primary reflector 428, thereby enabling the light pattern produced by the light head to be adjusted.

The exact form of the primary reflector 428, and the placement of the fiber optic bundles relative thereto, is most easily appreciated from FIG. 30, which shows that the primary reflector has generally the form of a frustum of a decagonal pyramid, being provided with ten equally spaced "facets" 438 arranged around its periphery. Each of these facets 438 is concave in both azimuths; in fact, the cross-sections of each facet, in a plane including the axis of the light head 420 and in a plane perpendicular to this axis, both have the form of a parabola. Substantially triangular baffles 440, which are painted black, are provided between each adjacent pair of facets to absorb any unwanted stray light. The tubes 426 are each directed substantially at the center of one of the facets 438; as previously indicated, the tubes 426 can be moved a short distance (about 3 mm) parallel to the axis of the light head 420 in order to change the illumination pattern produced by the head.

It has been found that the type of light head illustrated in FIGS. 28–30 can maintain very high lighting efficiency while permitting substantial changes in it illumination pattern. For example, one model of the light head 420 has a primary reflector 428 with a diameter of 116 mm and a thickness of 33 mm, which is used in conjunction with ten 7 mm fiber optic bundles in the tubes 426 and with the 12-ring secondary reflector as shown in FIG. 28. At zero longitudinal defocus (i.e., with each of the tubes 12 aimed at the center of its associated facet 438, the resultant illumination pattern has a diameter of 160 mm at 10% of maximum illumination, and a diameter of 100 mm at 50% of maximum illumination, with an efficiency of 98%. Moving the tubes 3 mm longitudinal defocus (i.e., 3 mm closer to the secondary reflector along the axis of the head) increases the diameter to 200 mm at 10% of maximum illumination, and 110 mm at 50% of maximum illumination, while only decreasing the maximum illumination by about 10% and maintaining an efficiency of 97%.

Figure 31:
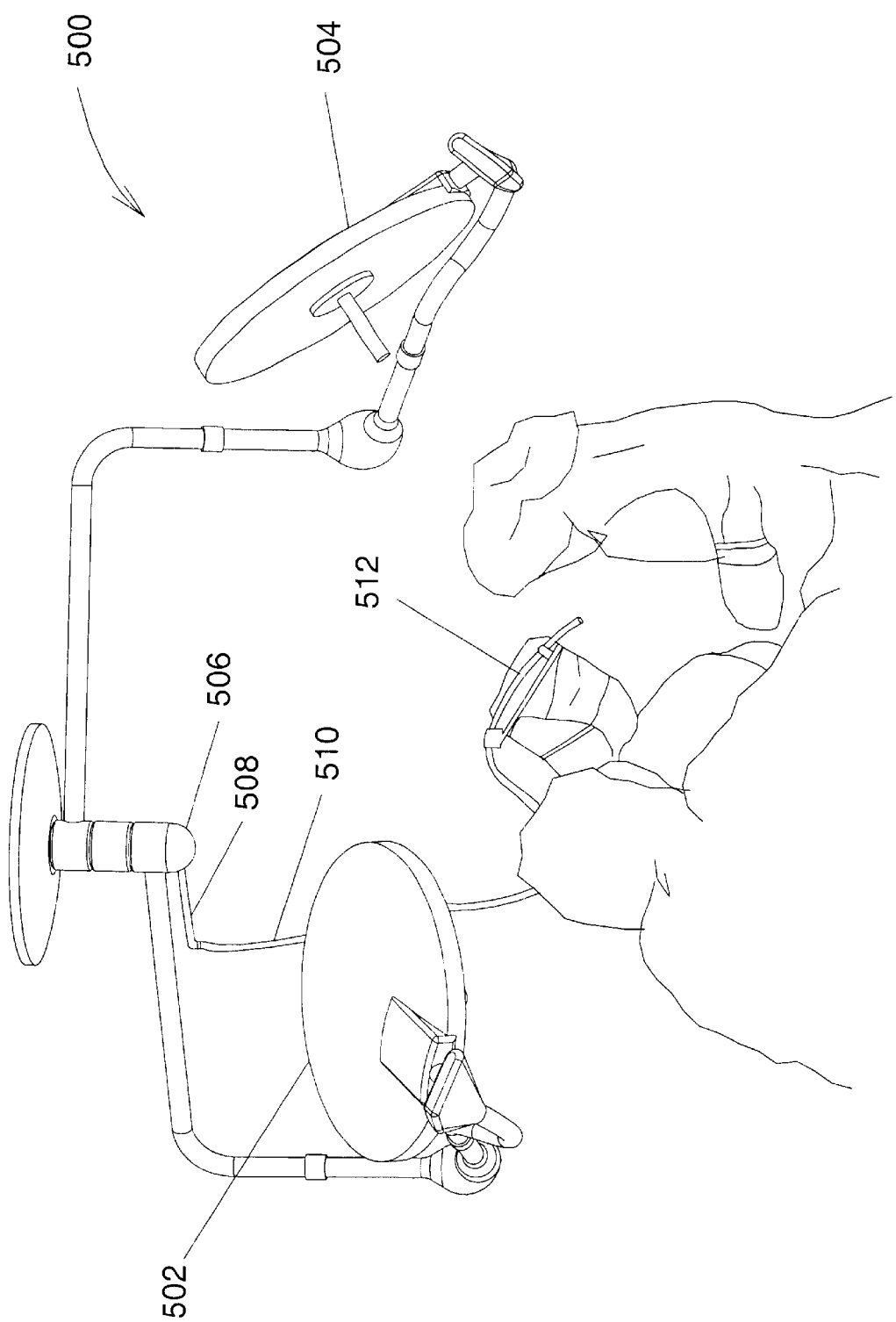
FIG. 31 is a diagrammatic perspective of an alternative termination to a surgical lighting head of the invention which allows for the connection of one or more surgical head lamps which receive illumination via fiber optic bundles or light guides.
Figure 32:
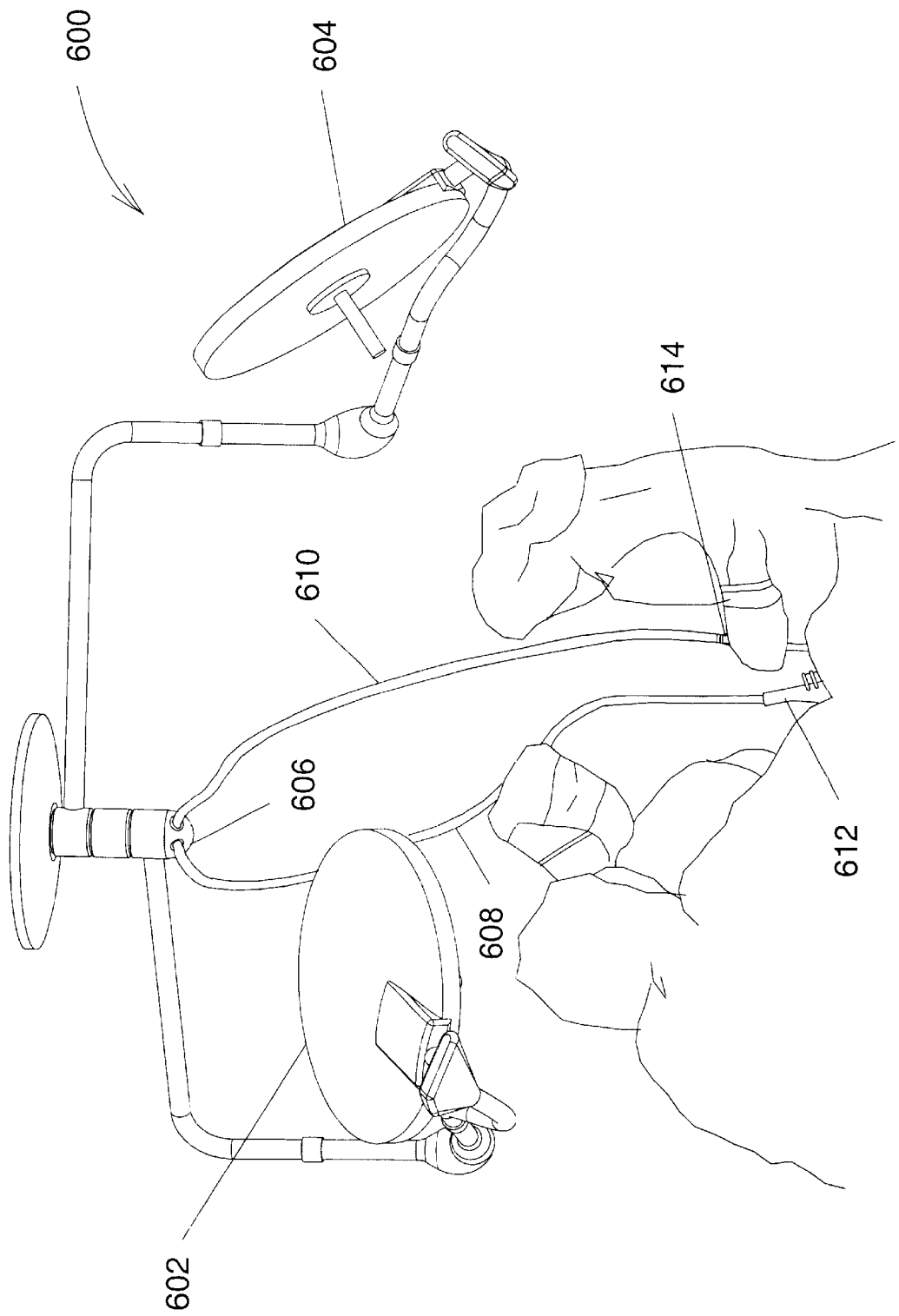
FIG. 32 is a diagrammatic perspective of an alternative termination to a surgical light head of the invention which allows for the connection of one or more endoscopes that receive illumination via fiber optic bundles or light guides.

Alternative terminations to the surgical lighting systems described are shown in FIGS. 31 and 32. In FIG. 31, a fiber based surgical lighting system 500 has light heads 502 and 504 that operate in the manner previously described having light delivered to them via the fiber distribution architecture detailed above. System 500 differs from those previously described in that one branch of the fiber distribution system that would usually feed a light head instead terminates in a connector hub 506 that is provided with an articulated arm 508 that has an interface for connecting a fiber bundle 510 that provides light to a surgical head lamp 512. One or more universal mounting adapters can be provided at the distal end of an articulated arm to feed one or more surgical head lamps. Such universal fiber connectors are readily commercially available to interface with commercially available fiber bundles from, for example, Storz, Wolf, ACMI, and Olympus. Relative to existing art, this system has the advantage of including improved color rendering and color temperature performance which is consistent with the spectral character of surgical lamps, reduced clutter on the floor relative to rack mounted light sources and reduced fatigue for the surgeon due to the lower weight of the light guide. There are currently no guidelines, such as that for over-the-table surgical lights (IEC-601-2-41), for color temperature and color rendering of surgical head lamps and endoscopes. This could result in errors in identification of anatomical features with grave consequences. This system would be the first step toward assuring consistent and accurate color identification for illuminated surgical procedures.

FIG. 32 shows a system 600, similar in concept to system 500, except for delivering light to one or more endoscopes. As before, system 600 has light heads 602 and 604 and a connecting hub 606 carrying standard connectors for receiving fiber bundles 608 and 610 that feed endoscopes 612 and 614, respectively.

It should be appreciated that systems 500 and 600 can be readily adapted to interface with head lamps and/or endoscopes and that one or more connecting ports having articulated arms or not may be used.

From the foregoing description, it will be seen that the present invention provides an illumination system, especially useful for surgical lighting, which enables light sources to be placed in the room or remotely from the operating room, thereby reducing the bulk of the lighting heads required within the operating room, as compared with conventional systems in which the light sources reside within the lighting heads themselves. Locating the light sources outside the operating room also requires unwanted heat radiation striking the patient and the operating room personnel, and reduces the load on the operating room HVAC systems. The illumination system of the present invention can provide real time control of lighting intensity and CRI, and enables a plurality of light sources to be mixed to provide uniform lighting having a desired CRI, and can provide for feedback to ensure compliance with CRI requirements. The present invention enables light from a single light source to be distributed to multiple lighting heads, and also provides a fully rotatable fiber joint which allows a light output device fed by a fiber bundle to be freely rotated relative to parts of the illumination system lying on the opposed side of the joint. The present invention also provides an illumination system in which lighting intensity is controlled by variable apertures rather than by controlling power input to a light source, thus avoiding unwanted spectral shifts which might otherwise occur when light intensity is changed. Finally, this invention provides apparatus which enables a high intensity light source to be coupled into a plastic fiber optic bundle without the input end of the bundle reaching a temperature at which the optical and/or mechanical properties of the fiber optic bundle are adversely affected.

While the invention has been described with reference to particular embodiments thereof, those skilled in the art will be able to make various modifications to the described embodiments of the invention without departing from its true spirit and scope.

What we claim is:

1. An illumination system for illuminating an area within a room, the illumination system comprising:
   at least one light source;
   at least one lighting head disposed within the room and arranged to output light to the area to be illuminated;
   at least one light pipe and/or fiber bundle arranged to transmit light from said at least one light source to said at least one lighting head; and
   means for controlling the color rendering index of the light output from said at least one lighting head.

2. An illumination system according to claim 1 wherein said at least one light source is located outside said room.

3. An illumination system according to claim 1 comprising at least two light sources emitting light with differing spectral distributions, wherein said means for controlling the color rendering index of the light output comprises means for controlling the relative amounts of light from said at least two lighting sources reaching said at least one lighting head.

4. An illumination system according to claim 3 wherein said at least two light sources comprise an incandescent source, having an output extending across the visible spectrum, and a light emitting diode source having its maximum emission in the red portion of the visible spectrum.

5. An illumination system according to claim 1 further including means for controlling the intensity of the light output from said at least one lighting head.

6. An illumination system according to claim 5 wherein said means for controlling the intensity of the light output comprises at least one variable aperture.

7. An illumination system according to claim 3 further comprising means for mixing and homogenizing the output from said at least two light sources to produce a substantially uniform light output.

8. An illumination system according to claim 7 wherein said means for mixing and homogenizing comprises a multi-mode light pipe of polygonal cross-section.

9. An illumination system according to claim 7 further comprising at least one variable aperture arranged to control said substantially uniform light output from said mixing and homogenizing means.

10. An illumination system arranged to mix the output from two separate light sources, said system comprising:
first and second light sources;
a first fiber bundle having an input end arranged to receive light emitted by the first light source;
a second fiber bundle having an input end arranged to receive light emitted by the second light source
wherein the output ends of the fibers forming the first and second fiber bundles form a single fiber bundle arranged to transmit light from both the first and second light sources; and
an optical homogenizer having an input end arranged to receive light from said single fiber bundle and an output end which delivers a substantially uniform light output.

11. An illumination system according to claim 10 wherein said first and second light sources have different spectral distributions.

12. An illumination system according to claim 11 wherein the first and second light sources comprise an incandescent source, having an output extending across the visible spectrum, and a light emitting diode source having its maximum emission in the red portion of the visible spectrum.

13. An illumination system according to claim 10 wherein the output ends of the fibers forming the first and second fiber bundles are substantially intermingled in the single fiber bundle, whereby partial homogenization of the light from the first and second light sources is effected before the light enters the optical homogenizer.

14. An illumination system according to claim 10 wherein the optical homogenizer comprises a multi-mode light pipe.

15. An illumination system according to claim 14 wherein the multi-mode light pipe is of circular cross-section.

16. An illumination system according to claim 14 wherein the multi-mode light pipe is of polygonal cross-section.

17. An illumination system according to claim 10 further comprising sampling means for sampling the light output produced by the optical homogenizer.

18. An illumination system according to claim 17 wherein said first and second light sources have different spectral distributions and wherein said sampling means comprises a first sampling device which samples the entire light output of the optical homogenizer and a second sampling device arranged to be more sensitive to one of the first and second light sources than to the other.

19. An illumination system according to claim 10 further comprising control means for controlling the intensity of the light leaving the optical homogenizer.

20. An illumination system according to claim 19 wherein said control means comprises a variable aperture disposed adjacent the output end of the optical homogenizer.

21. An illumination system arranged to mix the output from two separate light sources and to control at least one parameter of the mixed output, said illumination system comprising:
a first light source arranged to emit light having a first characteristic value;
a second light source arranged to emit light having a second characteristic value differing from the first characteristic value;
a light mixing means arranged to receive light emitted from the first and second light sources and to produce a light output having a third characteristic value differing from the first and second characteristic values;
a light detector arranged to receive part of the light output from the light mixing means and to determine said third characteristic value of said light output; and
intensity control means arranged to vary the intensity of the light output from at least one of the first and second light sources and thereby to vary said third characteristic value of said light output from said light mixing means, said intensity control means being controlled by said light detector.

22. An illumination system according to claim 21 wherein said first and second light sources comprise an incandescent source, having an output extending across the visible spectrum, and a light emitting diode source having its maximum emission in the red portion of the visible spectrum.

23. An illumination system according to claim 21 wherein the light mixing means comprises a multi-mode light pipe.

24. An illumination system according to claim 23 wherein the multi-mode light pipe is of circular cross-section.

25. An illumination system according to claim 23 wherein the multi-mode light pipe is of polygonal cross-section.

26. An illumination system according to claim 23 further comprising first and second fiber bundles arranged to transmit light from the first and second sources respectively to the input end of the multi-mode light pipe.

27. An illumination system according to claim 26 wherein the output ends of the fibers forming the first and second fiber bundles are substantially intermingled to form a single fiber bundle adjacent the input end of the multi-mode light pipe, whereby partial mixing of the light from the first and second light sources occurs before the light enters the multi-mode light pipe.

28. An illumination system according to claim 23 wherein said light detector is arranged to receive light via the side wall of said light pipe, and a light reflector is disposed within said light pipe and arranged to divert a sample of the light passing along said light pipe through said wall thereof on to said light detector.

29. An illumination system according to claim 21 having first and second detectors each arranged to receive part of the light output from the light mixing means, said first detector being arranged to receive a sample of all the light output from the light mixing means and the second detector arranged to be more sensitive to light having one of said first and second characteristic values than to light having the other of said first and second characteristic values.

30. An illumination system according to claim 29 wherein said second detector is provided with a filter to reduce the amount of light in a predetermined wavelength range reaching said second detector.

31. An illumination system according to claim 29 further comprising a differential amplifier arranged to receive a first signal representative of the output of said first detector and a second signal representative of the output of said second detector, and to produce an output signal representative of the difference between said first and second signals and to supply said output signal to said intensity control means.

32. An illumination system according to claim 31 further comprising a variable gain amplifier arranged to receive the output from one of said first and second detectors, and to generate one of said first and second signals, and a fixed gain amplifier arranged to receive the output from the other of said first and second detectors, and to generate the other of said first and second signals.

33. An illumination system according to claim 21 wherein said intensity control means comprises at least one variable aperture arranged to vary the intensity of the light output from at least one of said first and second light sources.

34. A rotatable fiber joint for use in an illumination system, said joint comprising:
 a first member having walls defining a first passage extending therethrough;
 a second member disposed adjacent the first member and having walls defining a second passage extending therethrough, one end of said second passage being disposed adjacent one end of said first passage; and
 a fiber optic bundle disposed within said first and second passages, the bundle being secured relative to the second member so that the bundle cannot rotate within said second passage, but not being secured to the first member so that the bundle can rotate freely within said first passage, whereby the first and second members can rotate relative to each other.

35. A rotatable fiber joint according to claim 34 wherein at least the adjacent portions of said first and second members have the form of hollow tubes, with the interiors of said tubes forming said first and second passages.

36. A rotatable fiber joint according to claim 35 wherein at least said adjacent portions of said first and second members are coaxial and are rotatable relative to one another about their common axis.

37. A rotatable fiber joint according to claim 34 further comprising a lighting head pivotally mounted on said second member, said fiber bundle extending into said lighting head.

38. A rotatable fiber joint according to claim 34 wherein said first member has a first section and a second section pivotally attached to said first section, said fiber bundle extending into said second section of said first member, and the adjacent portions of said first and second sections of said first member being of enlarged cross-section so as to permit pivoting of said first and second sections relative to one another without damage to said fiber bundle.

39. A rotatable fiber joint according to claim 34 further comprising a hub having a fixed section and a rotatable section, and an elongate third member having transmitting means for transmitting light therealong, wherein said first member is rotatably mounted on the third member at the end thereof remote from said hub.

40. A rotatable fiber joint according to claim 39 wherein said means for transmitting light along said third member comprises a second fiber optic bundle.

41. A rotatable fiber joint according to claim 39 wherein said first member has a first section and a second section pivotally attached to said first section, said fiber bundle extending into said second section of said first member, and the adjacent portions of said first and second sections of said first member being of enlarged cross-section so as to permit pivoting of said first and second sections relative to one another without damage to said fiber bundle, and wherein the end of said second section of said first member remote from said first section thereof is rotatably mounted on the third member at the end thereof remote from said hub, said fiber optical bundle extending through said first member to a point adjacent said third member, whereby said fiber optic bundle is arranged to receive light from said transmitting means.

42. A rotatable fiber joint according to claim 41 further comprising a lighting head pivotally mounted on said second member, said fiber bundle extending into said lighting head, so that said lighting head can be translated along three perpendicular axes, and rotated about at least two perpendicular axes, relative to said hub.

43. A lighting head for use in an illumination system, said lighting head having an optical axis and comprising:
 input means for introducing light into the light head;
 a first reflector positioned along said optical axis and arranged to receive light entering the lighting head through said input means and to reflect this light radially outward from said first reflector;
 a second reflector having a plurality of facets facing said first reflector, the second reflector being arranged to receive said light reflected radially from the first reflector and to reflect this light to produce a substantially uniform illumination over a target area.

44. A lighting head according to claim 43 wherein said first reflector is substantially conical in at least one azimuth.

45. A lighting head according to claim 43 wherein said input means comprises a fiber optic bundle arranged to direct light passing along said bundle on to said first reflector.

46. A lighting head according to claim 45 wherein the output end of said fiber optic bundle has the form of an annulus surrounding the axis of said substantially conical first reflector, whereby said output end of said fiber optic bundle forms an off-axis, annularly distributed light source.

47. A lighting head according to claim 46 wherein said annular output end of said fiber optic bundle comprises at least two adjacent rows of fibers.

48. A lighting head according to claim 43 further comprising a handle extending substantially along the axis of the first reflector but on the side thereof remote from the second reflector, said handle permitting a user to move said light head.

49. A lighting head according to claim 43 having a transparent window covering the open face of said second reflector.

50. A lighting head according to claim 44 wherein said substantially conical first reflector has a central aspheric section and at least one peripheral conical section surrounding said aspheric section.

51. A lighting head according to claim 50 wherein said substantially conical first reflector has two peripheral conical sections differing in cone angle.

52. A lighting head according to claim 50 wherein said central aspheric section has a form given by:

$$z(r) = \frac{cr^2}{1 + [1-(1+K)c^2r^2]^{1/2}} + Ar^2 + Br^4 + Br^6 + Cr^8 + Dr^{10} + \cdots$$

where:
z(r) is the sag,
c is the curvature at the apex of the surface,
$r^2 = x^2 + y^2$,
K is the conic constant, and
A, B, C, D, . . . are the 4th, 6th, 8th, and 10th order deformation terms.

53. A lighting head for use in an illumination system, said lighting head comprising:
input means for introducing light into the lighting head;
a first reflector arranged to receive light entering the lighting head through said input means and to reflect this light, said first reflector being substantially frusto-pyramidal in shape, being provided around its periphery with a plurality of facets each of which is concave in both azimuths, said input means being arranged to produce a plurality of beams each directed at one of said facets; and
a second reflector having a plurality of facets, the second reflector being arranged to receive light reflected from the first reflector and to reflect this light to produce a substantially uniform illumination over a target area.

54. A lighting head according to claim 53 wherein said first reflector is provided with baffles extending between adjacent pair of said facets.

55. A lighting head according to claim 53 wherein said input means comprises a fiber optic bundle the output end of which is divided into a plurality of sub-bundles each of which produces one of said beams directed at said facets.

56. A lighting head according to claim 55 wherein said input means further comprises a framework and a plurality of tubes supported on said framework and directed towards the facets of said first reflector, said sub-bundles of optic fibers being disposed within said tubes.

57. A lighting head according to claim 56 wherein said framework and said tubes are movable axially relative to said first reflector.

58. A lighting head according to claim 56 further comprising a handle extending substantially along the axis of said first reflector but on the side thereof remote from said second reflector, said handle permitting a user to move said light head.

59. A lighting head according to claim 58 wherein said handle can be rotated and said framework and said tubes thereby moved axially relative to said first reflector.

60. A lighting head according to claim 53 wherein each of said plurality of facets is parabolic in both azimuths.

61. An illumination system in which a single input light flux is distributed among a plurality of output fiber bundles or light pipes, said illumination system comprising:
light input means arranged to supply a single beam of light;
at least first and second light output means each comprising a fiber optic bundle or light pipe, the first and second light output means being movable relative to one another and to the light input means; and
a light distribution means arranged to receive light from the light input means, to divert a first part of the received light into the first light output means and to divert a second part of the received light into the second light output means, said light distribution means comprising a substantially cylindrical fiber optic bundle, and said first and second light output means being arranged to rotate about the axis of said substantially cylindrical fiber optic bundle.

62. An illumination system according to claim 61 wherein said fiber optic bundle has a first section having a first diameter and a second section having a second diameter less than said first diameter, thereby leaving an annular shoulder at the junction of said first and second sections, the input end of said first light output means being disposed adjacent said annular shoulder and the input end of said second light output means being disposed adjacent the end of said second section remote from said first section.

63. An illumination system according to claim 61 further comprising control means disposed between, and arranged to control the amount of light passing from, said light input means to at least one of said first and second light output means.

64. An illumination system according to claim 63 wherein said control means comprises a variable aperture.

65. An illumination system according to claim 62 further comprising variable apertures disposed between, and arranged to control the amount of light passing from, said light input means to said first and second light output means.

66. An illumination system according to claim 61 further comprising a housing having a first section carrying said light distribution means, a second section rotatably mounted on said first section and carrying said first light output means, and a third section rotatably mounted on said second section and carrying said second light output means.

67. An illumination system according to claim 66 wherein said first, second and third sections of said housing are substantially cylindrical and all have substantially the same diameter.

68. An illumination system according to claim 61 further comprising clutch means arranged to frictionally retard the rotation of at least one of said first and second light output means relative to said light input means.

69. An illumination system according to claim 68 wherein said clutch means comprise first clutch means arranged to frictionally retard the rotation of said first light output means relative to said light input means, and second clutch means arranged to frictionally retard the rotation of said second light output means relative to said light input means.

70. An illumination system in which a single input light flux is distributed among a plurality of output fiber bundles or light pipes, said illumination system comprising:
light input means arranged to supply a single beam of light;
at least first and second light output means each comprising a fiber optic bundle or light pipe, the first and second light output means being movable relative to one another and to the light input means; and
a light distribution means arranged to receive light from the light input means, to divert a first part of the received light into the first light output means and to divert a second part of the received light into the second light output means,
wherein said light distribution means comprises:
a first light pipe rotatable relative to, and having an input end arranged to receive light from, said light input means, said first light pipe having an output end through which light leaves said first light pipe, said first light pipe also having a mirrored surface arranged to divert part of the light entering said input end through a side wall of said first light pipe into said first light output means, while permitting the remainder of the light to leave via said output end; and a second light pipe rotatable relative to said first light pipe, said second light pipe having an input end arranged to receive light from said output end of said first light pipe and an output end arranged to direct light into said second light output means.

71. An illumination system according to claim 70 wherein said light input means comprises an input light pipe having an output end disposed adjacent said input end of said first light pipe, said first, second and input light pipes being substantially cylindrical and coaxial, said first and second light pipes being independently rotatable about their common axis relative to said input light pipe.

72. An illumination system according to claim 70 wherein said first light pipe is provided with a side arm extending substantially normally to the direction in which light passes from said input end to said output end of said first light pipe, said side arm having a substantially planar light output surface at its end from the main body of said first light pipe, and wherein said mirrored surface is arranged to divert part of the light passing through said first light pipe out through said substantially planar light output surface.

73. A light pipe comprising a substantially transparent rod having an axis, and a mirror surface disposed within the rod at an angle to the axis thereof, such that when light is passed axially along the rod, part of this light will be diverted by the mirror surface at an angle to the axis so as to emerge from a side surface of the rod, while the remaining light will continue axially along the rod, said light pipe being substantially cylindrical and wherein said mirror surface lies at substantially 45° to the axis of said cylinder, so that part of the light is diverted by said mirror surface substantially normally to the axis of said cylinder.

74. A light pipe according to claim 73 which is substantially cylindrical and wherein said mirror surface lies at substantially 45° to the axis of said cylinder, so that part of the light is diverted by the mirror surface substantially normally to the axis of said cylinder.

75. A light pipe according to claim 73 provided with a side arm extending substantially normally to said axis of said cylinder, said side arm having a substantially planar light output surface at its end from the main body of said light pipe, and wherein said mirrored surface is arranged to divert part of the light passing through said light pipe out through said substantially planar light output surface.

76. An illumination system comprising:

a first light transmission device selected from the group consisting of light pipes and fiber optic bundles, the first light transmission device having an input end and an output end;

a second light transmission device selected from the group consisting of light pipes and fiber optic bundles, the second light transmission device having an input end and an output end, the input end of the second light transmission device being disposed adjacent the output end of the first light transmission device; and variable aperture means disposed between the output end of the first light transmission device and the input end of the second light transmission device, the variable aperture means being variable to block a varying portion of the light leaving the output end of the first light transmission device from reaching the input end of the second light transmission device, and thereby controlling the intensity of the light leaving the output end of the second light transmission device.

77. A coupling device for coupling light from a high intensity light source into optic fibers which can be damaged by heat, said coupling device comprising:

a window arranged to receive light from the light source, the window reflecting at least part of infra-red radiation received from the light source;

optic fibers having input ends disposed adjacent the window so as to receive light passing through the window; and a heat dissipating means in heat conducting relationship with the input ends of the optic fibers, and thereby serving to remove from said input ends heat generated with said input ends as said input ends receive light passing through the window.

78. A coupling device according to claim 77 further comprising a control means disposed adjacent said window and arranged to control the amount of light entering said window.

79. A coupling device according to claim 78 wherein said control means comprises a variable aperture.

80. A coupling device according to claim 77 wherein said window is formed of sapphire.

81. A coupling device according to claim 80 wherein said sapphire window is provided, on its surface facing the light source with a dielectric coating reflective of ultraviolet and infrared radiation from said light source.

82. A coupling device according to claim 77 wherein said heat dissipating device comprises a metal ferrule in which said input ends of said fibers are secured.

83. A coupling device according to claim 82 wherein said heat dissipating device further comprises a hollow metal body within which are secured both said window and said ferrule.

84. A coupling device according to claim 83 wherein said hollow metal body is provided with cooling fins.

85. A coupling device according to claim 82 wherein said ferrule is in thermal contact with said window.

86. A coupling device according to claim 82 wherein said input ends of said optic fibers are secured in a plate, said coupling device further comprising a hollow body member within which both said plate and said window are secured, said window, said plate and said hollow body member having walls defining a chamber lying on the opposed side of said window from said light source, and wherein said heat dissipating means comprises a fluid within said chamber.

87. A coupling device according to claim 86 wherein said input ends of said optic fiber are secured in said plate at points spaced from the extreme ends of said optic fibers so that said fibers extend beyond the plate into the interior of the said fluid within said chamber.

88. A coupling device according to claim 86 wherein said heat dissipating means further comprises a heat exchanger and pump means for circulating fluid from said chamber to said heat exchanger and back to said chamber.

89. A coupling device according to claim 86 wherein the gaps between said input ends of said optical fibers are filled with a material which is not wetted by the fluid within said chamber.

90. An illumination system for illuminating an area within a room, said illumination system comprising:

at least one light source disposed outside the room;

at least one lighting device disposed within the room and arranged to output light to said area to be illuminated;

at least one light pipe and/or fiber bundle arranged to transmit light from said at least one light source to said at least one lighting device;

means for controlling the intensity of the light output from said at least one lighting device; and means for controlling the color rendering index of the light output from said at least one lighting device.

91. The illumination system of claim 90 wherein said lighting device is selected from the group consisting of endoscopes and surgical head lamps.

92. The illumination system of claim 90 comprising at least two light sources emitting light with differing spectral distributions, wherein said means for controlling the color rendering index of the light output comprises means for controlling the relative amounts of light from said at least two lighting sources reaching said at least one lighting head.

93. The illumination system of claim 92 wherein said at least two light sources comprise an incandescent source, having an output extending across the visible spectrum, and a light emitting diode source having its maximum emission in the red portion of the visible spectrum.

94. The illumination system of claim 90 wherein said means for controlling the intensity of the light output comprises at least one variable aperture.

95. The illumination system of claim 92 further comprising means for mixing and homogenizing the output from said at least two light sources to produce a substantially uniform light output.

96. An illumination system according to claim 93 wherein said means for controlling the intensity of the light output comprises at least one variable aperture arranged to control said substantially uniform light output from said mixing and homogenizing means.

* * * * *